June 5, 1962 G. L. CLAPPER 3,037,700

INDEXING REGISTERS FOR CALCULATORS

Filed Nov. 29, 1956 21 Sheets-Sheet 1

INVENTOR.
GENUNG L. CLAPPER
BY James K. Mosser
AGENT

June 5, 1962 G. L. CLAPPER 3,037,700

INDEXING REGISTERS FOR CALCULATORS

Filed Nov. 29, 1956 21 Sheets-Sheet 2

INDEXING REGISTERS FOR CALCULATORS

Filed Nov. 29, 1956

June 5, 1962 G. L. CLAPPER 3,037,700

INDEXING REGISTERS FOR CALCULATORS

Filed Nov. 29, 1956 21 Sheets-Sheet 6

INDEXING REGISTERS FOR CALCULATORS

Filed Nov. 29, 1956 21 Sheets-Sheet 7

June 5, 1962 G. L. CLAPPER 3,037,700

INDEXING REGISTERS FOR CALCULATORS

Filed Nov. 29, 1956 21 Sheets-Sheet 8

June 5, 1962 G. L. CLAPPER 3,037,700

INDEXING REGISTERS FOR CALCULATORS

Filed Nov. 29, 1956 21 Sheets-Sheet 11

INDEXING REGISTERS FOR CALCULATORS

| | | | | |
|---|---|---|---|---|
| FIG. 3a. | FIG. 3b. | FIG. 3c. | FIG. 3d. | FIG. 3e. |
| FIG. 3f. | FIG. 3g. | FIG. 3h. | FIG. 3i. | FIG. 3j. |
FIG. 4.
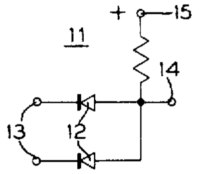
FIG. 5a.
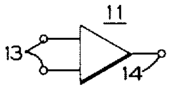
FIG. 5b.
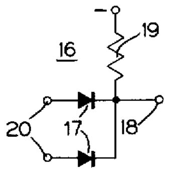
FIG. 6a.
FIG. 6b.
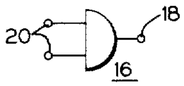
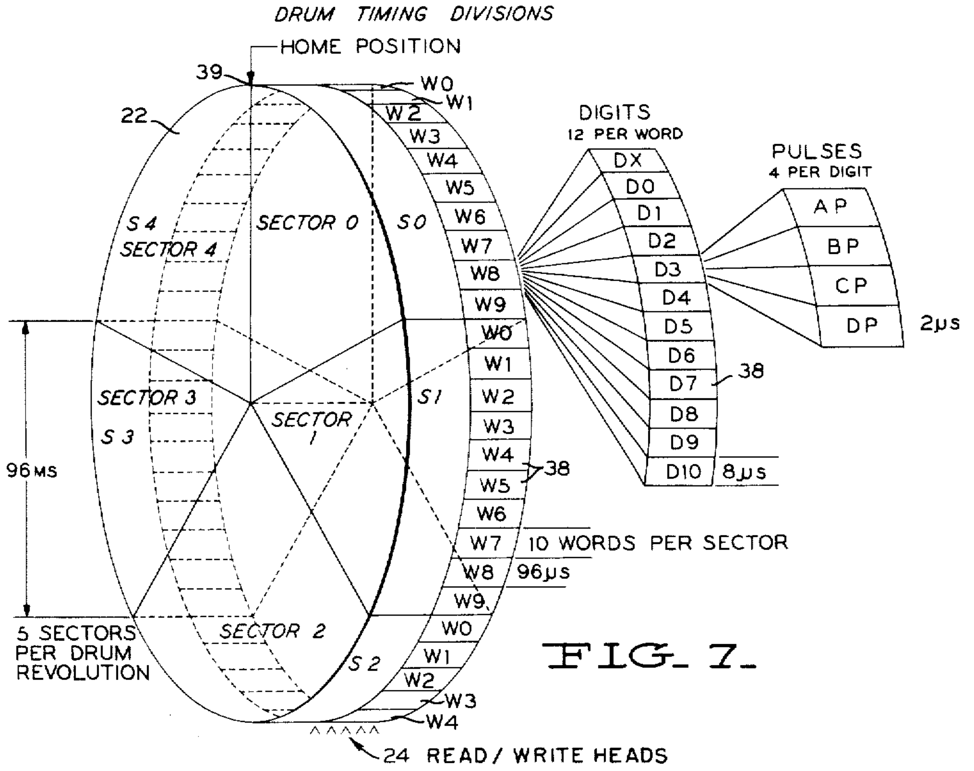
FIG. 7.

June 5, 1962 G. L. CLAPPER 3,037,700

INDEXING REGISTERS FOR CALCULATORS

Filed Nov. 29, 1956 21 Sheets-Sheet 20

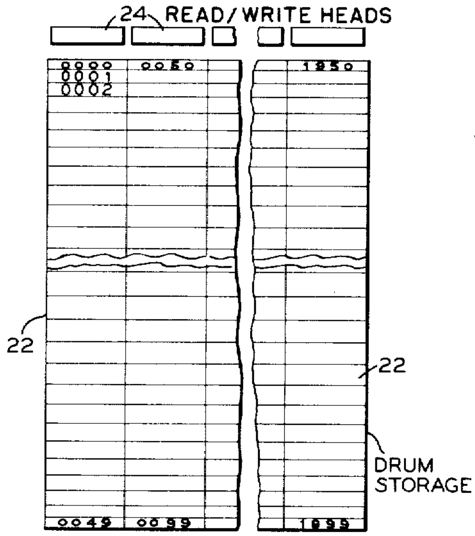
FIG. 19.
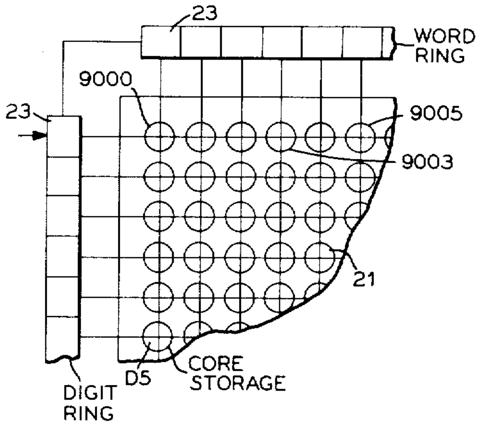
FIG. 20.
| DECIMAL DIGIT VALUE | BIQUINARY CODE | | | | | | |
|---|---|---|---|---|---|---|---|
| | B5 | B0 | Q4 | Q3 | Q2 | Q1 | Q0 |
| 0 | 0 | 1 | 0 | 0 | 0 | 0 | 1 |
| 1 | 0 | 1 | 0 | 0 | 0 | 1 | 0 |
| 2 | 0 | 1 | 0 | 0 | 1 | 0 | 0 |
| 3 | 0 | 1 | 0 | 1 | 0 | 0 | 0 |
| 4 | 0 | 1 | 1 | 0 | 0 | 0 | 0 |
| 5 | 1 | 0 | 0 | 0 | 0 | 0 | 1 |
| 6 | 1 | 0 | 0 | 0 | 0 | 1 | 0 |
| 7 | 1 | 0 | 0 | 0 | 1 | 0 | 0 |
| 8 | 1 | 0 | 0 | 1 | 0 | 0 | 0 |
| 9 | 1 | 0 | 1 | 0 | 0 | 0 | 0 |
FIG. 21.
| DECIMAL DIGIT VALUE | 2 OUT OF 5 CODE | | | | |
|---|---|---|---|---|---|
| | 0 | 1 | 2 | 3 | 6 |
| 0 | 0 | 1 | 1 | 0 | 0 |
| 1 | 1 | 1 | 0 | 0 | 0 |
| 2 | 1 | 0 | 1 | 0 | 0 |
| 3 | 1 | 0 | 0 | 1 | 0 |
| 4 | 0 | 1 | 0 | 1 | 0 |
| 5 | 0 | 0 | 1 | 1 | 0 |
| 6 | 1 | 0 | 0 | 0 | 1 |
| 7 | 0 | 1 | 0 | 0 | 1 |
| 8 | 0 | 0 | 1 | 0 | 1 |
| 9 | 0 | 0 | 0 | 1 | 1 |
FIG. 22.

United States Patent Office 3,037,700
Patented June 5, 1962

3,037,700

INDEXING REGISTERS FOR CALCULATORS

Genung L. Clapper, Vestal, N.Y., assignor to International Business Machines Corporation, New York, N.Y., a corporation of New York Filed Nov. 29, 1956, Ser. No. 625,099
4 Claims. (Cl. 235—157)

The invention relates to calculators and more particularly to stored program calculators having auxiliary registers which are selectively operative to perform an arithmetic operation on a set of data.

It is one of the prime objects of the invention to provide a stored program calculator with an auxiliary addressable register which is capable of increasing the over-all operating speed of the calculator.

It is another object of the invention to provide a stored program calculator with an auxiliary addressable register operative to reduce the number of program steps required to complete an arithmetic operation on an array of data.

It is yet another object of the invention to provide a stored program calculator with an auxiliary register which is operative to automatically modify either or both of the data and instruction addresses without destroying the original stored data and instruction address data.

It is still another object of the invention to provide a stored program calculator with addressable indexing registers which are capable of automatically modifying the address of any instruction.

It is another object of the invention to provide a stored program calculator operating under the direction of a program step word with a plurality of addressable auxiliary registers carrying data therein which may be selectively added to or subtracted from the data and/or instruction addresses to automatically modify the actual addresses of the data or instruction portion of the word.

It is yet another object of the invention to provide a stored program calculator having an accumulator and distributor with addressable auxiliary data storing registers which may be utlized in the arithmetic operation on the data.

It is another object of the invention to provide a stored program calculator with addressable indexing registers for modifying instruction and data addresses which reduces the required storage space for program step words.

It is still another object of the invention to provide a stored program calculator having an arithmetic section and a program control section with a plurality of addressable data storing indexing registers whose contents may be modified from both the program and arithmetic sections.

It is another object of the invention to provide a stored program calculator with addressable indexing registers which reduces the probability of error in the writing of a program routine.

It is yet another object of the invention to provide a stored program calculator with an arithmetic section and a related program instruction section with addressable indexing registers which with a single instruction provides data for the next arithmetic operation.

It is another object of the invention to provide a stored program calculator having a program step control for controlling an arithmetic operation with addressable indexing registers which may provide either or both the address of the data to be operated upon and provide the address of the next instruction.

Heretofore, when solving complex problems in standard type stored program calculators, each step performed in the solution of the problem requires a separate instruction. Thus an instruction must be stored at some location and then interrogated to determine what the next step is to be including the location of the data to be operated upon. That data is then located and is manipulated in accordance with the desired instruction or operation. After this, the next instruction or program step must be located and stored in the program storage register or the like. This must be repeated for each operation to be performed. From this it is readily apparent a vast number of individual instructions must be written when solving some problems. In a large number of these problems, there are many operations involving repetitive steps, and the same number of operations are performed on arrays of data wherein only the numeric values are modified and not the operations. In solving problems wherein arithmetic is performed in loops, somewhat the same conditions exist.

In each of these conditions it sometimes requires many hundreds or even thousands of individual program steps to perform the desired arithmetic operation. In a relatively large percentage of these cases, the program steps are identical for each group of data worked upon. In addition, these many program step instructions may occupy a large percentage of the available storage capacity of the calculator which, of course, reduces the space available for the storage of data. This data storage reduction also requires more frequent inputs and outputs as the program routine advances the problem. Likewise, the manual writing of a vast number of instruction words increases the possibility of error. An estimate is that a programmer averages approximately one program error for each one hundred instructions written. Thus the fewer of the number of instructions required to program a problem, the less the chance of error.

Another factor is that each individual instruction not only consumes time in the writing of the program, but likewise requires time to read in and out of the program storage section. This time, of course, is in effect nonproductive.

This invention is directed to stored program calculators of the above type wherein it is intended to reduce the number of stored program steps required to solve certain problems by providing a set of basic instructions, whose addresses are thereafter automatically modified to operate on different sets of data found at other storage locations without changing the original instructions or their storage location.

Thus in this manner, a relatively few number of instructions may be utilized to automatically operate upon a vast amount of data. The fewer instructions required, makes it relatively easier to check for program errors, reduces the instruction storage space and permits this saving to be utilized for data storage for still more calculations without transferring data. In addition, calculator time is saved because an automatic address change occurs at the next word interval, and it is not necessary to wait to locate and read data from storage.

In order to accomplish this, addressable indexing registers or accumulators have been incorporated as part of the calculator. These indexing registers are capable of storing data therein which is immediately available for any specified use when desired.

In F. E. Hamilton et al. application, Serial No. 544,520, filed November 2, 1955, now Patent 2,959,351 issued November 8, 1960, there is disclosed a parallel by bit, serial by digit, stored program calculator having a fixed word length comprising ten data digit positions for storing data plus a sign position. The disclosed invention is, with suitable circuit modifications, adapted to operate with a calculator of this type. The description appearing in the following specification is based on the above Hamilton et al. application modified as indicated. The above calculator includes a word length distributor, a single digit adder and upper and lower word length accumulators which are utilized in the arithmetic operation. A program step register is provided to receive and store a program step word prior to delivery of different parts of said word to suitable operation and address registers.

During an arithmetic operation, the data in the addressable accumulators is directed through the single digit adder in synchronism with timing pulses supplied from a data storage drum or the like in accordance with the operation specified in the operation register. At all even, i.e., lower word times, the word of data in the lower accumulator is directed to the adder parallel by bit and serial by digit starting with the least significant, and at all odd, i.e., upper word times, the data in the upper accumulator is available parallel by bit and serial by digit at the adder. The word of data in this distributor is delivered to the adder at lower and also at upper word times in synchronism, respectively, with the digits in the lower and upper accumulators. Whether the delivered data is merged as described later or permitted individually to merely pass through the adder is dependent upon various conditions as determined by the operation code. During normal operation, all ten data digit positions are utilized for the data. The data stored in either of the accumulators is directed through the adder along with that appearing in the distributor, and the result is stored in one of the accumulators, dependent upon the previous instruction.

The program step or instruction word comprises ten digit positions D10–D1. D4–D1 indicate the instruction address, D8–D5 indicate the data address and D10–D9, the operation code. Thus reading from left to right, XX XXXX XXXX indicate the operation code (OP), D10–D9, data addresses (D) D8–D5, and instruction addresses (I) D4–D1, respectively.

The accumulators, distributor and indexing registers or accumulators are all addressable and may include data values for use in modifying data and instruction addresses or to store data.

In the disclosed embodiment, each of the three indexing registers utilized with the calculator is a four-digit accumulator with an associated sign. They can be considered as additional accumulators, but their primary function is for address modification. The contents of any one of the indexing registers may be used to automatically modify the data or the instruction address part of any instruction. The use of the disclosed indexing registers provides more flexibility and versatility than any comparable device in data processing machines in the commercial and scientific area. For example, these indexing registers permit operations such as reset add, reset subtract, add or subtract in to each of the indexing registers from the program step register, distributor or accumulator. It is also possible to test each indexing register for a zero or nonzero, positive or negative state. Each indexing register is addressable so that its contents and sign may be read into the distributor or accumulator or the contents of the distributor or accumulator and its sign may be read into the indexing register.

Since many problems require the same operations to be performed repetitively, as when processing ordered arrays of data, a large amount of address arithmetic must be done to modify instructions so that they will operate upon the proper data. Indexing registers are devices that will automatically modify addresses and greatly facilitate the necessary address arithmetic.

The disclosed index accumulators each incorporate all the characteristics usually found in index registers plus the ability to be used as separate accumulators. As accumulators, they may be used for accumulating small totals, holding group multipliers, or as small high-speed storage devices. Programming is simplified, the number of instructions required is reduced, and therefore, programming errors are reduced. Because fewer instructions are executed, the problem solution time will be less. Also the logic of a program using indexing accumulators is simpler than the logic for a corresponding nonindexed program. This, of course, eases the burden on the programmer and tends toward faster, more accurate programming.

Address modification is greatly simplified by the use of the indexing registers. For example, it is often required that the D address (comprising part of an instruction) be modified to refer to a location which is not the same as the one originally written with the instruction. The standard method is to add a constant to the D address. This method, of course, changes the original D address. The indexing register method places the amount of change in the index register. When the instruction including the D address is read from the drum into the program step register, the value indicating the amount of change stored in the indexing register is combined in said single digit adder with the D address stored in the program step register. The instruction as then executed, utilizes the data selected from the new location specified by the changed D address. Thus the original instruction stored on the drum retains its original D address but the effective address is determined by the combined value of the value stored in the indexing register and the value in the instruction representing the D address. The I address of an instruction can be altered in a similar manner.

Since every instruction is not to be altered by indexing registers, a coding method is needed which will specify an instruction which is to be modified. Also since three indexing registers are available, this coding method should specify which indexing register to use. This coding method consists of indexing the D or I address of the instruction to be modified with an increment which specifies both, that the instruction is to be modified and the desired indexing register whose contents are to be used for the modification.

If either the data or instruction address part of a program step word is to be modified, an increment is added to the respective address part to identify the indexing register to be used.

Assume that the number 1150 representing an instruction address is in the address register and various controls have been actuated by this number to locate the next instruction word and that 65 2800 6400, namely, reset add to lower accumulator 8002, is read at the location 1150 on the drum. Also assume that the A, B and C indexing registers or accumulators whose addresses are respectively 8005, 8006 and 8007 have values +0010, +0020, and −0015, respectively, stored therein.

As the instruction word leaves the drum, it passes over this selected storage data lines for storage in the program step register. At the same time that this instruction, 65 2800 6400 is delivered over these lines, a tag (or index) analysis register detects the 2 and the 6 in its D8 and D4 positions, respectively. In response to the detected tag values in the respective highest digit or thousands positions, certain circuitry is set up. When the adder is free, the program step register is operative to direct the data therein over data lines parallel by bit and serial by digit to the adder, and in this chosen example the contents of the A and C indexing registers also pass, through switching in proper consecutive sequence, to the opposite side of the adder and are added to the data supplied from the program step register. The signs of the contents of the accumulators A and C are taken into consideration. Thus the output from the adder returns the modified addresses to the program register as 65 0810 0385. In other words, the contents of A register have been algebraically added to 2800 and the contents of the C register to 6400 and the highest digit of the respective sums have been replaced by zero. This latter value is the indexed instruction for both the data and instruction addresses.

It will be noted that the data address D has been modified by adding the contents of indexing register A and the instruction address I has been modified by subtracting the contents of indexing register C. Any combination of tags at one or both addresses would work in the same manner. That is, A can be added or subtracted from either or both of the D and I addresses. The same is true for the contents in the B and C registers or any combination thereof. After the instruction has been modified and returned to the program register, it is delivered to the operation register and addresses register in the usual manner, and the next operation is performed on the data as set forth in the address registers. It is to be noted that the I address may be modified by the contents of any of the indexing registers, however, the data at the I address cannot modify the data stored in these registers.

If, for example, the effective instruction were 80 2800 6400 instead of 65 2800 6400, the 80 D and I addresses would be modified as indicated by the tags 2 and 6. When operation code 80 (reset add indexing register A) enters the operation register, the next program step directs the instruction word over the data lines, and at consecutive word times the contents of the A register is added to the data address and the sum is directed over the data lines to store 0810 in the indexing register, while the I address is modified to 0.385.

From the above it can be seen that either the I or D address may be modified by the contents of the A, B or C indexing registers or accumulators independently of any operation code and by providing the proper operation code, the A, B, and C accumulaors may be reset, added to or subtracted from, as the case may be. Indexing registers or accumulators may also be utilized for a branching operation as described specifically later.

In addition to all of the normal indexing operations, these registers each carry a sign value, and because each index accumulator is addressable, they may be utilized as part of the arithmetic operation, rather than purely an address modifier. For example, these devices are capable of accumulating small totals, holding group multipliers or act as high-speed storage devices wherein data may be utilized in the arithmetic operation without using the regular storage facilities. Also the indexing accumulators may be utilized as counters to keep track of the number of operations performed by the calculator.

If, for example, the indexing registers are to be used as multipliers, an instruction 19 8005 XXXX (19 indicating multiply) would be placed in the program step register which, at the proper time, would direct the contents of indexing accumulator A through the distributor 8001 to provide the multiplier for the multiplicand in the main accumulator to control multiplication as set forth in the Hamilton et al. 544,520. At the same time the original contents of the indexing accumulator A would remain the same for additional or later operations.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a schematic block diagram of a portion of a fixed word length digital computer having the improved indexing registers applied thereto.

FIGS. 2*a* and 2*b*, with FIG. 2*a* placed above FIG. 2*b*, represent a schematic block wiring diagram of the digital computer shown in FIG. 1 but showing in more detail the various circuits required to perform the address modification and other operations.

FIGS. 3*a* to 3*j*, inclusive, represent a schematic wiring diagram of the various controls required to operate the indexing registers in accordance with various commands.

FIG. 4 is a sheet layout of FIGS. 3*a* to 3*j*, inclusive.

FIGS. 5*a* and 5*b* diagrammatically show a logical AND or diode switch arrangement.

FIGS. 6*a* and 6*b* diagrammatically show a logical OR or diode mix.

FIG. 7 illustrates a data storing drum arranged in sectors, words, and digits and includes the pulse timing.

Figure 1:
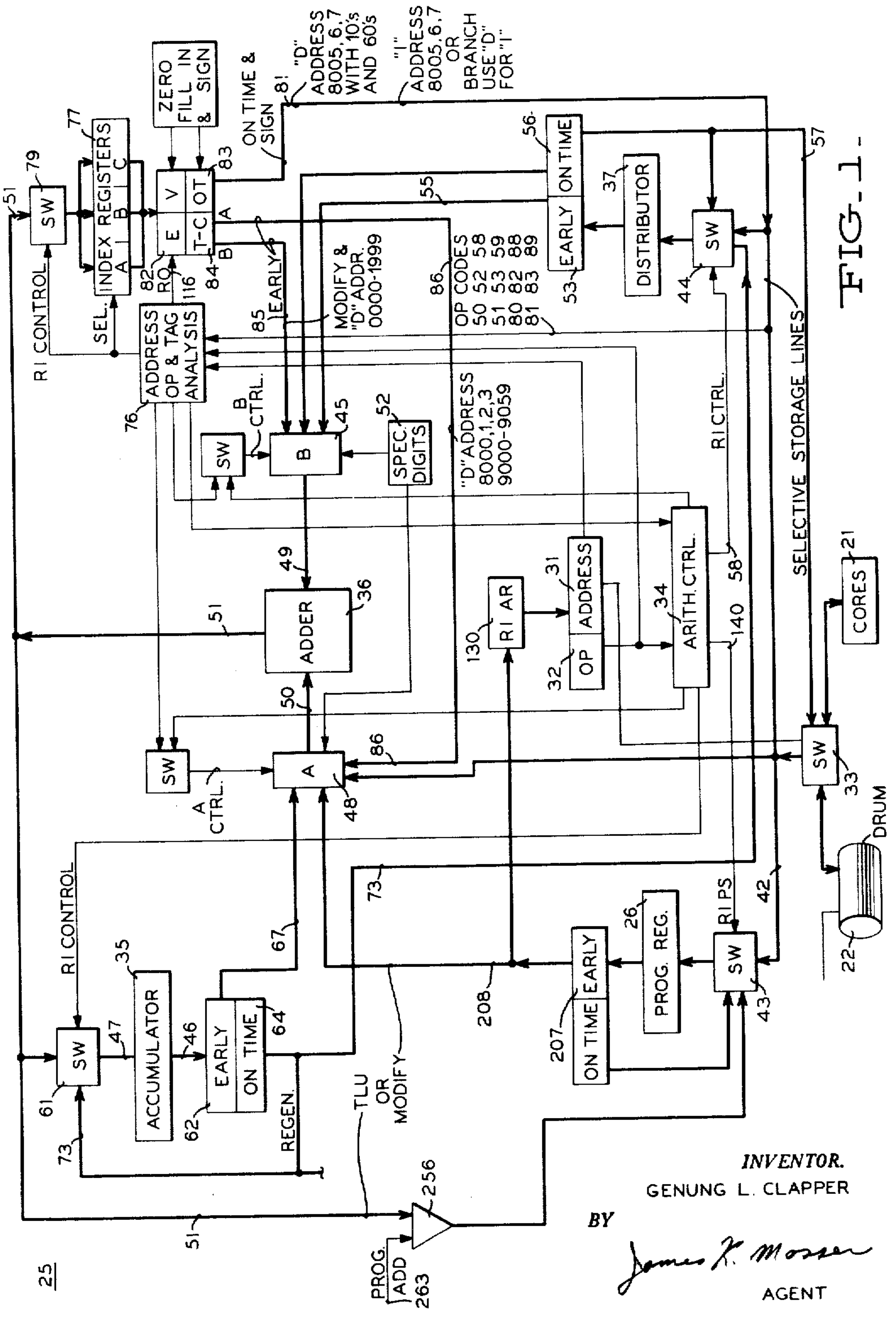

FIGS. 15 to 18, inclusive, are timing charts of the voltage levels during different types of indexing register operation.

FIG. 19 illustrates a portion of drum storage.

FIG. 20 illustrates a portion of core storage.

FIG. 21 diagrammatically indicates how the ten decimal digits are represented in biquinary code, and FIG. 22 diagrammatically indicates how the ten decimal digits are represented in 2-out-of-5 code.

TUBES AND CONTROL SWITCHES

In each of the drawings of the various control devices, the individual components or units making up that device are indicated merely as a box or block. The specific circuitry of such blocks will not be generally described as applied to various typical forms of tubes and diode circuits. A detailed description of typical diode coincident switches, diode mixes, inverters, single and double latches, along with necessary cathode followers, inverter followers, and power tubes, where required, and which would be applicable or necessary to apparatus to this type is shown and described in the above-mentioned F. E. Hamilton et al. Patent 2,959,351.

For the purpose of this description, a typical coincident switch 11, FIGS. 5*a* and 5*b*, otherwise known as a logical AND circuit or diode switch, comprises a plurality of germanium crystal diodes or the like 12, each including an individual input terminal 13 normally biased negative so that the common terminal 14 is a negative potential with respect to ground. If coincident positive pulses are applied to all input terminals 13, the potential of the output terminal 14 is raised from the positive terminal 15. However, if only one of the input terminals is pulsed positively, the potential of the common output terminal 14 is not raised appreciably. Any suitable voltage responsive device may be controlled by the potential of the output terminal 14 to furnish a usable output voltage level whenever a coincidence of positive input pulses is detected. Throughout the drawings a diode switch 11 is indicated as shown in FIG. 5*b*.

A typical mix, FIGS. 6*a* and 6*b*, otherwise known as a logical OR circuit or diode mix 16, comprises a plurality of germanium crystal diodes or the like 17. The diodes 17, employed in the mixers, are shaded and the direction reversed in the present drawings to distinguish them from the diodes 12 which are employed in the AND switches 11. As shown in FIG. 6*b*, an arc of a circle represents the diode mix 16 and is employed throughout in the drawings. Any suitable voltage responsive device is controlled by the potential of a common output terminal 18 of the diode mix, which terminal is connected by a suitable resistor 19 to a negative voltage source, not shown, to maintain a negative bias on any line extending from the output terminal 18. Each diode 17 is connected to an individual input terminal 20 which in turn is connected in the electrical circuit. If either one or all of the diode input terminals 20 are pulsed positively, the potential of the output terminal 18 is raised, which permits the tube associated therewith to conduct or operate in a predetermined manner.

Referring to FIGS. 2*a* and 2*b* and 3*a* to 3*j*, inclusive, which represent a wiring diagram of the index register control circuits, each of the component blocks or units comprising a particular circuit is labeled with a letter or combination of letters. The respective general or objective circuitry of most of the component blocks may be determined by identifying the letter-number block designation. Each particular letter combination in the component block, in addition to acting as a reference designation, also denotes the function of the component. Thus for example a typical power unit or inverter is labeled with the prefix letter I; a double inverter is labeled with the prefix letters IN; a cathode follower is labeled with the prefix letters CF; an inverter follower is labeled with the prefix letters IF; and the various combinations or inverters, double inverters and cathode followers which are connected in a particular manner are labeled latches. These latches may be of the single or double type and are fully described in the above F. E. Hamilton et al. Patent 2,959,351.

Hereinafter in the specification wherein a conductor or circuit terminal or the like is referred to as being positive or negative in potential, this does not necessarily mean that the point in question is positive or negative in an absolute sense but more positive or more negative relative to its previous state. This principle also applies to any description wherein positive or negative pulses are mentioned or referred to as up or down, or raised or lowered.

Generally, an inverter or amplifier unit I comprises a triode having its cathode connected to ground. An inverter, as its name implies, is adapted to invert a signal. Thus as its grid terminal shifts positive, the triode conducts more heavily, and the associated plate output terminal shifts negative. Similarly, if the grid terminal shifts negative, the output terminal shifts positive. A double inverter comprises a pair of triodes connected in a similar manner; however, if the first grid terminal shifts positive, the first triode conducts more heavily so that the first plate output terminal shifts negative. This negative shift is coupled by a suitable resistance network to the second triode grid, and the associated plate output of the second triode shifts in the same direction as the first grid terminal.

The cathode followers CF have a relatively low cathode resistor, and as a result the cathode output terminal serves as a low impedance signal source and may be loaded appreciably without substantially affecting the magnitude of the signals supplied therefrom. This is the main purpose of the cathode follower unit. Also the cathode follower rapidly follows the voltage shift of the input terminal to the grid so that the resultant shift in potential of the output does not appreciably lag the voltage.

While no specific cathode follower is shown, it is to be understood that various types may be utilized in different locations, and the circuits may involve various resistance values and capacity couplings to produce the desired outputs. Since the particular cathode followers and inverter followers used are not part of the invention, a detailed description of each possible type is not deemed necessary. Likewise, in the drawings the major portion of the cathode followers, double inverters and the like which would normally be required to maintain the proper amplification and signal level have, for the purpose of simplicity, been eliminated. The type and number and particular location would depend upon the power requirements and results desired. Also voltage levels and the like can be varied from case to case to meet various operating conditions for different equipment.

For the sake of simplicity, details of the necessary driving rings, single and double latches have been eliminated. Generally, a single latch comprises a double inverter and cathode follower which responds to an input signal to raise the output of the cathode follower. The cathode follower output in turn supplies the desired signal and has a feed-back leading to the input to maintain the cathode follower conducting. The latch is turned OFF by interrupting the latch back signal. A double latch is similar to a single latch with the exception that a single inverter and cathode follower section provide a negative output in response to a positive input. The negative output of this section is applied to the second latch section to maintain the latter output positive. The latch is maintained by directing the positive output from the second section to the first section. A positive pulse directed to the second section drops or returns the first section to its original condition. One of the sides having the normally conducting inverter is considered the off side. A more detailed explanation is provided in the above Hamilton et al. Patent 2,959,351, and latch apparatus of the above type is shown and claimed in E. S. Hughes, Jr., Patent 2,628,309, issued February 10, 1953.

Figure 2A:
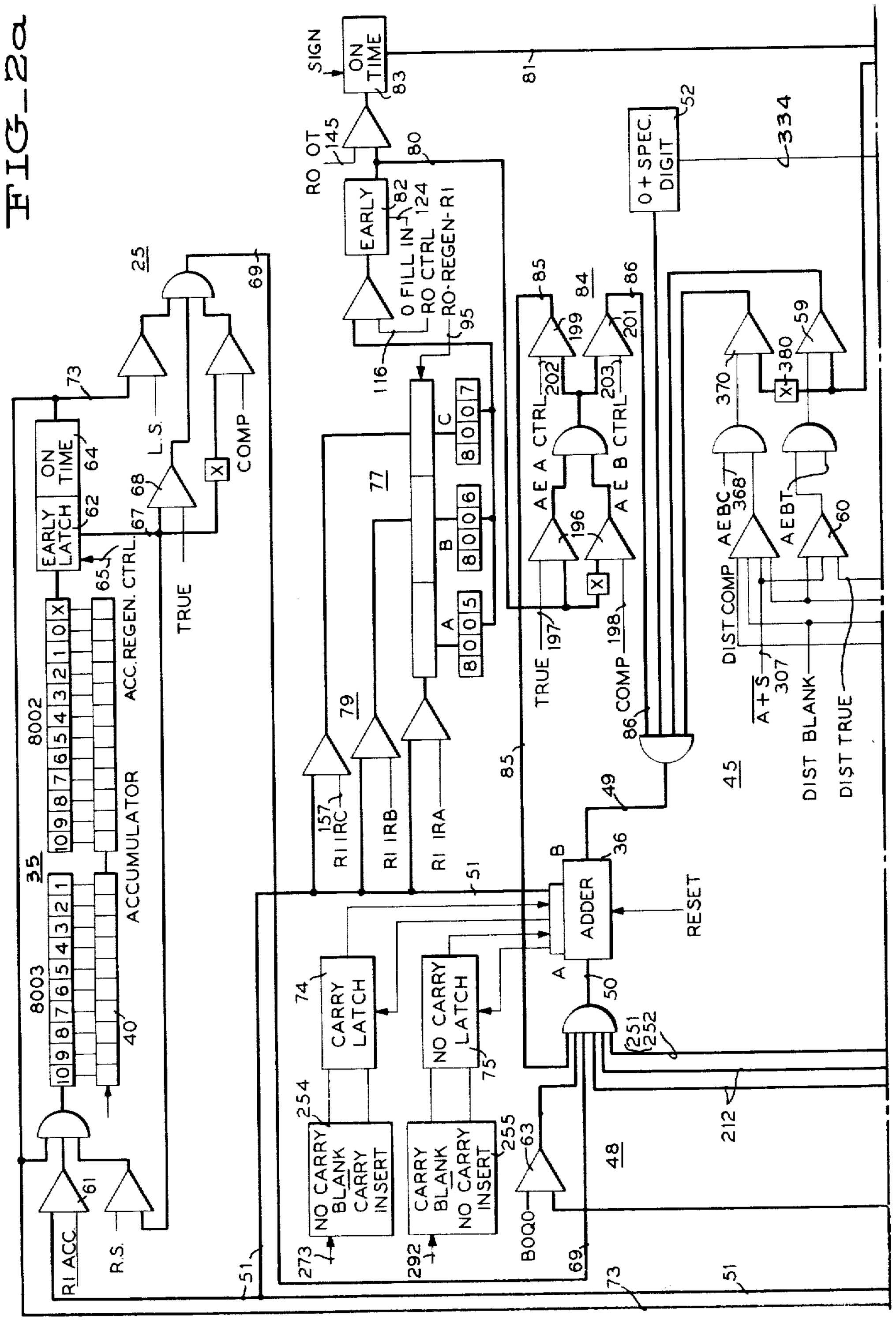
Figure 2B:
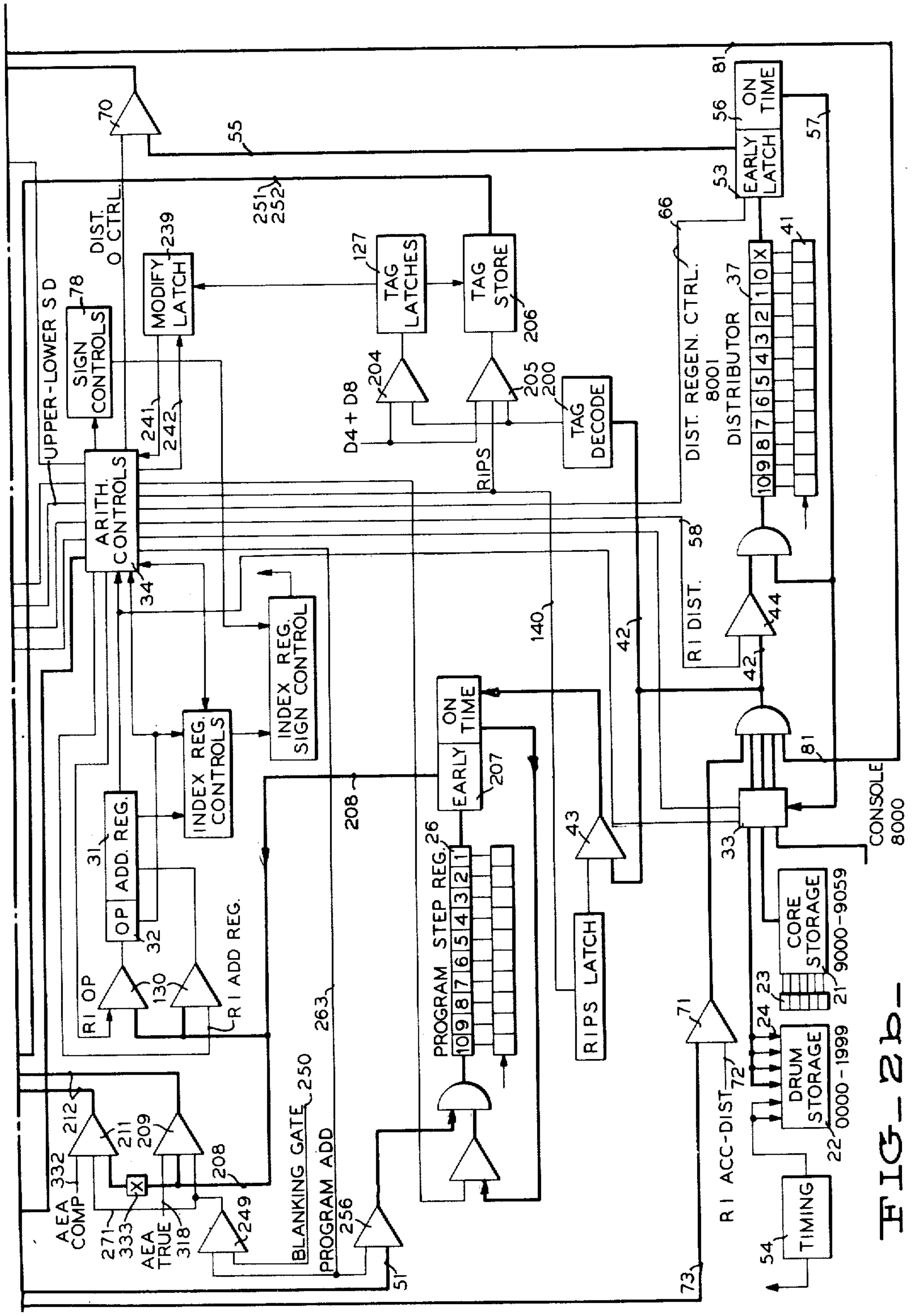

In FIGS. 1, 2*a* and 2*b*, a series of single connecting lines are shown leading to and from the various blocks. It is to be understood that the major portion of these single lines actually embodies a plurality of lines and that single lines are shown as a means for simplifying the drawings. The heavy shaded lines represent the data transmission lines between the blocks, while the lighter shaded lines are primarily control lines for selectively directing the data from one location to another. In addition, where a single switch is shown in these lines, an array of switches would be utilized for selectively gating the data.

It is to be understood that various timing pulses, most of which are not shown, and additional switching and the like, not shown, would be required to transfer the data to and from the various components making up the calculator. However, these additional elements, if shown, would merely complicate both the description and drawings without aiding in the understanding of the invention. Therefore, for the sake of simplification, all elements not bearing directly to the improved index register system have been eliminated.

TIMING PULSES AND GATES

Figure 18:
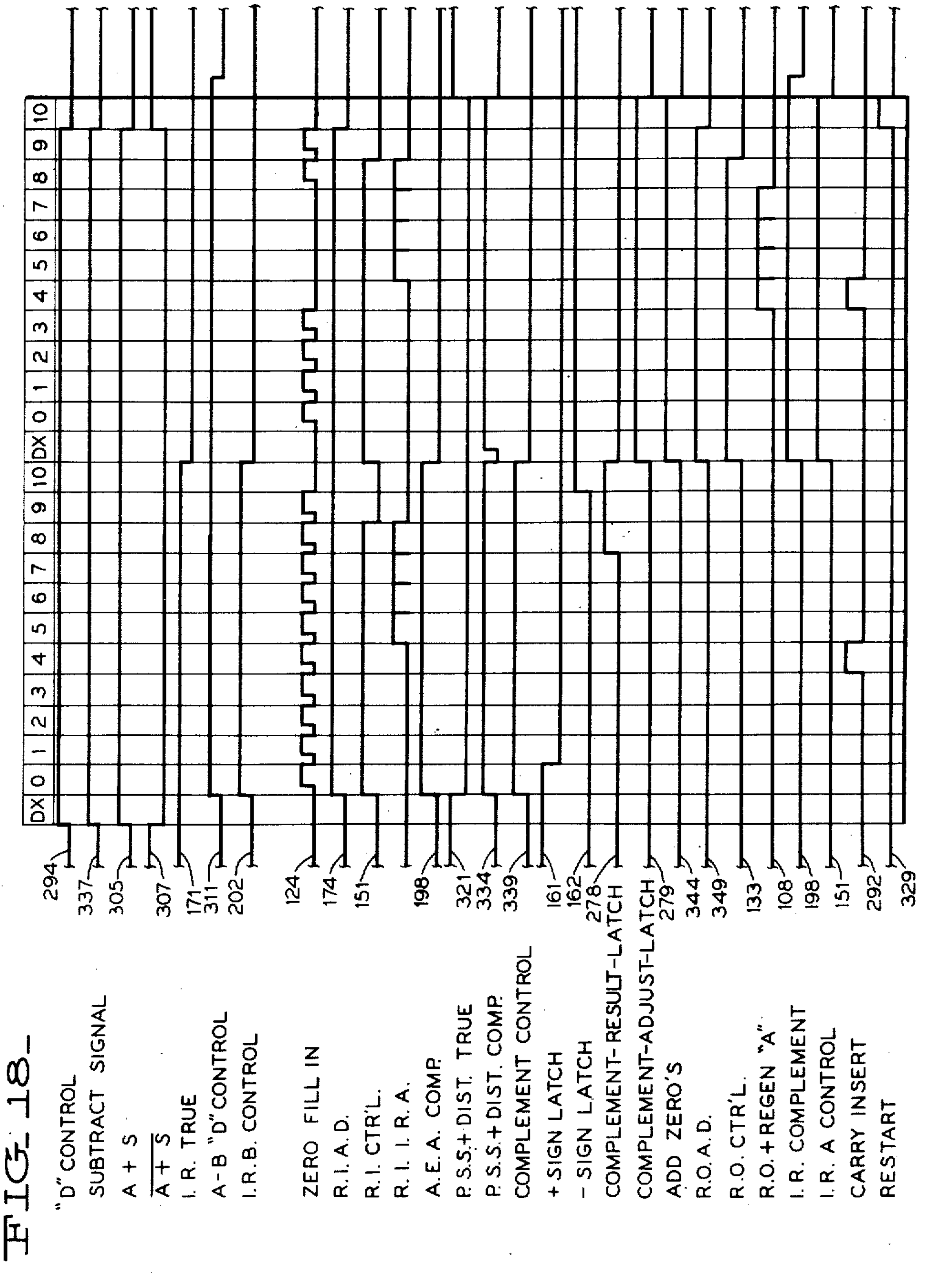

Information is recorded in buffer or core storage 21, FIGS. 1, 2*b* and 19, and general storage 22, FIGS. 1, 2*b* and 18, by switching information gates with timing pulses to produce a specifically timed information pulse for energizing driving rings 23 or read/write heads 24. Information is read from magnetic storage by switching a shaped, read signal with a timing pulse to produce a specifically timed information pulse which can be used in turn on any suitable latch whose output will be an information gate similar in duration and timing to the one originally used in recording the spot or bit.

Timing pulses determine the position of a spot or bit when it is placed on the drum 22 or in core storage 21 and also insure that information read from the drum or core storage is available in the form of a properly timed information gate. In a similar way, other necessary drum timing divisions are established by timing pulses such that the exact position of the drum is known by the computing and control circuits at all times.

FIG. 7 shows the principal drum timing divisions. All drum times are with relation to a "home" position 39 which, in this instance, is the beginning of sector zero. Other drum divisions are sectors (five per revolution), words (fifty per drum revolution), digits (six hundred per revolution), and A, B, C, and D pulses, one for each digit or six hundred each per revolution.

The basic timing interval is an eight microsecond digit interval of which there are six hundred around the circumference of the drum. Each digit interval is divided into four equal pulse intervals, A, B, C, and D. The beginning of a digit timing interval is marked by the leading edge of an A pulse. The B, C, and D pulses of a digit follow at two microsecond intervals. Twelve digit intervals are included in a word interval. The twelve digits of each word are successively DX, D0, D1, D2, D3, D4, D5, D6, D7, D8, D9, and D10. Digit DX is used as a switching interval between successive words. Digit D0 is the sign storage time and digits D1–D10 represent the serial time space intervals of the storage of the first through tenth position digits of a ten-digit number. Ten word intervals are included in each sector, and five sectors make up the entire cycle of drum timing.

Just as the beginning of a digit interval is marked by its A pulse, pulses must be available to mark the beginning of each word, sector and home interval. These basic timing pulses may be obtained by reading permanently recorded spots on the drum's timing tracks.

The six basic timing tracks are (1) home pulse, (2) sector pulses, (3) word pulses, (4) B pulses, (5) D pulses, and (6) read sample pulses.

The other necessary timing pulses and gates may be obtained from single shot multivibrator or latch circuits, not shown, actuated by these basic pulses and/or other manufactured pulses.

The following partial list defines terms used to describe timing pulses and gates and generally describes the pulses and gates used in this application:

Bit—smallest unit of information. A bit usually represents any one element of the seven element biquinary code, FIG. 20, or of a five element generla storage code, FIG. 21.

Digit (D)—elements of a biquinary or five element code representing one decimal number, one of twelve intervals of a word. Bits representing a digit are present simultaneously within a time interval of eight microseconds. A valid digit code designation contains only two positively identified bit elements per digit.

Home (H)—a recorded spot on the drum which is a reference point for all timing signals.

Microsecond—one millionth of a second.

Word (W)—a combination of twelve digit intervals representing the smallest addressable storage unit of information. A word contains ten digits (D1–D10) representing numerical information plus one digit (D0) indicating sign, plus one digit (DX) allowed for switching interval between words.

Pulse (P)—basic timing signal usually about two microseconds duration. Most pulses are obtained from permanently recorded signals on the drum which are amplified and shaped. Some pulses are generated from other pulses.

Gate—any signal not labeled pulse is assumed to be a gate and has no basic duration. Any created timing signal usually over two microseconds in duration which represents an exact timing signal between two pulses is defined as a gate. Gates are usually created by switching certain timing signals or by timed control of latch circuitry.

"A" pulse (AP)—a positive pulse, two microseconds duration, occurring during the first quarter of a digit interval. A pulses may be produced from a one-shot multivibrator which is controlled by the leading edge of a delayed early A pulse and the leading edge of a negative B pulse.

"B" pulse (BP)—a positive pulse, two microseconds duration, occurring during the second quarter of a digit interval. B pulses are obtained from permanently recorded signals on the magneitc drum.

"C" pulse (CP)—a positive pulse, two microseconds duration, occurring during the third quarter of a digit interval. C pulses are produced from a single-shot multivibrator controlled by the trailing edge of a negative B pulse and the leading edge of a negative D pulse.

"D" pulse (DP)—a positive pulse two microseconds duration, occurring during the fourth quarter of a digit interval. D pulses are obtained from permanently recorded signals on the magnetic drum.

Pulses that occur just prior (less than two microseconds) to a designated pulse time are defined with a prefix E meaning early. Early pulses are often used to compensate for time lost between stages of electronic circuitry which requires an output at a certain designated pulse time.

Early A pulse (EAP)—a positive pulse, two microseconds duration, designed to occur approximately one-half microsecond prior to an A pulse. Early A pulses are obtained by delaying B pulses. Six hundred per drum revolution, eight microseconds apart.

Early word pulse (EWP)—a positive pulse, two microseconds duration, which occurs at early A pulse time every twelfth digit. Early word pulses are obtained from permanently recorded signals on the magnetic drum and are associated with DX, the first digit time of every word.

Word pulse (WP)—these pulses, two microseconds in duration, are obtained by delaying their respective early pulse approximately one-half microsecond so that these pulses occur at A pulse time.

Negative timing pulses are signified with a prefix "N". Negative pulses are obtained by inverting normal pulses. A negative pulse, therefore, has a positive voltage level, except during the designated pulse time. For example:

NAP—negative A pulse
NDP—negative D pulse
NEAP—negative early A pulse
NEWP—negative early word pulse
NWP—negative word pulse
NLRP—negative latch reset pulse. A negative pulse approximately one microsecond duration which occurs at the beginning of A time. This pulse is obtained from a one-shot multivibrator triggered by an A pulse. This pulse is used to control the reset of some of the latches.

Digit gates are initiated at A time but are considered ON only from B time of the designated digits to A time of the following digit.

DX—switching digit gate
D0—sign digit gate

Digits 1 through 10—digits designated for numerical information. Digit 1 represents units position, digit 10, high order position.

D1–D2—a gate providing digit gate 1 and 2 only.

D3–D10—a gate providing digit gates 3 through 10 only.

D1–D10—a gate providing all digit gates except D0 and DX.

GENERAL DESCRIPTION

Referring now to FIG. 1, there is disclosed a data processing machine or calculator 25, which is provided with the magnetic drum or the like 22 for storing a large quantity of data as magnetized spots on the surface or a core storage 21. A program step storage device or register 26 is provided for storing a single program step or word 27, FIG. 14.

The program step or instruction word 27 is a ten-digit word divided into three portions: a four-digit data address or D portion, D8–D5, for instructing the calculator where data to be processed is located in the core storage 21 or the drum storage 22 or other addressable locations; a two-digit operation portion 29, D10—D9, called an OP code, for instructing the calculator what operation or process the calculator is to perform with the data found at the address indicated by the D portion 28; and a four-digit instruction I address portion 30, D4–D1, for instructing the calculator where the next program step word 27 is located in the storage.

Figure 14:
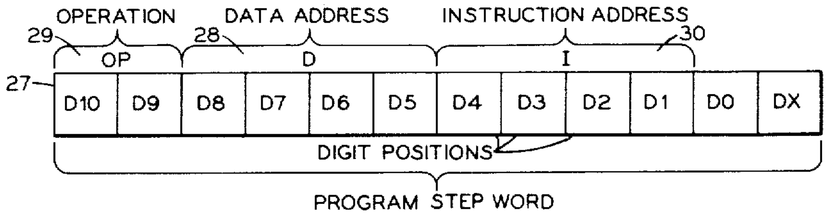
FIG. 14 illustrates the components of a program step or instruction word designates the respective digit positions.

An address register 31, FIGS. 1 and 2*b*, and an operation register 32 are provided for receiving the address portion 28 and the operation portion 29, FIG. 14, respectively, under the control of switching 130, from the program register 26, FIG. 1. Switching circuitry 33 is provided under the control of the address register 31 for selecting any storage position on the drum 22 or any other storage device associated with the calculator in accordance with the value stored in the address register. Switching circuitry 34 is also provided under control of the operation register 32 for determining the operation the calculator is to perform on the data found at a selected address position. In FIGS. 19 and 20 portions of the drum 22 and core storage 21 show the same divided into addressable storage locations.

After a data address is selected and the data found at that address is operated upon by the calculator, the instruction address portion 30 of the program word 27, FIG. 14, is entered into the address register 31, FIGS. 1 and 2*a*, from the program register 26 to replace the data address value previously in the address register. A new program step word 27 located at the address in storage corresponding to the instruction portion 30 of the program step now in the address register 31 is selected and transferred into the program register 26 to replace the value previously stored therein. Thus large numbers of program values and large amounts of data may be stored on the magnetic drum 22, for example, and the sequence of the above-outlined procedure may automatically continue for a large number of program steps. A stored sequence of such instruction words forms a program routine.

Figure 13:
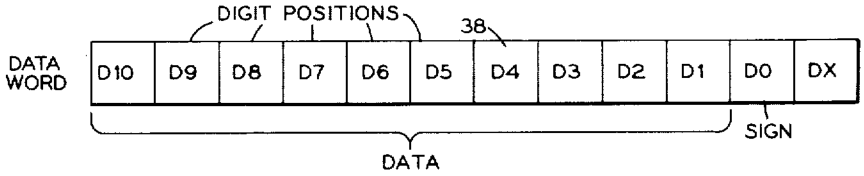
FIG. 13 represents a data word or operand and designates the respective digit positions.

An accumulator 35, a one-digit matrix adder 36, and a distributor 37 are also provided in the calculator as well as circuitry for introducing machine developed values to be added. With respect to the above elements, one form they may assume is completely shown and described in the above-mentioned Hamilton et al. Patent 2,959,351. The calculator is provided to handle a plurality of digits D10–DX grouped to define a word of data. As shown in FIG. 13, a word (W) of data or operand 38 consists of ten data digits and an algebraic sign. The words are stored serially on the drum 22 or in core storage 21, and as shown in FIG. 7, the digits of a word are stored serially within each word interval. Numeric data are represented by parallel combinations of magnetically stored bits, one form of code being shown in FIG. 22. This figure shows how a 2-out-of-5 code combines different binary 1 indications from 2-out-of-5 parallel devices to represent each of the ten decimal digits.

FIG. 21 shows how a biquinary code combines different binary 1 indications from two of seven parallel devices to represent each of the ten decimal digits. Information is thus said to be stored parallel by bit, serial by digit and word. While various coding systems may be devised, in this particular embodiment, the storage units utilize 2-out-of-5 code and the arithmetic units use the disclosed biquinary code, where the respective presence of two of seven or two of five possible parallel stored or appearing bits determine the digits decimal value.

The calculator can add, subtract, multiply or divide and make logical tests such as plus, minus and zero accumulator balance. All of these arithmetical and logical operations are built into the machine. They are activated by the operation code portion 29 of the instruction word 27, FIG. 14. The calculator will accumulate ten digit words, and the sign control on all operations is automatic.

The arithmetic units of the calculator are designed to handle numbers in a serial fashion. Thus during calculations, the ten digit words are processed by the arithmetic units on a digit by digit basis with machine time progressions from the units digit to the highest digit in the word. The basic cyclical timings of the machine are therefore related to digit position rather than digit value. In the arithmetic portion of the machine, the value of a digit is determined by simultaneous combinations of bit pulses on two of the seven parallel information lines. Successive indications comprising respectively the various combinations of two of the seven tracks, during successive digit time intervals, will indicate serially the respective decimal values of the digits of a word.

In the case of the arithmetic units 35 and 37, the parallel binary devices may be binary capacitor storage units or the like, not specifically shown. In this manner, seven parallel capacitors, arranged in a row, are utilized to represent in different combinations each digit position of a word. Each row is tested at its digit time by pulses from related drum driven timing rings 40 or 41, FIGS. 2*a* and 2*b*, respectively. Binary 1 indications from certain two of the seven capacitors will indicate the decimal value of that particular digit position.

The biquinary system requires that there be a 1 indication by one and only one of the binary indicating devices, in each, of the two levels. The binary level indication determines whether the quinary level indication is to be read as it is or have 5 added to determine the decimal value. This above or below five characteristic of the system makes it essentially adaptable to checking in calculating circuitry. Thus during operating conditions at each digit time, two of the data lines conduct bits while the other five lines remain down.

At the time of readout, each digit position of the major functional units provides a definite value of the readout circuitry for each stored bit position. However, after readout, when the capacitor storage unit is required to retain its information for several word intervals, each cell must be regenerated once each word time.

The principles of this capacitor storage are described more fully and claimed in the copending application of Lloyd L. Haug and Charles W. Allen, Serial No. 445,221, filed July 24, 1954, now Patent Number 2,823,369, issued February 11, 1958, and assigned to the present assignee. However, it is to be understood the storage means described is only given by way of example. Any storage means capable of delivering and receiving the data parallel by bit and serial by digit in the desired sequence would, with relatively minor modifications, be applicable.

The storage drum 22 is provided with bands of data and includes the magnetic head pickup devices or the like 24, FIG. 7 which are selectively operated to read and write information. The words of data may be arranged on the drum in addressable storage locations, as shown in FIGS. 7 and 19 as previously described.

While both the program step register and the distributor 26 and 37, respectively, FIG. 1, are capacitor storage units and are capable of receiving information from a common storage exit channel or selected storage data lines 42, the switching 43 leading to the program register 26 is only open on an I half cycle, while the controlling entry 44 into the distributor 37 is only open on a D half cycle.

The distributor 37 acts as a buffer between the accumulating components 35 and addressable storage locations. Its main functions are to receive a word of data from a selected data address and make this word available to the accumulating circuits as required by the operation or to receive the word of data from the accumulating circuits or console switches, not shown, and make this word available for entry into a selected storage location. The distributor is also an addressable storage location and can be used as a source of information through selected storage switching.

The capacitor storage units read their stored information out continuously during each drum word interval. This is done by driving the digit positions of the unit with drum timed digit pulses from the drum driven digit rings 40 and 41, FIGS. 2*a* and 2*b*, respectively. Each capacitor storage unit has a one-digit early output and an on-time output. This is accomplished by driving each digit position of the unit with a drum timed digit pulse, one digit time in advance of the digit position of the storage unit. Thus the digit 1 position D1 of the unit 37 is read out at digit 0 drum time, digit 2 of the unit is driven at digit 1 drum time, etc. Each early output is then delayed for one digit interval to provide an additional on-time output. Either output may be used, depending upon the desired operation.

Since such capacitor storage units in the program register, accumulator and distributor, 26, 35 and 37, respectively, are nonsustaining type of storage; that is, each position requires periodic regeneration of its stored information, regeneration is accomplished within the unit by providing a data flow path between the outputs of the respective unit and its input circuits. Thus information which is available from digit 1 position D1 at digit D0 drum time is read back into the digit D1 position at digit D1 drum time, etc., as long as the regeneration path is closed. Reading new information into a unit merely requires that the regeneration path be opened and that on-time output signals from the desired source be substituted at the storage unit input circuits in place of the on-time output signals being fed back to the input from the particular unit being read in. This is done whenever the input switching to the capacitor storage unit is activated.

FIGS. 1, 2*a* and 2*b* show data flow paths from the outputs of the capacitor storage units. The information contained in the capacitor storage units is continuously presented serially, digit by digit, on these flow paths. The data flow path from each of the units connects to the input switching circuitry of various other calculator units; that is, the distributor on time output and early output both connect to adder entry B switching 45, and the on time output to the general storage entry switching 33, to mention but two. Reading information out of a capacitor storage unit merely requires that the entry switching for the desired receiving unit be opened for just the word time necessary to gate through the succession of output digit pulses representing the stored word.

The accumulator 35 is also a capacity storage unit similar to the program register and the distributor 26 and 37, respectively, except that it has a two-word capacity. The serial-digit signals of each word are available at their early and on-time drum digit times, once every alternate word interval. The accumulator is divided into lower and upper halves addressable as 8002 and 8003, respectively, for programming and calculating purposes, the low order, ten digits, form the lower accumulator section 8002 and the high order, ten digits, form the upper accumulator section 8003. Hereinafter, when the lower and upper accumulator is referred to, in connection with digit positions therein, the digit will carry the suffix L or U, indicating lower or upper accumulators.

Information in the lower accumulator 8002 is continuously available during each even numbered drum word interval, while the upper accumulator 8003 is continuously available during each odd numbered drum word interval. In the figures, the data flow paths are shown from the accumulator output 46 to its own input 47, to the A entry 48 of the adder 36, and via switch 44 to the distributor 37. Transfer of information from either half of the accumulator to one of these destinations is accomplished by controlling the readin switching of the receiving unit, which is opened for the proper even or odd word time, during which time the output of the desired half of the accumulator is gated through the receiving unit.

The main function of the accumulator 35 is to work with the single digit adder 36 in accumulating sums, products and quotients and performing shift operations. It also can function as an addressable source of information to supply an instruction word or a data word for programming purposes.

The single digit matrix adder 36 is a diode and tube unit capable of receiving two of seven bit input digit values, analyzing them, and then producing a two of seven bit digit output signal equal in value to the sum or difference of the two input values. Digits from the program register, distributor and the accumulator can enter the adder 36, the distributor digits on input lines 49 via the entry B and the program register and the accumulator digits on the other lines 50 via the entry A. The seven bit output from the matrix adder is delivered over the output data lines 51 and is stored back into the accumulator 35 or in the program step register 26, as required. A delay of one digit time is incurred between the input and output from the adder. An output will be available from the matrix adder only as a result of the entry of two out of seven bit input digits, one on each of the data input lines 49 and 50, respectively.

Provision is also made in certain operations for blanking the distributor or accumulator digit values and substituting zeros or constants for entry into the matrix adder, by means of special digit entry switching 52. Most calculator operations are performed by merging distributor and accumulator digit values or their substitutes in the matrix adder 36 and storing the result back in the accumulator. However, under conditions to be hereinafter described, the contents of the program register 26 are directed to the adder during certain operations. In most arithmetic operations the distributor and accumulator early outputs are used to produce an on-time adder output for the accumulator to store. In other operations, such as shifting, the on-time outputs may be used. By various combinations of operation codes, the data to be processed is manipulated as instructed to obtain the desired results.

Associated with the output side of the distributor 37 are early latches 53 which are operative in timed relation with timing pulses sent from suitable timing means 54, FIG. 2*b*, to direct the data read out of the distributor 37, parallel by bit and serial by digit, over data lines 55 to the adder via switching 45 at the B entry, and to on-time latches 56 and over data lines 57 to the storage switching or for re-entry into the distributor through switching, on a regeneration cycle. The direction the operand or data word 38, FIG. 12, takes is dependent upon the operation desired. For example, if the operand or any portion thereof is to enter the adder 36, the switching 45 is actuated to permit the data delivered over the line 55 to enter at the appropriate timed interval. Should it be desired to place the operand in storage, the output from the early latches 53 is directed through the on-time latches 56 over the data lines 57 to the switching 33, and the operand is placed in storage at the location specified by the address register 31. During the arithmetic operation, the value in the accumulator 35 is destroyed or blanked in order to receive the output from the adder.

While the data stored in the distributor 37 is fixed with respect to shifting within the register, it is possible to shift the data in the accumulator 35 either right or left as desired or required.

Referring to FIGS. 2*a* and 2*b* for a brief description of the normal calculator operation, an operand at a particular address in the storage device 22, FIG. 2*b*, is directed, under control of an operation code resting in the operation register 32, and an address in address register 31 to place the word of data via the distributor 37 and matrix adder 36 in the upper or lower accumulator 35, FIG. 2*a*. While there are many possible operation instructions, it will be assumed for the purposes of this description that a reset load upper accumulator operation instruction is initiated. Under these conditions, the data at the selected address is read by the appropriate read/write heads or transducers 24, FIG. 2*b*, passes through the selected switching 33 over data lines 42 to a store in distributor switch array 44 which has been conditioned by a readin distributor line 58. The data is read into the distributor 37. At the next upper word time, the data is delivered from the distributor one digit early, serial by digit, to the early latches 53. The early latch outputs direct the data over the output lines 55 via switch 70 and through a true add diode switch array 59, FIG. 2*a*, which has been conditioned by the output from the on side of a distributor true add switch array 60. From the switch array 59, the data is delivered to the B entry of the single digit adder 36. A one-digit delay occurs in the adder, and the output therefrom extends over the data lines 51 through an accumulator readin switch array 61 and is stored in the upper accumulator 8003 serial by digit in the same order.

During this time, any data in the lower and upper accumulator is destroyed or blanked by preventing read out of the accumulator early latches 62 while an add zero diode switch array 63, under direction of the arithmetic controls 34, FIG. 2*b*, adds zero to the A side of the adder 36, FIG. 2*a*. Regeneration of the previous data in the accumulator is blocked from the regeneration on-time latches 64, FIG. 2*a*, by dropping the accumulator regeneration control line 65. Thus any previously stored data is destroyed, and the data at the specified address is placed in the upper accumulator as directed.

The next instruction may be an add accumulator upper operation; that is, the data at a specified address is to be added to the data in the upper accumulator 8003. At the proper time, the desired data is delivered to the distributor 37, FIG. 2*b*, through the readin switching 44. The previous data in the distributor is destroyed by operating a distributor regeneration control line 66.

At the next lower word time, the data from the lower accumulator is fed through the early latches 62, FIG. 2*a*, over early output data lines 67 to a true add switch array 68 and over data lines 69 to the A side of the adder. While the distributor output is delivered in synchronism by means of its driving ring 41, FIG. 2*b*, the distributor switches 45, FIG. 2*a*, are down and delivery to the adder is blocked by dropping the distributor zero control switch array 70, FIG. 2*b*. However, zeros are entered for each digit position at the B entry under an add zero cycle from the special digit add switching 52, FIG. 2*a*. This provides a validity check arrangement and adds zero values to permit proper adder operation. In this manner the data in the lower accumulator is returned unchanged to the same digit positions.

During the following upper word time, the accumulator driving ring 40 now delivers the data in the upper accumulator 8003 one digit early, serial by digit, and the distributor ring 41, FIG. 2*b*, delivers the data thereat in the same manner. Under these conditions, the true add switching 59 is conditioned, and the data from the distributor is added digit by digit with the data in the upper accumulator delivered over the data line 69, FIG. 2*a*. After a digit delay, the sum is stored in the upper accumulator. Of course, the original data in the upper accumulator is blanked at this time by dropping the regeneration line 65. However, the data in the distributor 37 is regenerated by passing from the early latches 53, FIG. 2*b*, to the on-time latches 56 serial by digit which in turn delivers on time the previously delivered data back for storage in the same digit positions. Thus the data in both the accumulator and distributor is retained therein until modified by the next instruction. Regeneration of the data is accomplished by continuously driving the distributor and the accumulator rings 40 and 41, respectively. Each word time the data in the distributor 37, FIG. 2*b*, is read out and regenerated as described above and more specifically set forth in the Hamilton et al. Patent 2,959,351. The accumulator 35, FIG. 2*a*, is regenerated each two word times by driving the ring 40 in consecutive order from lower to upper accumulator, as previously explained. Thus once for each two words, the data in either the lower or upper accumulator is available for processing.

In order to transfer data from the upper accumulator to the distributor 37, FIG. 2*b*, a readin distributor diode switch array 71 FIG. 2*b*, fed by the accumulator output 73 is conditioned at the proper time by a readin accumulator distributor signal from accumulator control line 72. The data leaving the readin accumulator distributor, FIG. 2*a*, passes through the early and on-time latches 62 and 64, respectively, and is directed over the data lines 73 to the distributor 37 via diode switch array 71, FIG. 2*b*. The output from this switch array directs the data serial by digit for storage in the distributor 37. During this interval, the distributor regeneration switching control line 66 is operated to prevent the regeneration of the readout data in the distributor.

As diagrammatically shown, there is provided a plurality of switches, mixes, latches and gates associated with the adder, accumulator and distributor and other mechanisms or components which are utilized to conduct data to and from and within the calculator. The particular use of the various elements will be hereinafter more fully described when referring to the detailed circuitry for performing the indexing register operation. It is to be understood that the calculator comprises many other components, not shown. Also that, for example, where a single latch, gate or the like is shown in a data line, there would actually be seven such latches, gates or the like, one for each bit position or line. However, some latches, for example, carry and no-carry latches 74 and 75, respectively, FIG. 2*a*, are single latches. The actual number of latches required for each location along with a number of diodes in each switch are shown in the Hamilton et al. Patent 2,959,351.

Generally, a latch is up for one or more word times, while a gate may be a latch which is up for some predetermined time and usually lasts for two or more pulses or bits but for the most part is active for less than one complete word time.

In performing operations in a calculator of the above type, certain control circuitry is required as indicated by the block 76 in FIG. 1. The controls encompassed by this block have been shown diagrammatically in FIGS. 3*a* to 3*j*, inclusive. In the latter figures a plurality of terminals have been provided. All of the terminals to the left of a related component or element indicate that the control pulse or value delivered thereover is being received from the calculator proper at the appropriate timed interval. All of the terminals disposed to the right of a related component or element indicate that the output from such terminal, when required, is directed to some portion of the calculator to control the same during certain phases of the operation. The various input and output lines will be hereinafter enumerated and located on the drawings of the above-mentioned Hamilton et al. patent. For the purposes of simplicity, the following circuit description is being generally confined to the use of a calculator incorporating indexing registers or accumulators, diagrammatically shown at 77 in FIGS. 1 and 2*a*.

In addition, the detailed circuitry associated with the distributor and accumulator sign analysis and control 78, FIG. 2*b*, has also been eliminated. This has been done to avoid overcomplication and because the sign analysis is carried by a separate portion of the calculator and is not utilized in the distributor or accumulator proper. This circuitry merely operates to determine whether the true or complement latches or gates leading to the adder are to be operated and to provide a means for complementing the data entering the adder from the program step register 26.

In the foregoing, a standard calculator operation is briefly described, and it is to an improved operation of a calculator of this type that the invention is directed. As mentioned, the means for accomplishing this improved operation is the use of indexing registers or accumulators 77. As shown, there have been provided three indexing registers or accumulators indicated as A, B, and C, FIGS. 1 and 2*a*. Physically, these indexing registers are connected to the adder output data lines 51, and any data may be selectively gated to any of the registers as desired through selective readin switching 79. The output from the registers may be directed over data lines 80 and 81, associated with related early and on-time readout switching 82 and 83, respectively.

The output delivered over the early data lines 80, FIG. 2*a*, is directed through switching 84 which is selectively operated to deliver the contents from the indexing register early outputs to the A or to the B entry of the adder 36 over data lines 85 and 86, respectively, as desired in either true or complement form. The data appearing on the on-time data lines 81 is directed to the input of the program step register 26, FIG. 2*b*, or the distributor 37 from which the data is delivered as desired to any storage or addressable location. With an arrangement of this type, it can be seen that data may be read in or out of any of the indexing registers, either early or on time, and the early output may be supplied to either side of the adder 36 in true or complement form, as required by the operation code.

Figure 12:
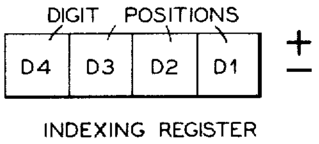
FIG. 12 represents a four-digit indexing register data word plus sign.

As indicated in FIG. 12, each indexing register retains four decimal digits D4–D1 and an associated algebraic sign. Factors may be added to or subtracted from the contents of any of the indexing registers A, B or C or new factors may be inserted in an indexing register by reset add or reset subtract operations applied thereto. It is possible to test each indexing register for a zero or nonzero or for a positive or negative state as part of branch operations. Each indexing register is addressable so that its contents may be used as a factor in ordinary arithmetical operations not involving address modification. The primary use of the indexing register, however, is to modify addresses of instructions automatically.

The addresses assigned to the indexing registers are as follows:

| Indexing register: | Address |
|---|---|
| A | 8005 |
| B | 8006 |
| C | 8007 |

These addresses may be used as the instruction address I of any instruction or as the data address D of the following operation codes only: 00—02, 10—11, 14—19, 30—49, 54, 60—61, 64—69, 90—99. The use of 8005, 6 or 7 as the data address D of any other operation will cause a storage selection error. When one of these addresses is used as an instruction address or as the data address of a branch instruction, the next operation executed will be a no-op whose instruction address is represented by the contents of the indexing register addressed. For example, suppose indexing register A contains +1234 and the operation 6501008005 is given. Following the reset add operation (65) 0000001234 will be entered into program step storage 26, FIG. 2*b*.

Data address 8005, 6 or 7 may be used with operation codes 00 (no op) and 01 (stop); however, no action takes place because these operation codes do not use any data address. Because the shift instructions use only the units digits of the data address, an 8005, 6 or 7 data address in shift codes 30, 31, 35 and 36 cause normal shifting of 5, 6 or 7 places.

The use of these addresses 8005, 6 or 7 as the data address of any of the other permissible instructions will cause the contents of the specified indexing register to be merely used as a factor in the operation. When used in this manner, the four digits comprising the contents of the indexing register will comprise the four low order digits of a word that has six additional zeros in the high order positions. For example, consider the instruction 6580061234. The instruction will cause the contents of indexing register B to be added into the reset four low order positions of the lower accumulator 8002 and zeros to be added to the remaining six digits. Because the addition is performed via the distributor 37, FIG. 2*b*, it will also contain six zeros. The contents of indexing register B will be in the four low-order positions. Signs are considered as with any other factor word.

The following list is a summary of the operation codes assigned to the indexing registers which appear at D10–D9 of the program step word:

Operation Code:

- 40 BNZA—Branch Nonzero Indexing Register A
- 41 BMNA—Branch Minus Indexing Register A
- 42 BNZB—Branch Nonzero Indexing Register B
- 43 BMNB—Branch Minus Indexing Register B
- 48 BNZC—Branch Nonzero Indexing Register C
- 49 BMNC—Branch Minus Indexing Register C
- 50 AA—Add Indexing Register A
- 51 SA—Subtract Indexing Register A
- 52 AB—Add Indexing Register B
- 53 SB—Subtract Indexing Register B
- 58 AC—Add Indexing Register C
- 59 SC—Subtract Indexing Register C
- 80 RAA—Reset Add Indexing Register A
- 81 RSA—Reset Subtract Indexing Register A
- 82 RAB—Reset Add Indexing Register B
- 83 RSB—Reset Subtract Indexing Register B
- 88 RAC—Reset Add Indexing Register C
- 89 RSC—Reset Subtract Indexing Register C

INDEXING REGISTER CAPACITOR STORAGE

Figure 8:
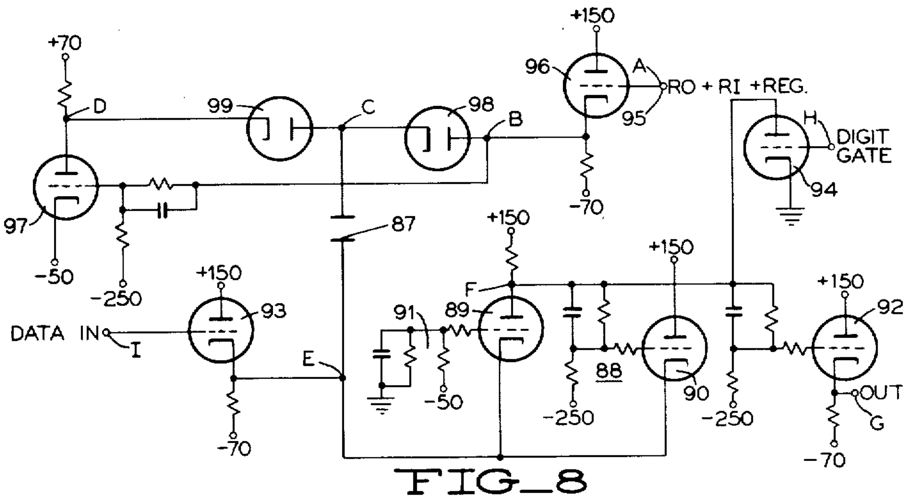
FIG. 8 is a wiring diagram of a one bit capacitor storage as utilized in the indexing registers.

The capacitor storage units used in the indexing registers 77 differ from those used in the accumulator and distributor 35 and 37, respectively. In this instance a nondestructive readout type is used. This allows read out or regeneration of the register but retains the stored value. The basic circuit for one bit location of indexing register storage is shown in FIG. 8, wherein each bit position utilizes a condenser 87 which is either charged to indicate a 0 bit or discharged to indicate a 1 bit. It is to be understood that there will be seven such bit storing positions for each digit. Thus a four-digit register has twenty-eight bit storing positions.

The output of each bit position is a function of a regeneration latch circuit 88. This latch comprises a grounded grid amplifier 89 driving a cathode follower 90 and an output cathode follower 92. The normal or reset condition of this latch is to have tube 89 conducting and tube 90 cut off. This is done by the voltage divider network 91 connected to the grid of tube 89 holding the grid at about minus 25 volts. The cathode of this tube is connected to the cathode of a cathode follower 93 which is held at approximately minus 35 volts.

If the latch 88 should be turned On because of an output, it must be turned Off at the end of the digit time. This is accomplished by a blocking inverter 94 which has an input at odd or even digit time, depending on the location of the unit in the capacitor matrix.

The readout, readin, and regeneration gates are common inputs to a line 95 leading to the grid of a cathode follower 96. The input to an inverter 97 is also a function of this gate. The input to the cathode follower 93 is a function of the bit line associated with the adder output that is feeding this particular storage device. The readout and regeneration gates are effective one digit early, while the readin gate will be on time for any one particular unit.

The more specific details of this nondestructive readout capacitor storage unit is shown and described in G. L. Clapper application, Serial No. 616,766, filed October 18, 1956, and assigned to the present assignee.

Figure 9:
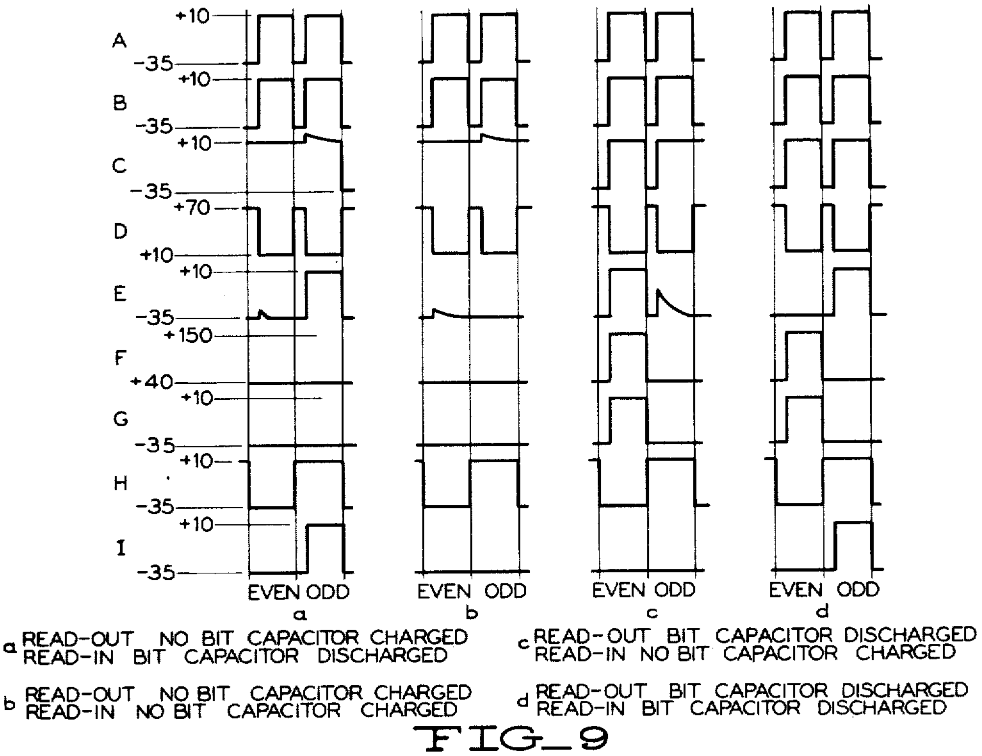
FIG. 9 shows idealized representations of voltage wave forms appearing at the designated points in FIG. 8.

The following will illustrate the operation of this type capacitor storage unit along with the approximate voltage levels which are shown in FIG. 9:

If the capacitor is charged, a 0 bit is indicated. A readout or regeneration gate leaves the capacitor charged, with no output from the unit. As the readout or regeneration gate is applied on the line 95, FIG. 8, point B rises to approximately plus 10 volts, causing inverter 97 to conduct and point D drops to plus 10 volts. Since the capacitor 87 is charged, point C will be at plus 10 volts. Therefore, no charging current flows to the capacitor 87. No change in voltage occurs at point E, and as a result, there will be no output. As the input gate is lost, the voltages drop back to their original condition and leave the capacitor charged, as shown in FIG. 9*b*, even and odd.

If the capacitor 87 had lost part of the charge, point C would be at something less than plus 10 volts, and a charging current flows through the diode 98 as the readout or regeneration gate is applied. Point E raises by the approximate value of the charge voltage lost by the capacitor. If this change is great enough, the regeneration latch 88 will be affected, and a change in stored value would occur. However, for small values of charge, lost by the capacitor 87, the regeneration latch 88 will not be affected, and the capacitor will be allowed to recharge.

If the capacitor is discharged, this indicates a stored bit. A readout or regeneration gate causes an output and leaves the capacitor discharged. The readout or regeneration gate is applied on the line 95, and point B rises to plus 10 volts. Point D drops to plus 10 volts. Since point C was normally standing at minus 35 volts, a charging current is allowed to flow through the diode 98, and point E rises to plus 10 volts. At this time tube 89 cuts off and causes tube 90 to conduct. Conduction of tube 90 holds point E at plus 10 volts. Any charge on the capacitor 87 will be removed because point D is also held at plus 10 volts. The capacitor is then left discharged as the readout or regeneration gate is lost. With point E held at plus 10 volts, tube 89 will remain cut off and cause cathode follower 92 to conduct for an output at the terminal G. This regeneration latch is reset at the end of the digit time by the blocking inverter 94. The condition of the various points are shown in FIG. 9*d*, even and odd.

If the capacitor 87 is charged, the read in of a bit must leave capacitor discharged but prevent output. Readin occurs at the digit times when the blocking inverter 94 is conducting. Therefore, the regeneration latch 88 will not provide an ouput. This circuit also will have no effect on the readin circuit. FIG. 9*b*, even and odd, shows the voltage levels for this condition. The readin gate is applied to cathode follower 96 and point B rises to plus 10 volts. Tube 97 also conducts and point D drops to plus 10 volts. At the same time, an input on I at the cathode follower 93 causes point E to rise to plus 10 volts, and point C to plus 55. Current flows through the diode 99 to discharge the capacitor 87. After the readin gate and the bit gates are lost, the circuit returns to the normal state with points E, C and B at minus 35 volts, and point D at plus 70 volts.

With the capacitor 87 discharged the read in of a bit leaves the capacitor discharged. This operation is similar to the second-mentioned-above, except that no previous readout occurred. The various voltage levels are shown in FIG. 9*d*, even and odd.

With the capacitor charged, the read in of a bit leaves the capacitor discharged. The readin gate is applied to cathode follower 96, and point B will rise to plus 10 volts, and tube 97 then conducts and point D also drops to plus 10 volts. Since the capacitor 87 was charged, no change in voltage is seen at point E until the bit is applied to the tube 93. At this time, point E rises to plus 10 volts and point C is pushed to approximately plus 55 volts. A discharge path is available for the capacitor 87 through the diode 99 to the point D. The capacitor will discharge and remain discharged as the readin gate is lost. This is shown in FIG. 9*a*, odd.

By various gating and output blocking, any combination of data may be read in the registers. The readout occurs as required, and the readout data remains in its original condition. The various voltage levels under all possible conditions are shown in FIG. 9.

INDEXING REGISTER READOUT, REGENERATION AND READIN

Figure 3A:
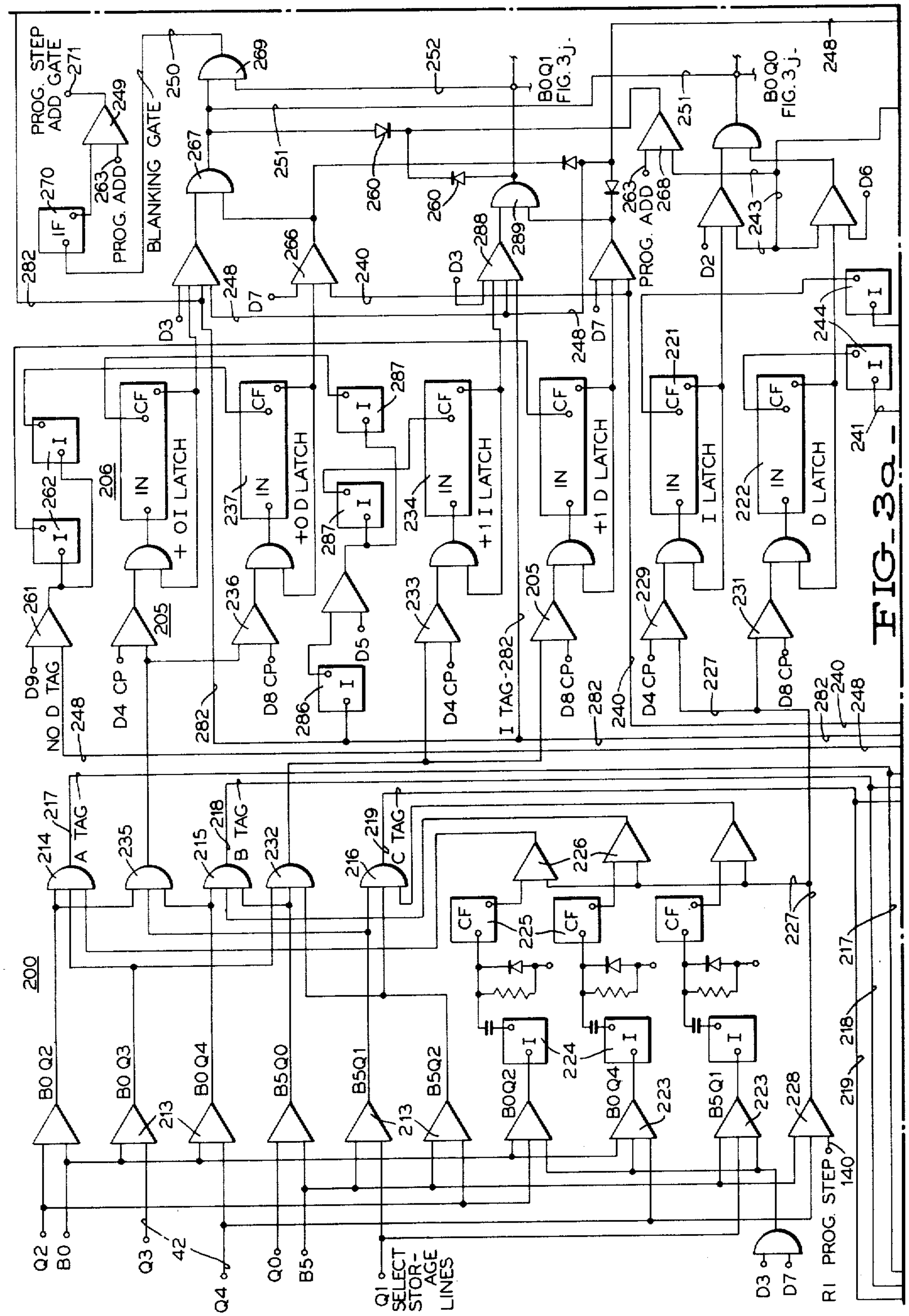
Figure 3B:
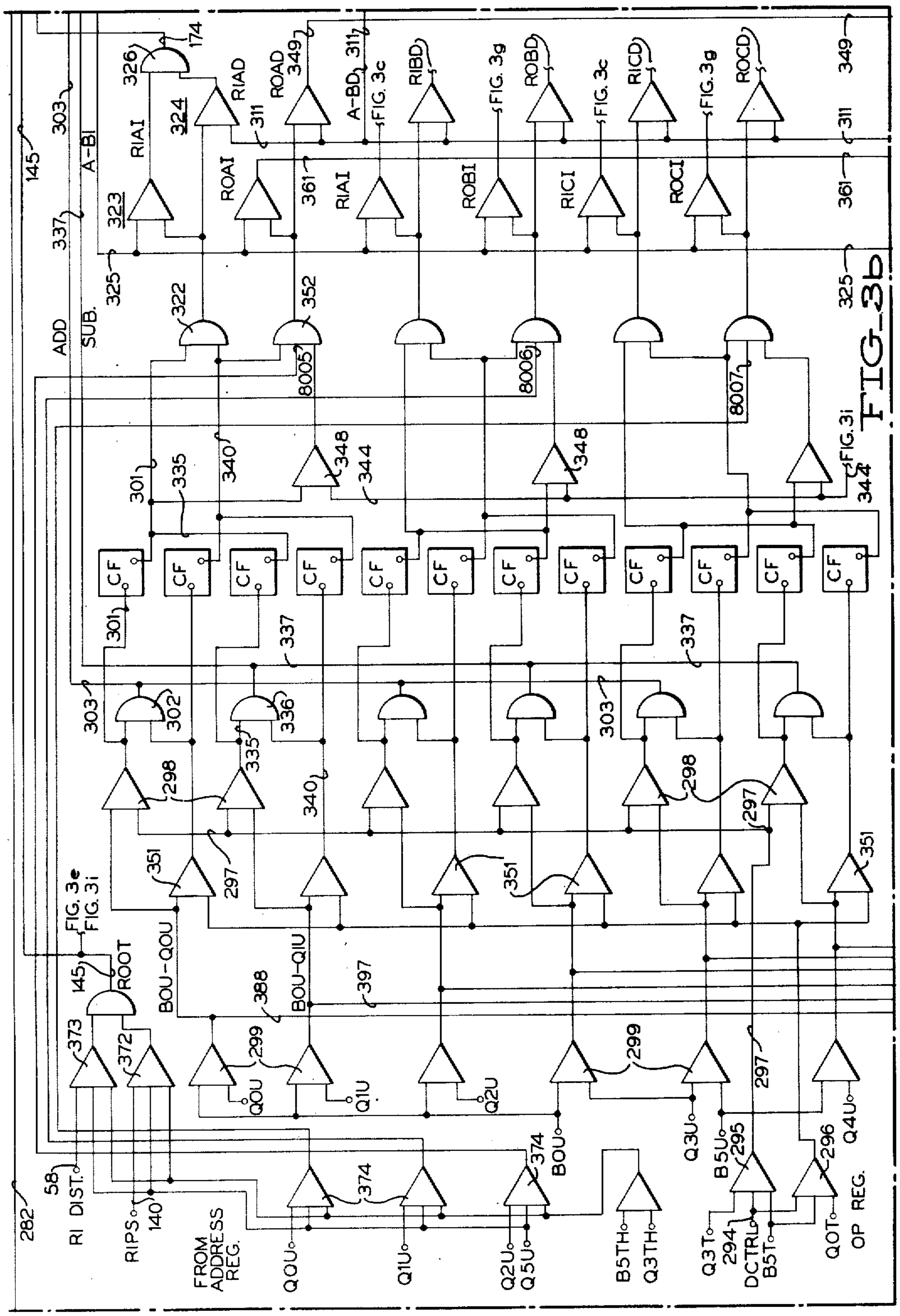
Figure 3C:
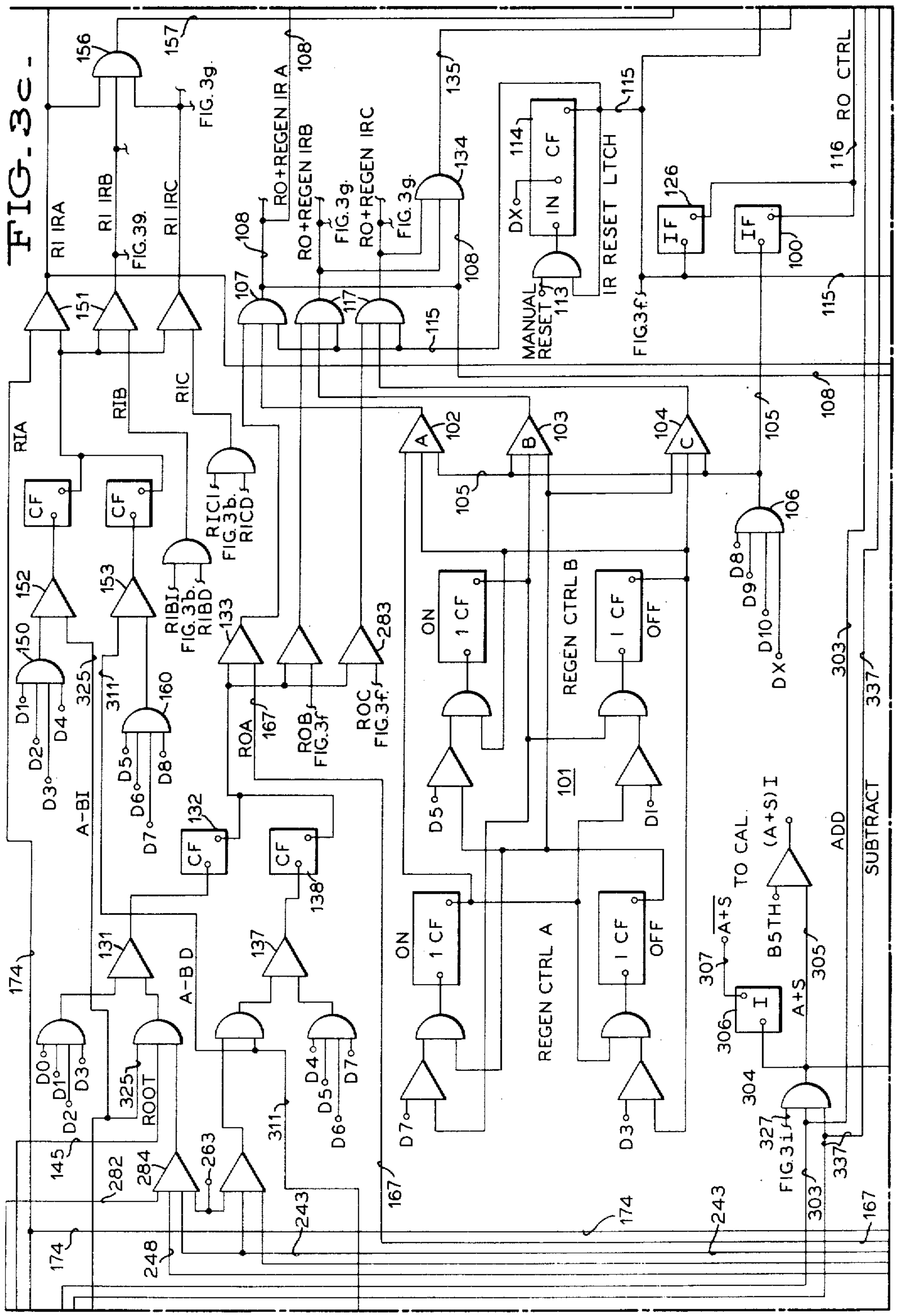
Figure 3D:
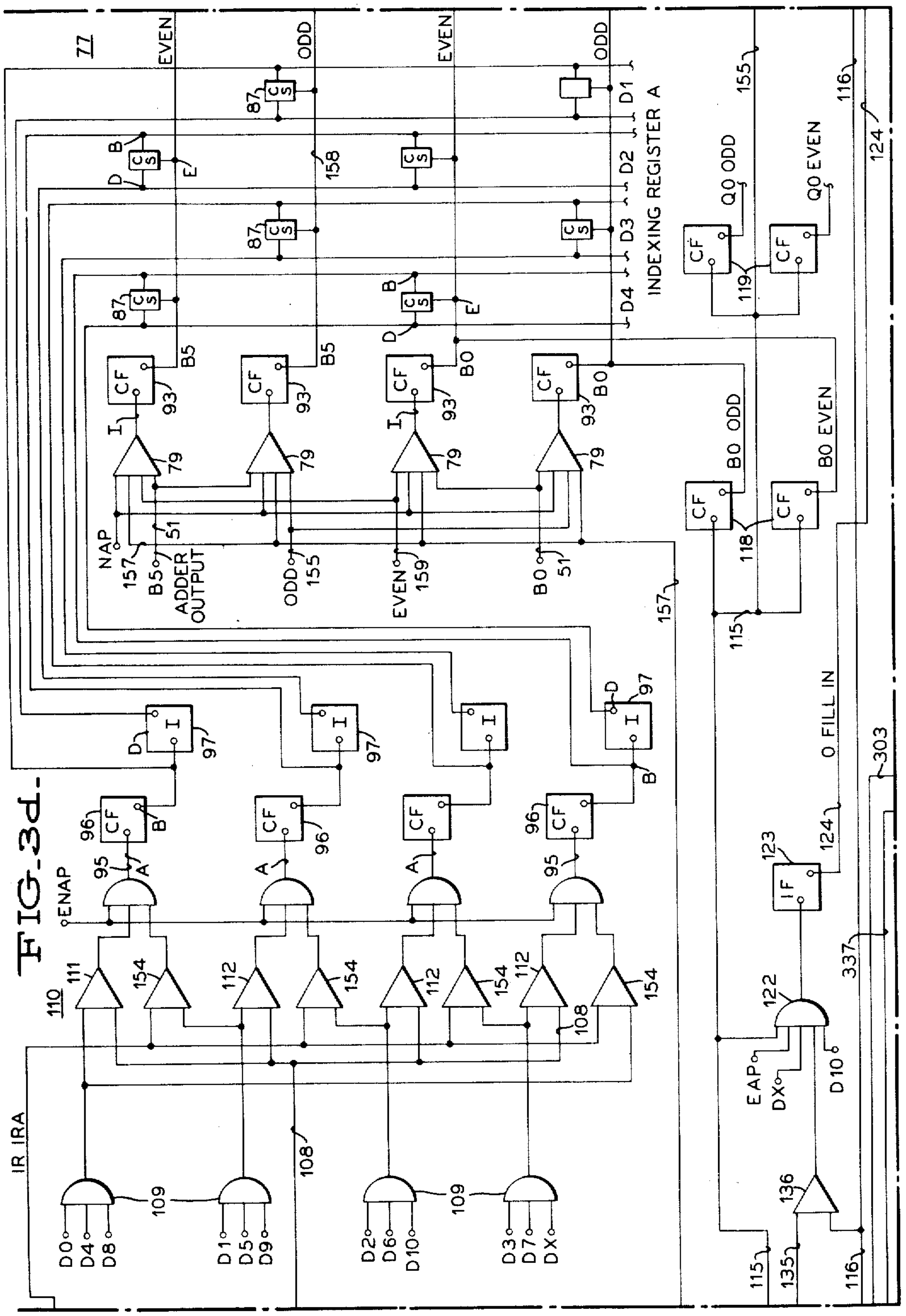
Figure 3A:
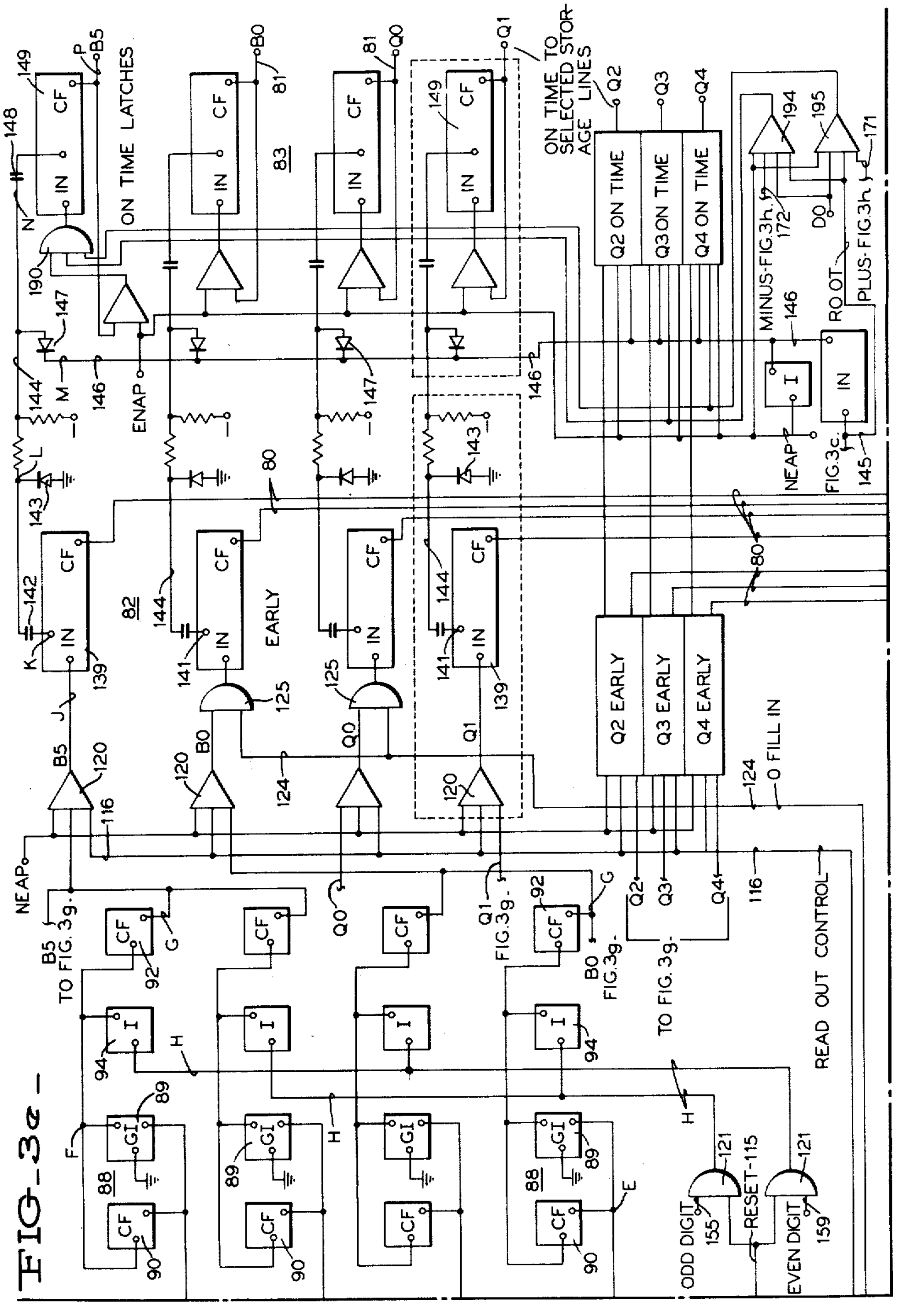

Referring now to FIG. 3*d*, there is shown the B0 and B5 odd and even bit storing positions for indexing register A. Since the quinary bit storing positions Q0–Q4 are identical, these have not been shown. Also the indexing registers B and C are not shown. However, the driving readout and readin means therefor are included in this circuit. An understanding of that portion shown is deemed sufficient to disclose the entire operation of all of the indexing registers. The means for providing the readout, readin and regeneration of the indexing registers is shown in FIGS. 3*c* to 3*e*, inclusive.

Regeneration of a particular indexing register group occurs every third word time during D8, D9, D10 and DX. This is a set routine and does not depend upon a readin or readout condition of the group. Therefore, at each word time D8–D0, one of the three indexing registers will be regenerating. This cycling is controlled by regeneration control A and B double latches 101, FIG. 3*c*, which are selectively pulsed at D1, D3, D5 and D7 time to drive the same in a consecutive manner. The outputs of these two latches are combined to give the three possible controls necessary. The latch outputs are directed to A, B and C switches 102, 103 and 104. These switches are conditioned with D8, D9, D10 and DX gates supplied over the line 105 from a diode mix 106. At some predetermined sequence in the latch operation, switch 102 is conditioned and provides an output over its related conductor through a diode mix 107. This mix is also associated with readout control circuits, to be hereinafter described, to develop a readout or regeneration gate over a conductor 108.

To read out or regenerate a particular position of the capacitor storage, the line 108 must be selectively switched with one of four digit gates 109, FIG. 3*d*, associated with a group of switches 110. For example, if the readout or regeneration A line 108 is positive at D8–D0, coincidence is provided with a D8 gate at a switch 111 whose output extends to the input line 95 of the cathode follower 96 and inverter 97 to cause regeneration of the units D1 positions of indexing register A. A D9 gate switches at 112 with the readout or regeneration A line 108 to regenerate the tens position. The hundreds position and thousands positions of the capacitor storage are regenerated in the same manner, using the D10 and DX gates, respectively.

Readout or regeneration indexing register B, not shown, is switched with similar gates to cause regeneration of indexing register B when the switch 103, FIG. 3*c*, is conditioned. Indexing register C is controlled in the same manner when switch 104 is conditioned. Neither of the indexing registers B or C are shown; however, they are identical to the register A. For the same position of storage, the capacitor storage regeneration latch circuits 88, FIG. 3*e*, are common for all three indexing registers. Readout and normal regeneration occur at different time intervals. Readin is one digit later than readout.

Briefly, the operation of the latches 101, FIG. 3*c*, is as follows: Assuming the regeneration control B latch is Off, the off output will switch with a D3 gate to turn On the regeneration A latch. The On output of regeneration A will switch with D1 to turn On regeneration B latch. The on side of regeneration B latch switches with D7 to turn Off regeneration A. The off output of regeneration A latch will switch with D5 to turn Off the regeneration B latch.

While regeneration A latch only is On, the output provides coincidence with regeneration B Off and D8, D9, D10 and DX on the line 105 at the switch 102. This switched output passes through the mix 107 to develop the readout or regeneration A gate, as previously described.

During D8–DX of every word time, the D8–DX line 105 is positive, which is directed to an inverter 100. The output from this inverter is associated with a readout control line 116 and drops the same. Dropping of the readout control line 116 is effective to drop one terminal each of a group of switches 120, FIG. 3*e*, leading to the early output switching 82. This insures no readout during the regeneration cycle.

During the time regeneration control B latch, FIG. 3*c*, is On, the on output will switch at 103 with the off output of regeneration A and D8, D9, D10, and DX to develop the readout or regeneration B gate. During the time regeneration A and B latches are both Off, the off outputs will switch at 104 with D8, D9, D10, and DX to develop the readout or regeneration C gate.

Figure 10:
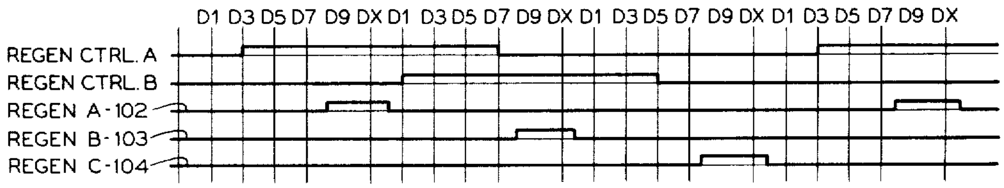
FIG. 10 is a timing diagram of the capacitor storage regeneration for the indexing registers.

The cyclic regeneration of the index registers is shown in FIG. 10, wherein it is readily seen how the index registers are consecutively regenerated at consecutive word times from D8–DX. While non-destructive type capacitor storage units have been disclosed for the indexing registers 77, FIG. 3*d*, it is to be understood that any suitable type storage would be applicable, so long as it is compatible with the remainder of the calculator.

A positive value applied over a manual accumulator reset line 113, FIG. 3*c*, from the calculator turns On an indexing register reset latch 114, which raises its output line 115. This latch will remain On as long as the accumulator reset latch, not shown, is On. The indexing register reset latch output line 115 extends to a pair of odd and even diode mixes 121, FIG. 3*e*, and the positive value is applied to both the odd and even digit H lines leading to the inverters 94 to clamp or hold Off the capacitor storage regeneration latches 88 as previously described. The reset latch line 115, FIG. 3*c*, also extends to the mixes 107 and 117 to develop readout or regeneration gates for all three indexing registers simultaneously. In addition, the up reset latch line 115 drives two pair of parallel cathode followers 118 and 119, FIG. 3*d*, whose outputs enter bits on the odd and even B0 and Q0 input lines, respectively. These cathode followers are parallel connected to the normal bit input cathode followers 93 and provide zero inputs at odd and even digit time for all four digits of each of the three indexing registers A, B and C. In this manner, the regeneration latches 88, FIG. 3*e*, are held Off during reset time, and the reset to zeros is permitted.

During the reset operation, the reset line 115 conducts through a mix 122, FIG. 3*d*, leading to an inverter follower 123 whose output line 124 is dropped. Dropping of this line prevents a zero fill-in output from mixes 125, FIG. 3*e*, leading to the B0 Q0 early double inverter and cathode follower switching array 82.

The reset latch line 115, FIG. 3*c*, also conducts to an inverter follower 126 to drive the connected readout control line 116 down. Dropping of this line prevents any transfer of information from the regeneration latches 88, FIG. 3*e*, to the early outputs by holding down the readout control switches 120, FIG. 3*e*. Thus a reset signal not only prevents readout from the indexing registers but suppresses the normal zero fill-in to the early switches 82 and at the same time sets each of the digit positions in all of the registers to zero, B0 Q0.

The reset of the sign latches will be hereinafter described.

Figure 3F:
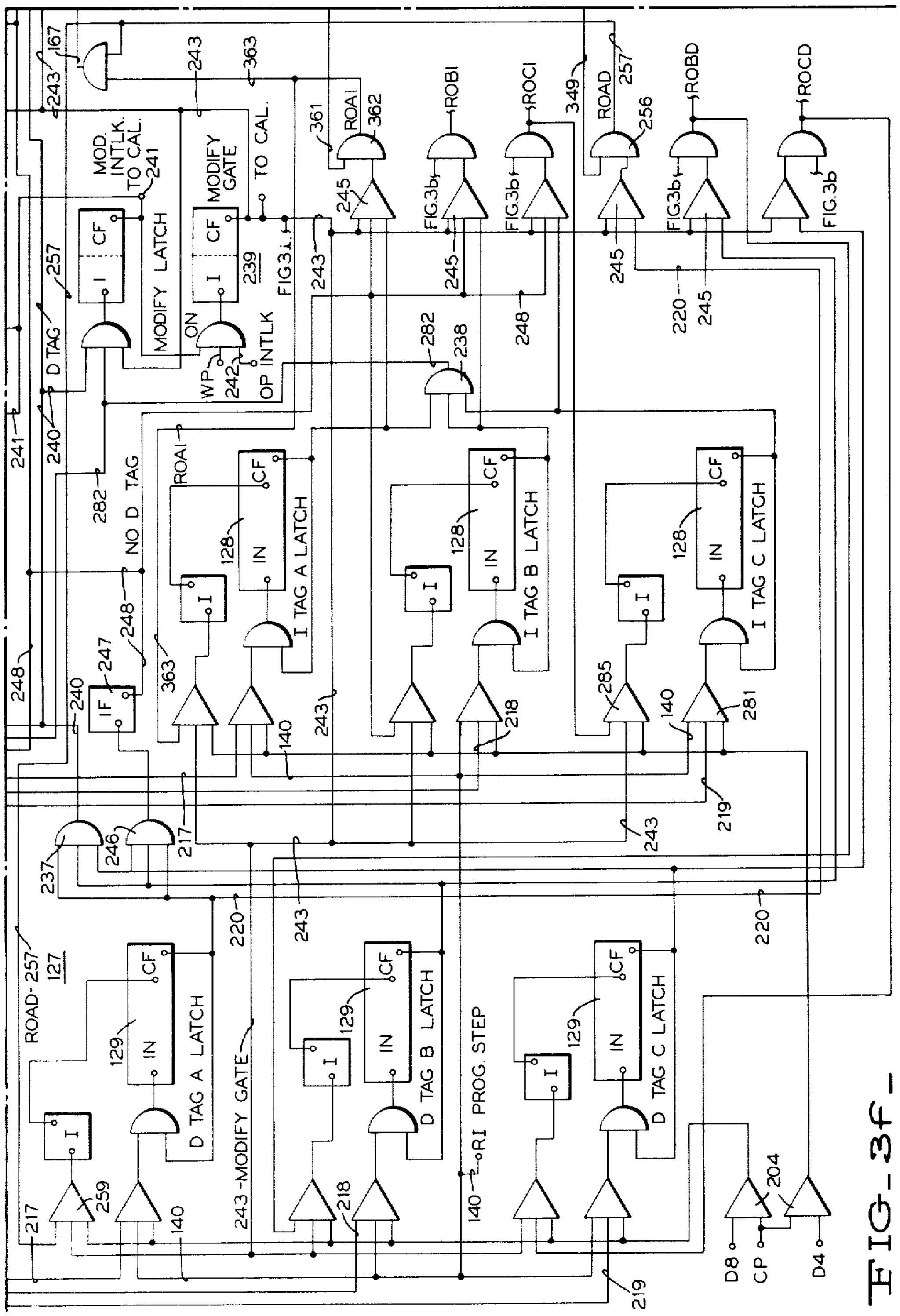

Read out of indexing registers must be accomplished at a time when the information is to be used. If the data address D8–D5 of a program step word is to be modified, or if modification of the data in the indexing register is to take place from the program step register 26, FIG. 2*b*, the indexing registers 77, FIG. 2*a*, must be read out at D4 through D7. If the instruction address D4–D1 of a program step word is to be modified or data from the distributor is to be added to or subtracted from the indexing registers, readout must occur at D0 through D3 time. To control these different operations, the latches generally indicated at 127, FIG. 3*f*, are used. If readout is to occur at D0 through D3, the group of readout I tag latches 128 are selectively used. If readout is to occur at D4 through D7, the group of readout D tag latches 129 are selectively used. In order to read out of the correct indexing register, selection within a group must occur.

For the purposes of this description, it is assumed the ROA line 167, FIG. 3*c*, is up and that at digit D0–D3 time a mix conducts to a related switch 131 to provide an output to a cathode follower 132 which in turn conditions a switch 133. The output of this switch extends through the mix 107 and line 108 to condition all connected readout or regeneration control switches represented at 111 and 112, FIG. 3*d*. Raising of these switches will cause indexing register A to read out at D0–D3. During this interval, the line 108 extends through a mix 134, FIG. 3*c*, and a conductor 135 which leads to a switch 136, FIG. 3*d*. This switch is conditioned by the readout control line 116 which is now up due to the positive output of the inverters 100 and 126, FIG. 3*c*. As the switch 136, FIG. 3*d*, raises its output line, this condition is reflected through the mix 122 to the inverter follower 123 to drop the line 124 and block zero fill-in at the early switching 82, FIG. 3*e*, during this interval.

The output of readout control for readout D comes from the same switch 133, FIG. 3*c*. However, this switch is conditioned from a switch 137 and cathode follower 138 at D4, D5, D6 and D7 time to cause readout for the data address D portion of a word. The zero fill-in control line 124 is dropped from the switch 136, FIG. 3*d*, at D4–D7 during this interval rather than at D0–D3. Under both conditions of readout, the zero fill-in occurs at all digit times other than when actually reading out from the indexing register.

The outputs of the capacitor storage, FIG. 3*d*, must be transferred to the early output circuits 82, FIG. 3*e*. This will occur by switching the output of the capacitor storage units with NEAP and the readout control line 116 at the switches 120. Readout control line 116 is positive, except at D8, D9, D10, and DX time or if the reset latch 114, FIG. 3*c*, is On.

The indexing register on-time latches 83 will be On only from B—A time from each digit. The transfer from the early output circuit 82 occurs at B pulse time and is controlled by an EAP. The early output data lines 80 are directed to the switching 84, FIG. 3*j*, for delivery to the adder at the A or B entries in either true or complement form.

During readout, the capacitor storage output will cause an early output gate from the cathode followers 92, FIG. 3*e*, through the switches 120. This will raise its related early output line 80. As this output is developed, the related double inverter 139 will drop a connected line 141. This will cause the related capacitor 142 to discharge through a clamping diode 143 to ground. Therefore, at this time there is no change in the voltage on the connecting line 144. When the early output is lost or cut off by the digit clamp cathode follower 94, the line 141 raises and as a result, the capacitor 142 drives the line 144 positive, providing a readout on-time line 145 has shifted positive at A pulse time to raise an associated line 146 leading to diodes 147 parallel connected in the lines 144. Input capacitors 148 associated with related on-time latches 149 will charge rapidly. At the end of an A pulse time, line 144 is pulled down by the diode 147. This will cause the input capacitors 148 to turn On the related on-time latch 149. The on-time latches will all be turned Off at the next NEAP.

A readout on-time gate must be supplied by the line 145 to allow information to operate the on-time latches 83. If this gate is not present, the line 144 is held down, and the latches cannot operate. The output on the on-time latches is directed in true form over the data lines 81, as required, to the selected storage data lines 42.

Figure 11:
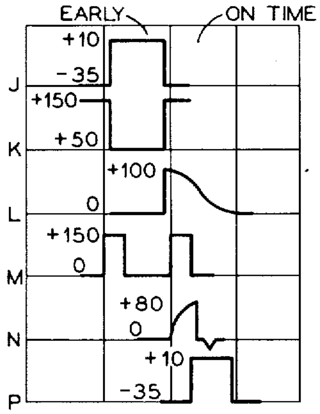
FIG. 11 is a timing diagram of the early and on-time voltage outputs from the indexing registers.

During the interval when reading from the index registers on time, a sign value must accompany the data. Therefore, the readout on-time line 145 and D0 condition switches 194 and 195 along with selective outputs on plus and minus lines 171 and 172, respectively, which will be described later. If the sign of the indexing register being read out is minus, the switch 194 conducts at D0 to generate an on-time 8, B5—Q3, output on the data lines 81 by turning the related on-time latches On through connecting mixes 190. If the sign of the index register is plus, the switch 195 conducts to generate a 9, B5—Q4, output on the data lines 81 by turning On the B5—Q4 on-time latches. On-time outputs are in true form and are placed in the distributor 37 or program register 26, FIG. 2*a*, as required. The voltage conditions for the early and on-time transfer circuits from the double inverter 139 to the output of the related on-time latch 144 is shown in FIG. 11.

Figure 3G:
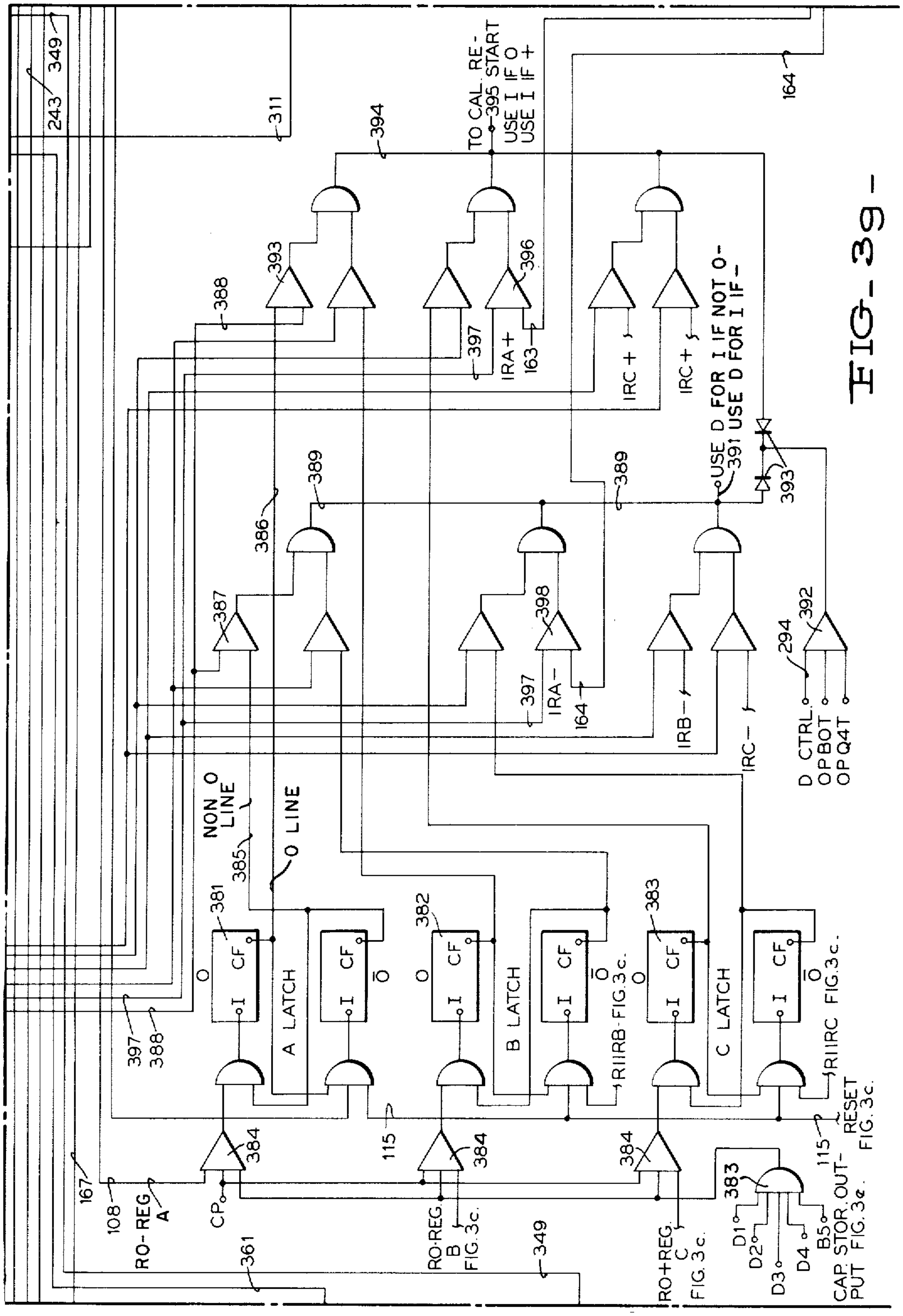
Figure 3H:
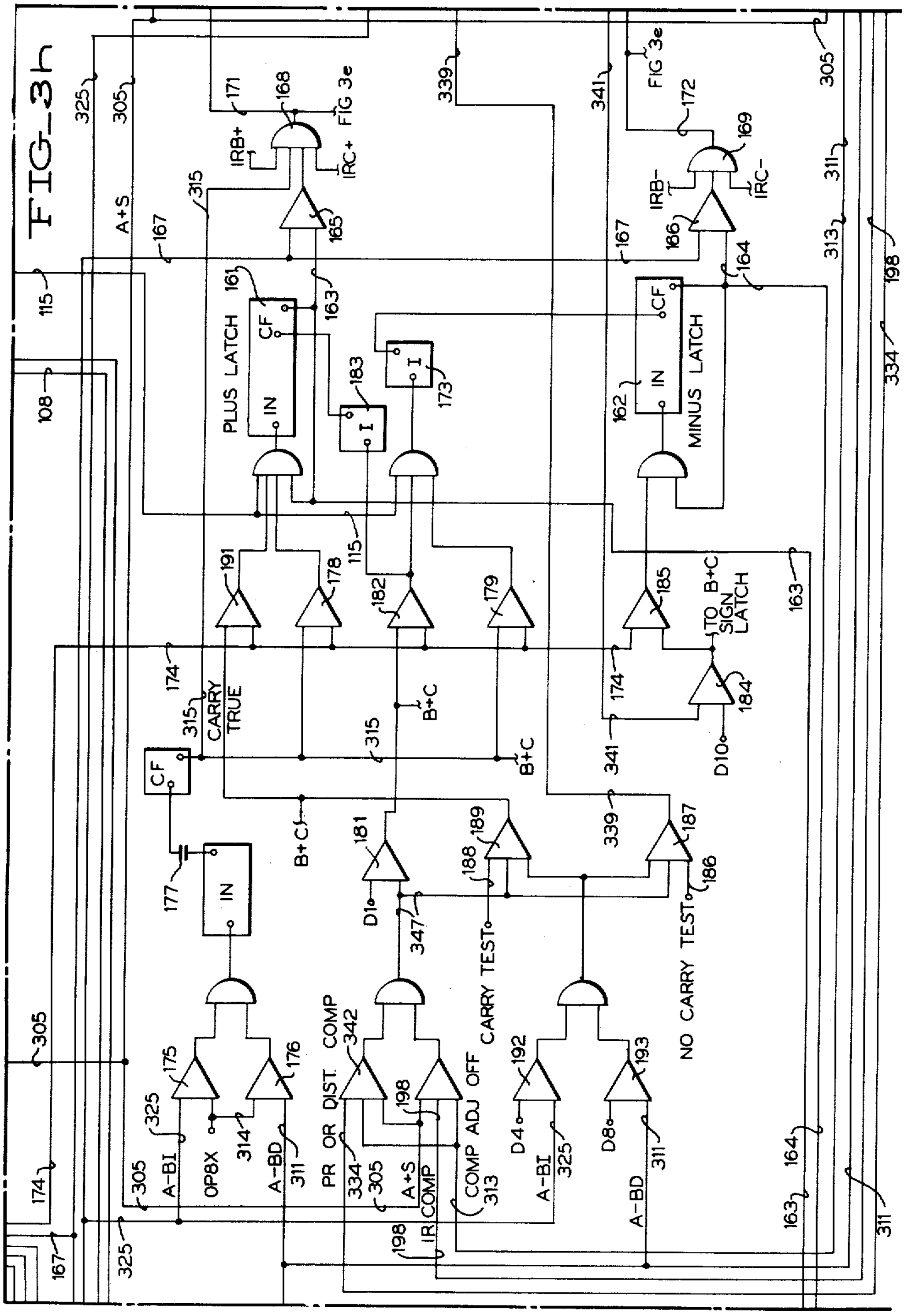
Figure 3I:
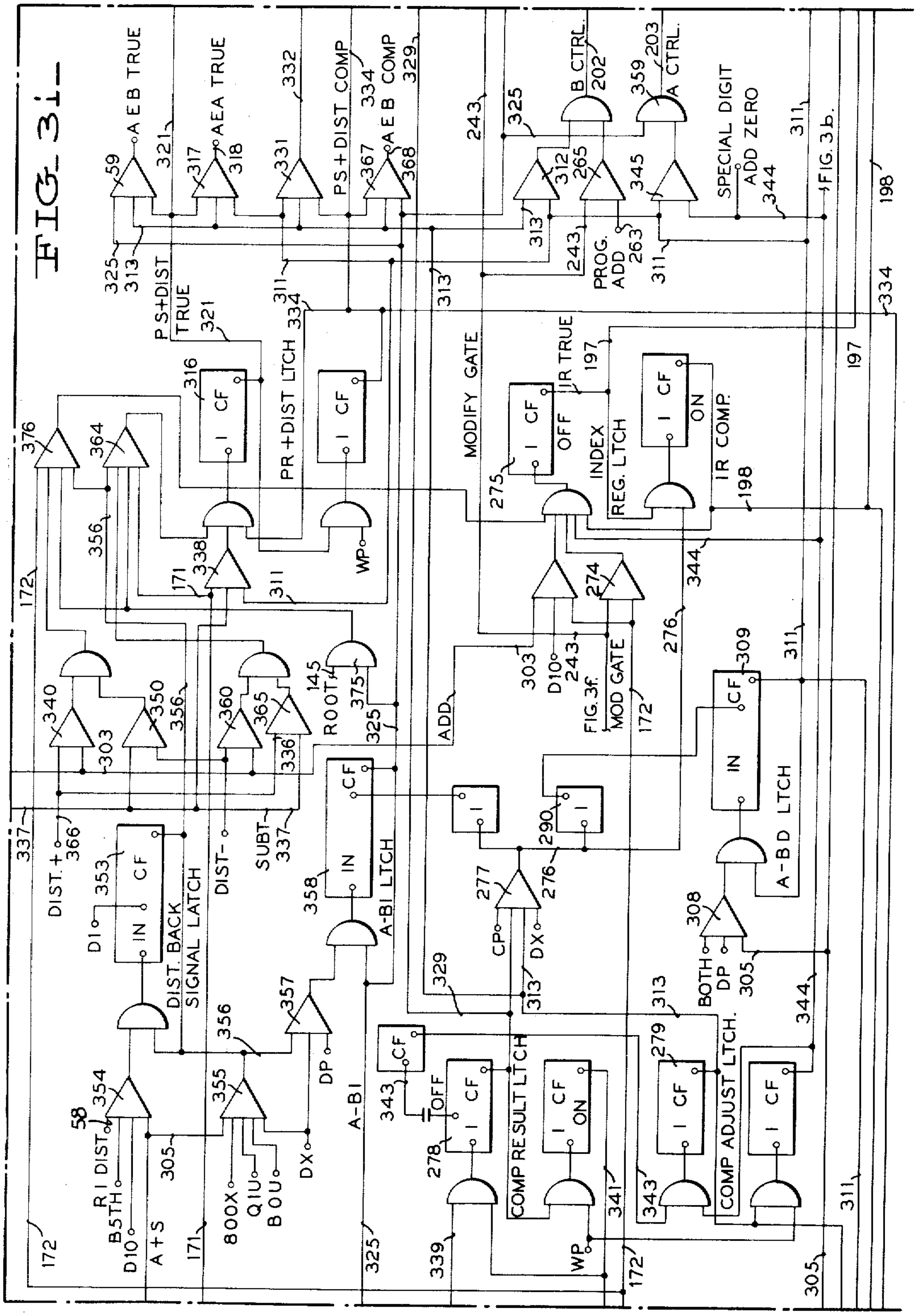
Figure 3J:
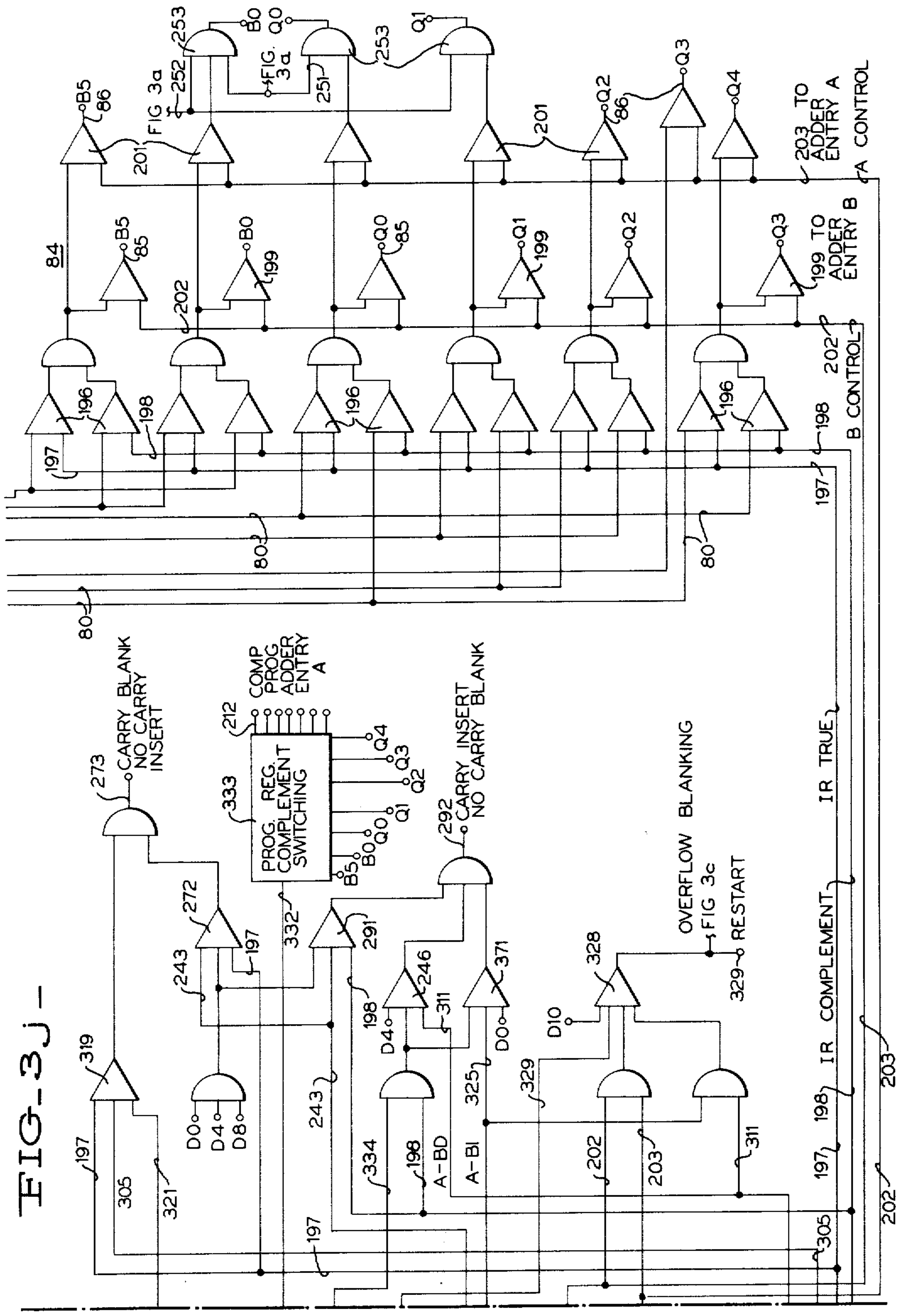

As mentioned previously, the early data outputs are directed over the related early output lines 80 to true and complement switching 196, FIG. 3*j*. Whether the data passes through the switching in true or complement form is dependent upon the conditioning of true and complement lines 197 or 198, respectively. Also the data passing through this switching 196 is directed to two groups of additional switches 199 and 201. One of these groups 199 is associated with the adder entry B control line 202 and the other group 201, to the adder entry A control line 203. The direction the data takes depends upon the previous analysis which raises either the B control line 203 or the A control line 202. Thus the data may be selectively gated to the adder entries A or B in either true or complement form.

Reading into indexing registers may occur at D1 through D4, or D5 through D8, depending upon the information entering the unit from the adder output lines 51, FIG. 3*d*. If the information is a result of addition from the program step storage register 26, it must be entered at D5 through D8 time. To control this, readin selection control switches 151, FIG. 3*c*, are used. These switches have one terminal each conditioned as will be hereinafter described, and the other terminal is controlled by a combination output from a pair of switches 152 and 153. The switch 152 is conditioned by a mix 150 during D1–D4 for readin to the indexing register A, B or C. The switch 153 is conditioned through a mix 160 to provide readin to the index registers which takes place from D5 through D8 time. As the switch 151 conducts over its related line RI IRA, this conditions connected readin switches 154, FIG. 3*d*. These switches selectively conduct in accordance with the digit gates provided from the mixes 109 to develop the readin gate to the cathode followers 96. The storage unit must then allow entry from the adder output lines 51, through the switches 79 to cause the input bit cathode followers 93 to control the capacitor units 87.

For example, assume a B5 is to be read into the units position of indexing register A, as a result of addition from the distributor 37, FIG. 2*b*. This information will be available on the adder output lines 51 at D1 time. The data is delivered to the switches 79, FIG. 3*d*, which are also connected with an odd digit line 155, NAP and a readin A gate from line RI IRA conducting through a diode mix 156, FIG. 3*c*, over a line 157 to cause an output to the related cathode follower 93. This controls all storage units on the odd digit B5 line 158. Selection of the particular capacitor storage unit 87 is accomplished by switching the readin line RI IRA with a D0, D1, D5 or D9 gate extending through the related mixes 109. The output from the related readin switch 154 connects with the cathode follower 96 leading to the D1 capacitor storage unit. This will cause the capacitor 87 to discharge and store a bit B5 units, as previously described. A B0, zero, as well as any Q bit value, is read in in an identical manner. If these values are to be read in at even digit time, the operation is the same, except that even digit line 159 is energized.

During readin on time, the odd and even digit lines 155 and 159, FIG. 3*e*, conduct through their related mixes 121 to clamp the register output at the inverters 94. In order to avoid duplication of circuitry, the indexing registers have common input and output lines. This is feasible because any one register may be addressed at any one time. However, provision is made for allowing any two registers to be addressed in one word time, one at I time, D1–D4, and the other at D time, D5–D8.

Algebraic signs associated with the indexing registers are held in sign latches 161 and 162, FIG. 3*h*. The output of these latches will be used to determine algebraic operations, enter the sign on the on-time output lines 81, FIG. 3*e*, from the switches 194 and 195 and for testing purposes.

A readout condition must exist to make the sign of an indexing register available on the on-time output data lines 81 or for determining an algebraic operation. The output sign lines 163 and 164 of the plus and minus latches 161 and 162, respectively, FIG. 3*h*, are connected to switches 165 and 166, respectively. The other terminal of each switch connects with an RO AI and D line 167. The output of each of the plus and minus switches 165 and 166, only one of each is shown, connect with respective mixes 168 and 169, which lead to common index register plus and minus lines 171 and 172, respectively. Therefore, only the sign of the indexing register reading out will be available at the common sign output lines 171 and 172. The output line 115 of the indexing register reset latch 114, FIG. 3*c*, will reset all sign latches 161 and 162, FIG. 3*h*, to a plus condition by directly turning On the plus latch 161. The reset line 115 extends through a mix to an inverter 173 whose output extends to and turns Off the minus latch 162, if On.

A readin gate supplied over a readin I and D line 174 must be present to read in a sign to the latches. This condition may exist as a result of several different types of operations.

For all eighty codes, either of the switches 175 or 176 conduct through a mix and drive a related double inverter which operates on a condenser 177 to produce a capacitor spike leading to switches 178 and 179. Conduction from the switch 178 turns On the plus latch 161, and the switch 179 acts on the inverter 173 to turn Off the minus latch 162, if On. The latch 161 will remain On or plus, unless a complement adjust cycle follows or is called for. This occurs during all reset subtract codes. If a reset subtract code exists, the plus latch 161 will be reset at D1 time of the subtract cycle from the switch 181 which directs an output to a conditioned switch 182. This latter switch drives the inverter 173 to turn Off the minus latch 162 and an inverter 183 to turn Off the plus latch 161. At D10 time the minus latch 162 is turned On by conduction from the series switches 184 and 185.

For all complement add operations, and all add or subtract operations with the indexing register complement control line 198 On, the sign latches will be reset from the series switches 181 and 182 at D1 time. If a complement result is signalled by a no carry condition on the no carry test line 186, a no carry switch 187 provides an output at D4 for an I or D control. This operates over a line 339 to turn On a complement result latch 278, FIG. 3*i*, to raise the On-line 341 to turn On the minus sign latch 162, FIG. 3*h*, at D10 time from the series connected switches 184 and 185, and the following cycle will be a complement adjust cycle.

If a carry is recognized on the carry line 188 at D4 for an I or D control, a carry switch 189 provides an output to a switch 191 to turn On the plus sign latch 161 at D4 or D8, respectively, in combination with inputs associated with the related switches 192 and 193.

AUTOMATIC ADDRESS MODIFICATION

As mentioned previously, the primary use of indexing registers is to modify addresses automatically by adding the contents of an indexing register to an address. Because the indexing registers can contain either positive or negative values, addresses can be modified by adding to them or subtracting from them, depending on the sign of the indexing register. Both data addresses and/or instruction addresses can be modified by the contents of any indexing register or by two different indexing registers, respectively.

Automatic address modification requires a signalling system to determine when and if an address must be modified. It is also necessary to determine which indexing register is to have its contents added to the address. In this application, addresses 2000 through 7999 and 9200 through 9659 have been reserved for these purposes.

If the address is in the range from 2000 through 7999, the thousand position of the address will indicate that the address is to be modified. It will also indicate which indexing register is to be used for modification. All addresses from 2000 through 3999 indicates that indexing register A is to be used. Addresses from 4000 through 5999 indicates that indexing register B is to be used. Addresses from 6000 through 7999 indicates that indexing register C is to be used.

Addresses in the range of 2000 through 7999 then consist of a basic drum address 0000 through 1999, with either 2000, 4000 or 6000 added to indicate or tag the proper indexing register. Modification of an address of this type will consist of removing the tag from an address and adding to the remainder the contents of the indexing register indicated by the tag and then replacing the tag with a number as set forth in detail below.

Addresses in the range of 9200 through 9659 are handled in a similar manner. However, the immediate access or core storage addresses have the values 200, 400 or 600 added to the basic address. The tag value of 200 will indicate that the contents of indexing register A are to be added to the basic immediate access storage address number, the tag value of 400 will indicate indexing register B is to have its contents added to the basic immediate access storage address and the tag value of 600 will indicate indexing register C is to have its contents added to the basic immediate access storage address. Modification of addresses in this range will consist of removing the tag and adding to the basic immediate access storage address, the contents of the indexing register indicated by the tag.

The following table lists meaningful actual addresses and the resulting modified address:

| Actual address | Modified address |
|---|---|
| 0000–1999 | 0000–1999. |
| 2000–3999 | 0000–1999 plus contents of IR A. |
| 4000–5999 | 0000–1999 plus contents of IR B. |
| 6000–7999 | 0000–1999 plus contents of IR C. |
| 8000–8003 | 8000–8003. |
| 8005–8007 | 8005–8007. |
| 8010–8015 | 8010–8015. |
| 9000–9059 | 9000–9059. |
| 9200–9259 | 9000–9059 plus contents of IR A. |
| 9400–9459 | 9000–9059 plus contents of IR B. |
| 9600–9659 | 9000–9059 plus contents of IR C. |

If the contents of the indexing register is positive and the resulting effective address exceeds 9999, the carry is lost and only the four low order digits of the sum is retained as the effective address. If the contents of the indexing register is negative, the address is modified by subtraction. Since there is no sign associated with the program register, its contents will always be handled as an absolute value. Because subtraction is accomplished by adding the tens complement, a carry always occurs when the difference is positive. Any such carries are lost. If the address is negative, the complement result is not recomplemented, and the result may be used if the address is meaningful.

The modified address, determined as indicated in the foregoing table, must be a meaningful address to the operation called for. The following table lists the address codes used:

| Addresses | Code | Description |
|---|---|---|
| 0000–1999 | D | Drum. |
| 8000–8003 | A | Arithmetic unit and console switches. |
| 8005–8007 | I | Indexing registers. |
| 8010–8015 | T | Tapes. |
| 9000–9059 | H | Immediate access storage. |

FIG. 19 shows, by way of example, the drum 22 which is divided into bands of fifty words each and is intended to show the word locations within each band.

FIG. 20 is similar in showing the immediate access core storage 21. There would be five cores for each digit position to accommodate for storage in the 2-out-of-5 code. Readout occurs parallel by bit and serial by digit and word.

The following table shows examples of address modifications:

| Actual instruction | Contents of IR | | | Modified instruction | Remarks |
|---|---|---|---|---|---|
| | A | B | C | | |
| 6501230124 | 0223+ | 0075− | 0062+ | 6501230124 | No indexing. |
| 6521230124 | 0223+ | -------- | -------- | 6503460124 | Index D by A. |
| 6501236124 | -------- | -------- | -------- | 6501230186 | Index I by C. |
| 6541234124 | -------- | 0075− | -------- | 6500480049 | Index D and, I by B. |
| 6541236124 | -------- | 0075− | 0062+ | 6500480186 | Index D by B and I by C. |
| 6592158002 | 0013+ | -------- | -------- | 6590288002 | Index D by A. |
| 6501239627 | -------- | -------- | 0015− | 6501239012 | Index I by C. |
| 6540150124 | -------- | 2345+ | -------- | 6523600124 | 2360 causes storage sel. error. |
| 6592100124 | 1983+ | -------- | -------- | 6509930124 | D exceeds 10,000; carry lost. |
| 6501234124 | -------- | 7878+ | -------- | 6501238002 | I becomes 8002. |
| 6596159218 | 1011− | -------- | 0015− | 6590008007 | I becomes 8007. |
| 6521230124 | 1011− | -------- | -------- | 6591120124 | D becomes negative comp. 9112 causes storage sel. error. |
| 6521230124 | 1111− | -------- | -------- | 6590120124 | D becomes negative comp. is a meaningful address. |

ADDRESS MODIFICATION OBJECTIVES AND FUNCTIONS

The objectives can be set up as follows: (1) Sample the instruction word 27 as it enters the program step storage 26 to determine if a tag is carried at the specified locations. (2) If not tag is present, allow the control commutator to continue into the D ½ cycle. (3) If a tag is present, prevent a program restart and set up controls and circuits to modify the program step storage by adding or subtracting the contents of the indexing register designated by the tag to the contents of the program step storage. (4) After modification has been completed, cause a restart to allow the control commutator to advance into the next D ½ cycle.

The instruction word 27 enters the selected storage output lines 42, FIG. 2*b*. During this time, a readin program step latch RIPS is On, and the instruction word will enter program step storage 26. All digit values will enter as their true values. The instruction word will also be sampled by a tag decode circuit 200 by switches 204 and 205 at D4 and D8 time to determine if the D or I addressed contain a tag. If no tag is present in either position, no tag decode and storage circuits are set up, and the normal program restart allows the control commutator to advance. If a tag is present, the tag decode and storage circuits 200 and 206, respectively, to be hereinafter described, will recognize this condition and set up circuits for modification of the address data in the program step storage 26. A program restart is also prevented until the modification has been completed.

To modify the address of an instruction word, the contents of the indexing register designated by the tag must be added to the address of a program step storage word. To accomplish this the contents of program step storage 26 leaves the related early latches 207, FIG. 2*b*, and is directed over the data lines 208 through either true or complement switching 209 and 211 and data lines 212 to the adder 36, FIG. 2*a*, and added to the contents of the selected indexing register. The result is returned from the output of the adder over the data lines 51 via a switch 256 to the program step storage 26, FIG. 2*b*, and entered as the modified value.

In FIG. 3*a* the biquinary selected storage lines 42 lead to a group of diode switches 213 which are associated with various combinations of the biquinary lines and continuously but selectively direct these combinations through diode mixes 214, 215, and 216 over A, B and C tag lines 217, 218, and 219, respectively. These lines conduct any positive pulses thereover to selected pairs of the plurality of the tag latches 127, FIG. 3*f*. Three of these latches 128 are associated with the I instruction portion of the word, while the other three latches 129 are associated with the D or data address portion of the word.

If a tag, 2 through 7, appears at either the D4 or D8 positions, certain of the tag latches 127 are operated. The output from any of these latches is such as to prevent further operation of the next program step until the program step word is modified as specified by the tag.

The immediate access storage index tags set up the same I and D tag latches 127 as the general storage index tags to indicate the address to be modified, and the particular indexing register. In addition, I address and D address latches 221 and 222, respectively, FIG. 3*a*, are selectively set up to allow proper zero insertion.

Since it is not known that a core address is being read in until a 9 is detected in the thousands position, it is not possible to remove the tag from a buffer storage address immediately. The fact that a buffer address, either I or D, or both, has been read in is stored in the latches 221 and 222 that were mentioned above. These latches control the insertion of a zero into the hundreds position of the proper address during the modification cycle.

This detection is accomplished by a group of switches 223 associated with the selected storage lines 42 which are sampled at D3 and D7 for the presence of a 2, 4 or 6. Should a 2, 4, or 6 appear at D3 or D7, the related switches conduct to drop the output from an associated inverter 224. At the end of each of these digit times, a capacitor coupled shot is directed through a cathode follower 225 whose output is connected with a related switch 226. The other terminal of this switch connects with a conductor 227 associated with a switch 228 which detects a 9, B5, Q4, on the selected storage lines 42 during a readin program step operation signal applied on the line 140. Should a 9 appear during D 4, C pulse or D8, C pulse, either or both of the switches 229 and 231 conduct to set one or both of the I or D latches 221 and 222 to add zero at either or both D2 and D6 during an address modify operation. The output from the switches 226 are delayed one digit time, and the capacitor coupled shot is effective to selectively raise one of the tag lines 217, 218 or 219 to set one or both of the selected I or D tag latches 128 and 129, FIG. 3*f*.

An an illustration, assume that the program step word has some suitable OP code XX and that 2XXX 3XXX appears in the respective D8 and D4 positions of the word. These codes indicate that both the data address, D5–D8, and the instruction address D1–D4 must be modified by the contents of indexing register A. With serial by digit readout from storage, the 3, B0 Q3, passes through a mix 232, FIG. 3*a*, to a switch 233 and at D4, CP time causes the related +1 I latch 234 to turn On. Turning On this latch provides a modulo 2 to the D4 value and stores the remainder of one in this latch, which is to be added at some later time during the address modifying operation. At D8, C pulse time, the 2, B0 Q2, appearing on the lines 42 passes over the B0 Q2 line and is operative through a mix 235 and a switch 236 to turn On a +0 D latch 237. This latch provides a modulo 2 to D8 and stores the zero result for addition to the program step word at a later interval.

While the above latches were being set, this same output from the A tag line 217 was applied to the tag latches 127, FIG. 3*f*, and at D4 time, the positive readin program step control line 140 provides coincidence in the I tag A latch 128 to turn the same On. Likewise, at D8 the same condition occurs over the same line 217 to turn On the D tag A latch 129. Turning On either of these latches or any of the others provides an output over their respective lines through mixes 237 and 238 whose respective outputs is directed over lines 240 and 282 to a modify double latch 239 and drops the off or modify interlock line 241. In normal operation, the modify latch 239 is held Off by a positive value on the operation, the modify latch 239 is held Off by a positive value on the operation interlock line 242. Thus the output on both the interlock and modify gate lines 241 and 243, respectively, is held down. The negative output from the modify interlock line 241 extends to a pair of inverters 244, FIG. 3*a*, which provide positive outputs to the I and D latches 221 and 222 to permit these latches to turn On if a tag was detected at the D3 and D7 positions of the program step word. At the end of the operation which is in progress, the operation interlock line 242, FIG. 3*f*, drops and permits the modify latch 239 to turn On.

The now down modify interlock line 241 leading to the calculator is effective to prevent the next program step from proceeding until the addresses have been modified as specified. At the same time the on modify gate line 243 raises to provide an output to the calculator to set into motion the data modification at the next available word time and to condition a group of switches 245 and the like for the address modification circuit. Operation of any of the D tag latches 129 causes an output through a mix 246 to an inverter follower 247 to drop a no D tag line 248 leading to a select portion of the group of switches 245. It is necessary to modify only one address at a time because the data in the two registers designated might differ in sign. In this embodiment the D address is always modified first. These switches are operative in a predetermined sequence as will be hereinafter described.

The turning On of any tag latch puts the modify interlock into operation to prevent a restart as long as any latch is On. When the operation interlock is removed by dropping the line 242, indicating that the adder circuits are free, the modify gate line 243 turns On the program add latch, not shown, and the circuits are set up to read out the proper indexing register. If both I and D addresses are to be modified, the D address is modified first and then the I address on the following cycle. When modification is completed, the modify interlock latch 239 is turned Off by a word pulse, and the restart signal will be allowed to turn On the restart latch (not shown). The operation and address registers 32 and 31, FIG. 2*b*, are reset, the new D address and OP code are read in the address and OP registers 31 and 32, through control switches 130, FIG. 2*b*, and the D half cycle of the program step is begun.

The word taken from program step storage 26 contains the actual values as taken from the selected storage output lines 42. Therefore, the tag of this word must be removed before entering the adder. This is done by blanking this tag at the blanking gate switch 249, FIG. 3*a*, and inserting into the adder entry A, either a 0 or a 1, as determined by the tag decode and storage circuits 206 which are selectively directed over the lines 251 and 252. These lines are selectively connected with the adder entry A, B0—Q0 and Q1 lines through mixes 253, FIG. 3*j*.

The value in the specified indexing register is delivered to the adder entry B over the lines 86 to be added to the program step storage word entering from the entry A. Selection of the proper indexing register is accomplished by the tag decode and storage circuits. The proper indexing register is read out at D0–D3 for modification of the instruction I address portion 30 of the word, or at D4–D7 for modification of the data D address portion 28 of the word. The information leaving the specified indexing registers enters the indexing register early switching 82, FIG. 3*e*. Zeros are inserted into the early switching for the remaining six digits of the word. This is necessary to allow the entire ten digits of the program step storage 26 to be handled by the adder.

The output of the early switching 82 is taken to the true complement switching circuits 196, FIG. 3*j*. Here either true or complement controls are provided as a result of the sign of the indexing register. A minus indexing register must be taken to the adder in complement form to be added to the true value of program step storage. Program step storage will always enter in true form for modification because it carries no sign. Data progresses through the B entry switching for modification and to the adder. The B entry control is a function of the modify controls.

Either a carry insert, no carry blank, for a minus indexing register supplied from latches 254, FIG. 2*a*, or a no carry insert, carry blank, for a plus indexing register supplied from latches 255 must be present at the adder at D0, D4, and D8 times. The output of the adder 36 is returned to the program step storage 26, FIG. 2*b*, through a program add gate switch array 256, FIG. 2*b*. A restart to the calculator is caused by the modify controls dropping out at the end of the word modification.

Specific examples will be described to set up the necessary circuits to control address modification. The following instruction word is entered into program step storage 26, FIG. 2*b*, 60 2175 0123—index register IR, A contains 0015+.

Objectives and circuits are set up to modify the data address portion of this instruction word. The resulting instruction word has its D address modified thus:

60 (2175—2000+0015) 0123=60 0190 0123

The circuit objectives are as follows:

(1) Recognize the 2000 tag at D8 time. (2) Turn On the +0 D storage latch 237, FIG. 3*a*, at D8. (3) Turn On D tag A latch 129, FIG. 3*f*, at D8. (4) If operation interlock line 242 is down, turn On modify gate latch 239; turn Off modify interlock at D8 from the D tag A latch. (5) Readout IR A D signal from the related switch 245. (6) Program add gate 249, FIG. 2*b*, at DX. (7) Program add-blanking gate 249, FIG. 3*a*, to enter program step storage to adder blank D8 and substitute a zero. (8) Program add modify gate. (9) Indexing register adder entry B control. (10) Zero fill-in. (11) Readout indexing register A. (12) Readout control. (13) B0—Q0 to adder entry A at D7. (14) No carry inserts at D0, D4 and D8. (15) Restart.

Selected storage lines 42, FIG. 3*a*, enter the B0—Q2 at D8 which passes through the mix 214 and over the line 217 where it switches to turn On the D tag A latch 129, FIG. 3*f*. The B0—Q2 also goes through the mix 235, FIG. 3*a*, to the switch 236 to turn On the +0 D storage latch 237.

The output of the D tag A latch 129, FIG. 3*f*, passes through the mix 237 to raise the D tag line 240. This line operates to turn On the modify gate latch 239 and pull down modify interlock line 241. The modify gate latch will not turn On to raise the modify gate line 243 at WP time or if the operation interlock line 242 is On. However, modify interlock line 241 stays down.

The output line 220 of the D tag A latch 129 leads to a related switch 245 which is conditioned by the modify gate on-line 243. This output proceeds through a mix 256 and over lines 257 and 167 to give the readout A on D signal at the switch 133, FIG. 3*c*. This switch has its other terminal conditioned by the up A—B D line 311 and the D4 to D7 gate. The output signal from the switch 133 passes over the readout and regeneration line 108 to read out the stored data from the indexing register A as previously described. Readout AD line 257, FIG. 3*f*, is also taken to a switch 259 conditioned by the modify gate line 243 and the next D8 to turn Off the D tag A latch 129.

The +0 D storage latch 237, FIG. 3*a*, is allowed to be turned Off at D9 after the D tag A latch 129, FIG. 3*f*, goes Off. This is provided from the no D tag line 248 and D9 at a switch 261, FIG. 3*a*, leading to the inverters 262 whose negative-going outputs turn Off the +0 D storage latch 237 and the +1 D storage latch, if the latter is storing a 1.

The program add gate line 263, FIG. 2*b*, comes up as a result of up modify gate line 243, FIG. 3*f*; modify gate line 243 turns On the program add latch in the calculator, not shown. This stays On until NWP to provide the program add gate on the line 263, FIG. 2*b*. The program add and modify gate lines 263 and 243, respectively, provide coincidence at a switch 265, FIG. 3*i*, whose output extends through a mix leading to the B control line 202. This line conditions the switches 199, FIG. 3*j*, to direct the indexing register output to the adder entry B.

A blanking gate is developed by switching the +0 D storage latch 237, FIG. 3*a*, at a switch 266 with D tag line 240 and D7. This output passes through a mix 267, if a switch 268 has coincidence from the program add and modify gate lines 263 and 243, respectively, to raise the cathodes of the diodes 260. This provides a B0 Q0 adder entry A on the line 251. The output from the mix 267 also extends to a mix 269 leading to an inverter follower 270 to drop the blanking gate switch 249, FIGS. 2*b* and 3*a*, at D7 time to drop the switches 209 and 211, FIG. 2*b*. This allows entry from the program step storage 26, except for D7 when a B0 Q0 is entered at the adder entry A under the control of the line 251. This removes the tag, B0—Q2, 2 stored at D8 in the program step register 26.

Zeros are entered to the indexing register early switching 82, FIG. 3*e*, at D0, D1, D2, D3, D8, and D9 by the zero fill-in line 124 in conjunction with readout or regeneration A and readout control lines 135 and 116 acting through the switch 136, FIG. 3*d*. B0's and Q0's are entered through the mixes 125, FIG. 3*e*. Investigation of all possibilities will result in the proper number of zeros. The inputs to the mix 122, FIG. 3*d*, insure that zeros will not occur at EAP of indexing register, reset, DX, readout time, or D10.

No carry inserts-carry blanks are set up at D0, D4 and D8 time of the modify word time by conduction from a switch 272, FIG. 3*j*, associated with modify gate and indexing register true lines 243 and 197, respectively, and a D0, D4, and D8 gate. This provides an output over a line 273 to the carry blank-no carry insert latch 254, FIG. 2*a*. The normal no carry is blocked by the now down modify interlock line 241, FIG. 3*f*.

Indexing register true add is present on modify unless a minus indexing register sign on the line 172 provides coincidence at a switch 274, FIG. 3*i*, with modify gate line 243 to turn the index register double latch 275 from normal true to complement. This latch is normally reset to true at each DX CP time from a conductor 276 extending from a switch 277 if complement result and complement adjust latches 278 and 279, respectively, are Off.

The restart signal to the calculator is developed as a result of the modify interlock line 241, FIG. 3*f*, going positive at the end of the modify word.

The preceding example was used to modify the data address of program step word. Modification of the instruction address of the word may be accomplished in a similar manner. Sampling of the program step word occurs at D4 time. If a tag is recognized, the related I tag latch 128, FIG. 3*f*, operates and sets up circuits to modify the instruction address portion of the program step word. Also the +0 I or +1 I storage latches 206, FIG. 3*a*, will be turned On to control entry of either B0—Q0 or B0—Q1 to the adder entry A for proper modification and blanking of the program step word at D4.

If a tag is recognized on both the data address and the instruction address of the program step word, modification of both is accomplished before a restart signal occurs. The data address portion D of the instruction word will be modified on the first modify word time. The instruction address portion I will be modified on the following word time. Therefore, the word in program step storage 26 must be taken to the adder 36 twice.

The tag and storage latches 128, FIG. 3*f*, for the instruction address modification must stay up throughout modification of the D address portion. This is accomplished by dropping the related switches 245 by the no D tag line 248. Other controls must remain for the extra word time.

Modification from indexing registers other than indexing register A may be accomplished by sampling other values at D4 or D8 time to turn On other tag latches 127, FIG. 3*f*. A B0—Q4 or B5—Q0, 4 or 5, will turn On a B tag latch. A B5—Q1 or B5—Q2, 6 or 7, will turn On a C tag latch.

A B0—Q3, B5—Q0, or B5—Q2 will turn On a +1 I or D storage latch 206, FIG. 3*a*, and a B0—Q2, B0—Q4 or B5—Q1 turns a +0 I or D storage latch.

The following example is intended to show modification of both addresses, with one of the indexing registers containing a negative value:

Program step word 60 2100 7123

Indexing register $A$=0015+

Indexing register $C$=0001—

After modification 60 (2100—2000+0015) (7123—6000—0001) the program step storage 26 contains 60 0115 1122.

The circuit objectives are as follows: (1) Recognize 6000 tag at D4 and 2000 at D8, FIG. 3*a*. (2) Turn On +1 I storage latch 234 at D4 and +0 D storage latch 237 at D8. (3) Turn On I tag C latch 128, FIG. 3*f*, at D4 and D tag A latch 129 at D8 time. (4) If operation interlock line 242 is Off, turn On modify gate latch 239; turn Off modify interlock at D4. (5) Readout indexing register A signal, data address is modified first. (6) Readout control switch 133, FIG. 3*c*. (7) Program add gate at DX. (8) Program add-blanking gate 249, FIG. 3*a*. (9) Program add-modify gate. (10) Indexing register adder entry B control, FIG. 3*j*. (11) Zero fill-in at D0–D3, D8 and D9, FIG. 3*e*. (12) Readout or regeneration indexing register A at D4–D8. (13) Readout control. (14) B0—Q0 to adder entry A at D7, line 251, FIG. 3*a*. (15) No carry inserts at D0, D4, and D8, line 273, FIG. 3*j*. (16) Allow D tag latch 128, FIG. 3*f*, to drop at D8. (17) Drop +0 storage latch 237, FIG. 3*a*, at D9. (18) Readout indexing register C I sign at DX, FIG. 3*h*. (19) Readout control ROC switch 283, FIG. 3*c*, at DX. (20) Indexing register complement, FIG. 3*j*. (21) Zero fill-in at D4–D10, FIG. 3*e*. (22) Readout or regeneration indexing register C at D0–D3. (23) B0—Q1 at D3, line 252, FIG. 3*a*. (24) Carry inserts at D0, D4, and D8, line 273, FIG. 3*j*. (25) Restart.

Only changes to the previous circuit description will be given in this section.

The +1 I storage latch 234, FIG. 3*a*, will be turned On at D4 time by the following circuit. B5—Q2 enters at the appropriate switch 213, whose output passes through the mix 232 to switch with D4 at switch 233 and turns On +1 I storage latch 234. The ouput of the B5—Q2 switch also passes through the mix 216 and over the conductor 219 leading to a switch 281 which also includes terminals connected to D4 and RIPS line 140. At D4 this switch turns On I tag C latch. The output of this latch extends through the mix 232 and over the line 282 and raises the modify gate line 243 if the operation interlock line 242 is down. In any event the modify interlock line 241 is dropped. The latch output also conditions the switch 245 associated with the RO CI line.

The +0 D latch, FIG. 3*a*, and the D tag A latch 129, FIG. 3*f*, turn On at D8 as previously described. The output of the D tag latch operates through the mix 246 and inverter follower 247 to drop the no D tag line 248. Dropping this line holds a negative bias on the RO CI switch 245. This switch is held at the negative value until the D tag A latch goes Off. Therefore, modification of the data address will occur first in the manner previously described. After this modification, the program step register 26 contains 60 0115 7123. The D tag A latch is turned Off at D8 from the switch 259 conditioned by modify gate line 243 and RO AD line 257. Turning Off of this latch raises the no D tag line 248 through the mix 246 and inverter 247 and the +0 D latch 237, FIG. 3*a*, is turned Off from the switch 261 acting through the inverter 262 at D9. Raising the no D tag line 248 also conditions the RO CI switch 245, FIG. 3*f*.

The I tag C latch cannot be turned Off until the readout C I gate is developed. This latch then controls the modify gate latch 239 and holds the modify interlock line 241 negative by holding the I tag line 282 positive. The output of I tag C latch will then switch with no D tag and modify gate lines 248 and 243, respectively, to give the RO CI signal. This signal extends to a mix, not shown, associated with RO CD and appears at a switch 283, FIG. 3*c*. This switch is conditioned from a switch 284 which is associated with I tag, no D tag, modify gate and program add lines 282, 248, 243, and 263, respectively. The output from this switch extends through a mix to the switch 131 which is conditioned by a D0–D3 gate. The switch 131 drives the cathode follower 132 to raise the switch 283.

The output of the switch 283 passes through the related mix 117 to raise the associated readout and regeneration lines to provide the readout or regeneration C gate. This gate is used to control read out of indexing register C, not shown, at D0–D3 time. The RO CI line, FIG. 3*f*, is directed back to a switch 285, associated with modify gate line 243 and D4. This turns Off the I tag C latch at D4. As the I tag line 282 drops, an inverter follower 286, FIG. 3*a*, provides a positive output to a switch which conducts at D5 to an inverter 287 whose output turns Off the +1 I storage latch.

The B0—Q1 adder entry is developed on the line 252 by switching the output of the +1 I storage latch 234 at a switch 288 with no D tag and I tag lines 248 and 282, respectively, and D3. This output extends through a mix 289, the program add modify gate switch 268 is positive to permit the B0—Q1 line 252 to raise and this condition passes through the diode mixes 253, FIG. 3*j*, leading to the adder. This output from the switch 288 also mixes at 269 to lower the blanking gate switch 249 at D3. In this manner the 7XXX is blanked and a 1XXX is substituted therefor.

Zero fill-in again is a function of readout or regeneration control to develop zeros at D4–D10, as previously described.

The indexing register complement line 198, FIG. 3*i*, is positive as a result of reading out the minus sign of indexing register C on the line 172 and the modify gate line 243 at the switch 274 which turns On the index register latch 275 and raises the complement latch line 198. This line extends to selected ones of the true-complement switches 196, FIG. 3*j*, to tens complement the index register for one word time. The complement and modify gate lines 198 and 243 and D0, D4 and D8 provide coincidence at a switch 291 to raise a line 292 leading to the carry insert-no carry blank latch 255, FIG. 2*a*.

The restart signal on the line 243 is again a result of modify interlock line 241 going positive at the end of modification. At the end of the modify operation, the program step storage contains 60 0115 1122.

The 9XXX addresses are modified in a similar manner. Recognizing tags on 9XXX addresses will occur at D3 and D7 times, FIG. 3*a*. The tags at D3 or D7 must be delayed one digit time to switch with a nine, B5—Q4, at D4 or D8. If this condition exists, the associated I or D tag latches 127, FIG. 3*f*, will be turned On. Storage latches 221 and 222, FIG. 3*a*, for the I or D are turned On for all 9XXX addresses if the modify interlock line 241 is down. The output of these latches switch with either D2 or D6 gates and modify gate line 243 to enter B0—Q0 on the line 251 leading to adder entry A at the proper time and to drop the blanking gate 249 from the inverter follower 270 at D2 and D6. This blanks any value carried at the hundreds position of a program word having a 9XXX address and substitutes zeros therefor to provide an effective address.

ARITHMETIC CODES

Arithmetic operations may be performed with the indexing registers similar to the arithmetic operations with the standard accumulator. The operation codes for accomplishing this will be hereinafter set forth. All operation codes are not covered individually; however, each type of operation is generally described in specific examples.

Use of valid addresses of program step storage from 0000–1999 will be referred to as D operations.

To illustrate the reset add operation from the data address portion of the program step storage 26, the following example is given:

Instruction: 80 0001 XXXX. Result: *IR R*=0001+

Given the above instruction, the calculator should add the data from the data address portion D of the program step word to the reset indexing register A.

The data from the program step storage 26 must be taken to the adder, zeros must be taken from the indexing register through the true controls and adder B entry switching 199, FIG. 3*j*, to be merged at the adder with data from the program step storage 26 arriving at the A entry. At the adder a no carry insert-carry blank must be present to have an output. The added data, D5–D8, will return to indexing register A through the readin controls. Si°n latches will be set.

The circuit objectives are as follows: (1) Recognize 80 code, FIG. 3*b*. (2) Develop add signal. (3) Develop add or subtract signal, FIG. 3*c*, and negative add or subtract. (4) Develop A—B D control, FIG. 3*i*. (5) Develop indexing register true control. (6) Develop index register B control. (7) Develop adder entry A true. (8) Cause readout zeros of indexing register A, FIG. 3*e*. (9) Cause readin to indexing register A, FIG. 3*d*. (10) Set sign latch to plus, FIG. 3*h*. (11) No carry insert-carry blank, FIG. 3*j*. (12) Cause restart.

A D control line 294, FIG. 3*b*, is connected to control switches 295 and 296. These switches are associated with the operation register latch B5T—Q3T and B5T—Q0T lines. A B5T—Q3T output from the switch 295 extends over a line 297 to condition one terminal each of a group of add switches 298. The units position of the operation register is sampled at a group of switches 299 and one of these switches provides an output over a related line whenever a 0, 1, 2, 3, 8 or 9 appears. With the X0 code from the operation register B0U—Q0U units position this provides coincidence at the related switch 298. This will develop the code 80 on a line 301 connected to a mix 322 whose output is parallel connected to one terminal each of RIAI and RIAD switches in the switch groups 323 and 324, respectively. It also passes through a mix 302 and over a line 303 to develop the add signal. The add signal passes through a mix 304, FIG. 3*c*, to drive an add or subtract line 305 and to drive an inverter 306 to provide a negative add or subtract signal on a line 307. These signals are used to provide true or complement controls and carry or no carry inserts and adder entry A or B switching.

The add or subtract line 305 is directed to a switch 308, FIG. 3*i*, which is also connected with B0 thousands of the address register 31 and DP to turn On an A—B D control latch 309. Raising of the related A—B D line 311 will provide for indexing register data flow for the D address portion of the word. This is necessary for all arithmetic operations from the program step storage because only the data at the D position is available to the indexing register at this time. The A—B D control latch 309 and the index register true-complement latch 275 are reset at DX, CP time from the switch 277 is complement result and complement adjust latches 278 and 279 are Off. The index register latch 275 is turned Off by the line 276, while the A—B D latch is turned Off by driving the output of a connected inverter 290 down.

The A—B D control line 311 provides coincidence at a switch 312 with complement adjust off line 313 to raise the IR B control line 202. This gate will direct indexing register A data to the B entry of the adder from the switches 199, FIG. 3*j*.

The A—B D control line 311 also provides coincidence with OP code 8X line 314, FIG. 3*h*, at the switch 176 to develop the reset operation codes pulse through the condenser 177 connected to the line 315. The output from the associated condenser 177 provides an output from the switch 178 now conditioned by the line 174. This output will set the plus sign latch 161, while the minus sign latch 162 is turned Off from the switch 179 conducting to the inverter 173, as previously described. The reset operation codes pulse on the line 315 extends through the mix 168 to bring up the index register plus signal on the line 171. This signal is used on subtract operations from program step storage to turn On the indexing register latch 275, FIG. 3*i*, or for complement operations from the distributor to turn a program step or distributor latch 316 to complement.

The A—B D control line 311 also leads to a switch 317 which provides coincidence with complement adjust off line 313 and program step or distributor plus line 321 to raise the adder entry A true line 318. This permits the data from the program step register to enter the adder in true form.

The index register latch 275 set to true provides an output on the true line 197 to a switch 319, FIG. 3*j*, to develop coincidence with add or subtract and program step or distributor true lines 305 and 321 to develop a no carry insert-carry blank at D0 on the line 273. This is repeated at D4 and D8.

Readin controls are set up by the operation codes. The code 80 cathode follower output on the line 301, FIG. 3*b*, extends through the mix 322 leading to the RIAI and RIAD switches disposed in the groups 323 and 324, respectively. Switches 323 each have one terminal parallel connected to an A—B I latch line 325 and the switches 324 are each parallel connected to the A—B D latch line 311. Coincidence at the RIAD line 311 provides an output through a mix 326 and over the line 174 to the switch 151, FIG. 3*c*. The other terminal is conditioned from the output of the switch 153 connected to the A—B D line 311 and the mix 160 to provide the digit gates D5–D8. The output from the switch 151 extends over the RI IRA line to set up the readin by driving the connected switches 154, FIG. 3*d*, and over the line 157 to condition the switches 79 for readin from the adder output lines 51 during D5–D8. During this interval, zeros are supplied to the adder entry B during D1–D4, and the program word enters the A side of the adder in true form. However, only the data address value is permitted to enter the index register storage. This is directly under the control of the switch 153, FIG. 3*c*.

The restart signal is developed at a restart line 327, FIG. 3*j*, from a switch 328 as a result of coincidence of the positive values on A—B D, B control and complement result off lines 311, 202 and 329, respectively, appearing at D10.

To illustrate the reset subtract codes and complement adjust operation, the following example is given:

Instruction: 81 0001 XXXX. Result: *IR A*=0001—

The flow of data is controlled much the same as for the reset add code, except that the data from program step storage must be taken to the adder in complement form. A carry insert is necessary at D4 to provide the tens complement and a restart at D10 of the subtract word must not occur. A complement result always occurs on a reset subtract code. This must be recognized and set up a complement adjust operation and change the sign latches to minus.

The complement adjust operation consists of entering zeros to the adder B entry and entering the indexing register values through the complementing circuits to the adder A entry. A carry insert is entered at D4 time. The result is taken back to the indexing register through the readin controls. A restart is initiated after the complement adjust cycle.

The circuit objectives are as follows: (1) Recognize 81 code, FIG. 3*b*. (2) Develop subtract signal, FIG. 3*h*. (3) Develop add or subtract signal and negative add or subtract, FIG. 3*c*. (4) Develop A—B D control, FIG. 3*i*. (5) Develop index register true control. (6) Develop index register B control. (7) Develop adder entry A complement. (8) Cause readout zeros from indexing register A, FIG. 3*e*. (9) Cause readin to indexing register A, FIG. 3*d*. (10) Set sign latch 161 to plus, FIG. 3*h*. (11) Carry insert at D4, FIG. 3*j*. (12) Recognize complement result, FIG. 3*h*. (13) Prevent restart, FIG. 3*j*. (14) Cause complement adjust operation, FIG. 3*i*. (15) Cause readout of indexing register A, FIG. 3*c*. (16) Develop indexing register complement gate, FIG. 3*i*. (17) Develop indexing register A control. (18) Cause carry insert at D4, FIG. 3*j*. (19) Set sign latch 162 to minus, FIG. 3*h*. (20) Add zeros to adder B, FIG. 3*i*. (21) Cause indexing register A to readin, FIG. 3*d*. (22) Cause restart, FIG. 3*j*.

Because of the similarity in circuits, only the difference from the reset add code circuits will be described.

To permit the entry of program step storage in complement form, an adder entry A complement gate is developed from a switch 331, FIG. 3*i*, having a conductor 332 leading to program step complement switching 333, FIG. 3*j*. To accomplish this, the program step or distributor latch 316, FIG. 3*i*, must be set to raise its complement line 334, the complement result latch off line 329, and the A—B D line must also be up.

On an 81 OP code, reset subtract index register, an output is provided from the switch 295, FIG. 3*b*, which extends over the line 297 to the related switch array 298. The B0U—Q1U output from the switch array 299 leads to a related switch 298 to provide an output on a line 335 extending through a related cathode follower to the line 301 leading to the mix 322 whose output leads to the RIAI and RIAD switches. In addition, the output on the line 335 extends through a mix 336 to raise a subtract line 337. This line leads to the mix 304, FIG. 3*c*, to raise the add and subtract line 305.

The OP 8X line 314, FIG. 3*h*, and A—B D line 311 conduct through the switch 176 to develop a capacitor coupled shot on the line 315 to turn On the plus latch 161 from the switch 178. The capacitor coupled shot on the line 315 extends through the mix 168 over the IR plus line 171 to a switch 338, FIG. 3*i*, where it provides coincidence with subtract and on A—B D lines, 337 and 311 to turn On the program step register and distributor latch 316. Turning On this latch raises its complement line 334 and conditions the switch 331, along with the A—B D and the complement adjust off lines 311 and 313, to develop an output leading to the adder entry A complement line 332 to provide a complement add to the program word. This complement value is added to zeros supplied from the adder entry B. Complement adding a 0001, for example, will store 9999 in the selected index register.

Since a no carry and a carry test is made from the switches 187 and 189, FIG. 3*h*, at D8, no carry occurs at this time. The switch 187 is therefore operative over a line 339 to turn On the complement result latch 278, FIG. 3*i*. Turning On of this latch raises its related on line 341, switches with D10 at the switch 184, FIG. 3*h*, in series with switch 185 to set the minus latch 162. The plus latch 161 was turned Off at D1 from the latch 181, conditioned with program step register complement On, complement adjust Off, and adder and subtract lines 334, 313 and 305, respectively, providing coincidence at the switch 342.

At the next word pulse, the complement result latch 278, FIG. 3*i*, is turned Off, and a capacitor coupled shot extends over a line 343 to turn On the complement adjust latch 279. Turning On of this latch raises the related complement adjust line 344 to turn On the index register latch 275 to raise the index register complement line 198. The output from the on line 198 of the latch 275 extends to and conditions certain of the arrays of true-complement switches 196, FIG. 3*j*, associated with the early output data lines 80 of the index registers.

During this interval, the A—B D line 311 and complement adjust line 344 provide coincidence at a switch 345 to provide an output on the A control line 203. This A control line 203 conditions the switches 201, FIG. 3*j*, to direct the data in the index register to the adder entry A in complement form. During this interval, the line 344 extends to the special digit add circuitry 52, FIG. 2*a*, to add zeros to the adder entry B.

At the next D10 the switch 328, FIG. 3*j*, is conditioned to provide a restart pulse over the line 327 leading to the calculator. Operation of this restart initiates the next operation wherein the value in the selected index register is delivered in complement form to the adder entry A and return to the index register for storage. The next word pulse turns Off the complement adjust latch 279, FIG. 3*i*. Thus the original data 0001 at the D address of the program word is placed in the index register, and the minus latch 162, FIG. 3*h*, therefor is set.

The carry insert on the line 292 is provided by coincidence of A—B D control and program step or distributor complement lines D4, 311 and 334 at a switch 246, FIG. 3*j* with D4.

The output from the switch 342, FIG. 3*h*, develops the complement control gate on the line 347 which extends to the switch 181 in series with the switch 182 conditioned by the readin A I and D line 174 to reset both sign latches by means of the inverters 183 and 173.

Complement control line 347 also switches with no carry line 186 and A—B D control line 311 (switch 193) at the switch 187 to turn On the complement result latch 278, FIG. 3*i*. The on line 341 of the complement result latch switches with D10 at the switch 184 to turn On the minus sign latch. The complement result off line 329 prevents a calculator restart from the switch 328, FIG. 3*j*, at D10. The complement result latch 278 is reset at WP time and causes the complement adjust latch 279 to come On. Either one of these latches being On prevents reset of the A—B D control latch 309 or the indexing register true or complement latch 275.

The complement adjust on line 344 also extends to switches 348, FIG. 3*b*, whose outputs are directed to the readout I and D switches 323 and 324. The related switch 324 associated with the A—B D control line 311 provides the readout A D signal. This signal extends over a line 349 to the mix 256, FIG. 3*f*, whose output in turn extends over the lines 257 and 167 to the switch 133, FIG. 3*c*. The output from this switch provides the readout or regeneration A gate. This gate will cause indexing register A to read out as previously described.

The complement adjust on line turns On the index register latch 275 to complement and acts through the switch 345 to provide the indexing register A control on the line 203. The index register complement line 198 switches with A—B D control line 311 and D4 at the switch 246, FIG. 3*j*, to provide a carry insert on the line 292.

Readin controls for the complement adjust cycle are the same that were used for the add and subtract cycle. A restart is caused the same as on the add operation after the complement result latch 279, FIG. 3*i*, goes Off.

Add codes 50, 52, and 58 for the D address in the program word operate like codes 80, 82, and 88 with the following exceptions:

(1) The readout gate for the indexing register must be brought up to allow the indexing register data to flow to the adder and be combined with data from the program step storage. Readout indexing register A D is a result of the switch 296, FIG. 3*b*, conditioning an array of switches 351 which are selectively rendered conductive from the OP register units position. The output from the switches 351 provide the add or subtract conditions on the respective lines 303 and 337, and extend to the RI and RO switches 323 and 324 in a selective manner. The readout A D is provided from the A—B D control line 311. Readout IRB D is a result of code 52 and A—B D line. Readout IRC D is a result of code 58 and A—B D line.

(2) Sign latches will be read out by the readout gates to determine whether the operation is to be a true or complement add operation. The following table shows the operations possible. The sign of the program step word is always taken as positive.

| Operation | IR sign | Add gates |
|---|---|---|
| Add | IR+ | IR true. AEA true. |
| Add | IR− | IR complement. AEA true. |
| Subtract | IR+ | IR true. AEA complement. |
| Subtract | IR− | IR true. AEA true. |

The various outputs from the analysis are developed at the switches 340, 350, 360, and 365, FIG. 3*i*.

(3) Readout zeros are not present; however, zero fill-in is present at D0, D1, D2, D3, D8, and D9.

Subtract codes 51, 53, and 59 from the D address in the program word operate like codes 81, 83 and 89 with the following exceptions:

(1) A readout gate must be developed as in add codes.

(2) The add gates must be developed as shown in the above table under add codes. This is accomplished by reading out the sign of the indexing register and switching with the subtract signal.

(3) The complement control on line 198 must be up on all complement add operations and as a result, reset the sign latches 161 and 162, FIG. 3*h*. The plus sign latch 161 will be set at D8 from the series switches 193 and 189 if a carry from the latter is present or the minus latch 162 will be set at D10 from the series switches 184 and 185 if a complement adjust cycle is to follow.

(4) Zero fill-in is present at D0, D1, D2, D3, D8, and D9, as previously described.

Use of valid data addresses of program step storage except 0000–1999 will be referred to as I operations. These operations will consist of placing in the distributor 37 the data from the word designated by the data address of the program step word and adding the four low order digits of the distributor to the specified indexing register. To illustrate this operation, the following example is given:

Instruction 51 8002 XXXX
Indexing register $A$=0075+
Lower accumulator=00 0000 0050+
Result in indexing register $A$=0025+

Given the above instruction, the calculator loads the distributor 37 with the data from the lower accumulator 8002 through the switch arrays 71 and 44, FIG. 2*b*, and adds it to the data in the indexing register A. Data flow paths must be opened from the distributor to the adder B entry and from indexing register A to the adder A entry. The data must be taken back to the indexing register A at D1, D2, D3, and D4 times.

The circuit objectives are as follows:

(1) Develop code 51, FIG. 3*b*. (2) Develop subtract signal. (3) Develop add or subtract and negative add or subtract, FIG. 3*c*. (4) Develop add or subtract I, FIG. 3*i*. (5) Develop readin distributor from lower accumulator, FIG. 2*b*. (6) Turn On distributor back signal latch, FIG. 3*i*. (7) Develop A—B I control. (8) Develop indexing register A control. (9) Turn program step or distributor latch 316 to complement. (10) Develop adder entry B complement gate 199, FIG. 3*j*. (11) Develop readout A I, FIG. 3*c*. (12) Develop readin A I. (13) Develop carry insert-no carry blank at D0, FIG. 3*j*. (14) Develop complement control, FIG. 3*i*. (15) Set sign latch to plugs, FIG. 3*h*. (16) Develop restart, FIG. 3*j*.

Development of code 51 is the result of switching D control line 294, FIG. 3*b*, with operation code B5T—Q0T at the switch 296 to develop 5X codes. This output is directed to the switches 351 and conducts from the associated B0U—Q1U output from the units switches 299 connected to the operation code register 32 to develop code 51 on the line 340. The code 51 switch output of mix 336 passes the subtract code over the line 337 and the add or subtract on the line 305, FIG. 3*c*. Add or subtract also switches with B5 thousandths of the address register to develop the add or subtract I signal. The code 51 output line 340, FIG. 3*b*, also extends through mixes 322 and 352 leading to the switches 323 associated with the A—B I control line 325 to develop the readout A I and readin A I signals.

The readin distributor line 58 is developed by the enable readin, start readin, readin distributor sequence from the calculator, not shown. Add or subtract I is used in this sequence in place of the tens and sixties D control.

A distributor back signal latch 353, FIG. 3*i*, is turned On at D10 through a switch 354. This switch is connected to the readin distributor line 58, add or subtract line 305 and B5 thousands of the address register 31. This latch can also be turned On from a switch 355 at DX, if the data address of the instruction is 8001, 800X, B0U, and Q1U. The signal line 356 extends to a switch 357 whose terminals are connected to DX and D pulse.

With the latch 353 On, the switch 357 conducts to turn On the A—B I control latch 358 to raise its output line 325. The latch 353 is turned Off at D1 after the switches 354 and 355 are dropped.

The indexing register A control line 203 is raised directly through a mix 359 connected to the line 325 associated with the A—B I control latch 358. Under these conditions, the switches 201, FIG. 3*j*, are conditioned so that the contents of the designated indexing register always enters the A entry of the adder.

As previously mentioned, readout A I will be developed as a result of A—B I control latch 358 turning On. Thus the output from the ROAI switch, FIG. 3*b*, extends over a conductor 361 leading to a mix 362, FIG. 3*f*, whose output passes over lines 363 and 167 to the switches 165 and 166, FIG. 3*h*, to cause the plus sign latch 161 to read out. The plus condition of indexing register A extends over the line 171 to a switch 364, FIG. 3*i*. This switch is also connected to the A—B I control, distributor back signal latch lines 325 and 356, respectively, and the output from a switch 365 connected to the distributor plus and subtract lines 366 and 337, respectively. This will turn the program step or distributor latch 316 to complement and raise the on line 334.

Program step or distributor complement line 334 leads to a switch 367 also connected to complement adjust off and A—B I control lines 313 and 325, respectively, to develop the adder entry B complement gate on a line 368. This line conditions a switch 370, FIG. 2*a*, which directs the data from the complementing means 380 to the adder entry B.

As mentioned previously, the A—B I line 325 operates from the ROAI switch, FIG. 3*b*, to raise the line 167 leading to the switch 133, FIG. 3*c*, to provide an output with a D0–D3 gate supplied from the switch 131. An output from the switch 133 conducts over the RO regeneration line 108 to develop the readout or regeneration gate.

The output from RIAI switch, FIG. 3*b*, extends over the line 174 to the switch 151, FIG. 3*c*, which conducts when the switch 152 is conditioned from the A—B I line 325 and the D1–D4 gate. The output from the switch 151 extends to the switching 110, FIG. 3*d*, to develop the readin indexing register readin A gate. This of course conditions the switches 79, FIG. 3*d*, to accept the adder output at D1–D4.

A carry insert-no carry blank is developed on the line 292, FIG. 3*j*, at a switch 371 which is conditioned by program step or distributor complement and A—B I control lines 334 and 325, respectively, at D0.

The complement control line 347, FIG. 3*h*, is developed from the switch 342 upon coincident positive values on the add or subtract, complement adjust off, and program step or distributor complement lines 305, 313, and 334, respectively. This output is directed to the switch 181 with D1 whose output extends to the switch 182 associated with the RIAI and D line 174 to turn both sign latches 161 and 162 Off by means of the inverters 183 and 178, respectively. The plus sign latch 161 is turned On at D4 from the switch 192 associated with the A—B I control line 325 which conducts to the switch 189 connected to the carry test line 188. This is the end of the operation at which time the indexing register A now stores 0025+.

The restart signal on the line 327, FIG. 3*j*, is developed at D10 time from the switch 328 as on the add operations.

The functions of reset subtract I codes 81, 83, and 89 are similar to reset subtract codes D with the following exceptions:

(1) Data must first be loaded in the distributor 37, FIG. 2*b*, as in subtract I codes.

(2) Data flow is the same as for subtract I codes.

(3) Data flow gates are available at I time.

(4) Carry insert-no carry blank is entered from the line 329, FIG. 3*j*, at D0.

The functions of add I codes 50, 52, and 58 are similar to add codes D with the following exceptions:

(1) Data must first be loaded in the distributor as in subtract codes I.

(2) Data flow is in true form from the distributor 37 to add entry B and from the indexing register through indexing register true or indexing register complement switching 196, FIG. 3*j*, to adder entry A.

(3) Data flow gates are available at I time.

(4) Readout and readin to indexing register is at I time.

The functions of reset add I codes 80, 82 and 88 are similar to reset add codes D with the following exceptions:

(1) Data must first be loaded in the distributor as in subtract codes I.

(2) Data flow is in true form from the distributor to adder entry B, and zeros from the indexing register in true form to adder entry A.

(3) Data flow gates are available at I time.

For all data addresses 9000–9059, 8000, 8002 and 8003, the first function of the operation is to read data into the distributor 37, FIG. 2*a*, from the address specified. For the 8001 address no readin distributor is necessary. The specified operation then proceeds as previously described. Data addresses of 8005, 8006, and 8007 in the program word are not used with indexing register operation codes.

The on-time output of the indexing registers is controlled by a readout on-time gate developed on the line 145, FIG. 3*b*. This gate is generated from switches 372 and 373. The switch 372 conducts when the readin program step line 140 is raised and 8XX5, B5 or above appears in the address register 31. The switch 373 conducts when the readin distributor line 58 is raised under the same address conditions, to provide for loading of the distributor 37, FIG. 3*b*, from the indexing registers 77, FIG. 2*a*. When the switch 372 is raised, the indexing register delivers its data on time to the program step register 26, FIG. 2*b*.

Readout controls also must be developed. This is accomplished by sampling the address registers by the switching 374, FIG. 3*b*, whose outputs indicate an 8005, 8006 or 8007 address. The outputs from these lines are selectively directed through mixes leading to the ROXI switches 323 which are under the control of the A—B I line 325. On this type operation the ROOT line 145 extends through a mix 375, FIG. 3*i*, to raise the A—B I, 8XXX or 90XX, control leading to switches 364 and 376.

The readout control extending from the switch 131, FIG. 3*c*, will allow the indexing register to read out early D0–D3, and the early output develops the on-time output at D1–D4. Zeros will be read out D5–DX as a result of the readout line 135 operating the switch 136, FIG. 3*d*, leading to the zero fill-in line 124.

When an instruction address is 8005, 8006, or 8007, the readout on-time gate is the result of a readin program step signal supplied to the switches 43. An output extends from the switch 372 with 8XX5–8XX7 addresses to raise the readout on-time line 145. This allows the on-time output of the indexing register to leave on the lines 81, FIG. 3*e*, and enter the selected storage lines 42 and set up the readout controls.

Branching operations are provided by testing the indexing registers for a nonzero condition or a minus condition.

*Branch on Nonzero Codes 40, 42 and 48*

In FIG. 3*g* there is shown a plurality of zero and nonzero double latches 381, 382 and 383 which are associated with the indexing registers A, B, and C.

An indexing register is reset to its zero state by the indexing register reset line 115. Each latch is also reset at the time its corresponding register reads in by means of the related RI IRX line. The output of each side of each latch extends to a related switch 120, FIG. 3*e*, to condition the same. The latches are set during the following regeneration cycle and read out by directing the B5, Q1–Q4 outputs of capacitor storage from the points G, FIG. 3*e*, to a mix 383, FIG. 3*g*, whose output in turn is parallel connected to switches 384. These switches also include C pulse terminals and selective connections to the RO and regeneration lines. The indexing register A nonzero latch 381 is turned On by the appearance of a bit on either of the B5, Q1, Q2, Q3 or Q4 lines. This action raises the nonzero line 385 and drops the zero line 386.

The nonzero output of the latch 381 is tested at a switch 387 which is conditioned by the B0U—Q0U output line 388 from the related switch 299, FIG. 3*b*, associated with the operation register. An output from the switch 387, FIG. 3*g*, extends through a mix and conductor 389 to a terminal 391. It is only during a forties code operation that this terminal is permitted to raise. This terminal is controlled from a switch 392.

The switch 392 is conditioned by the D control line 294 and B0T and Q4T in the operation register. Conduction of this switch raises the cathodes of the diodes 393 to permit the line 389 to raise if a nonzero condition is indicated. If nonzero, the next instruction is taken from the data address of the program step word. If the index register contains all zeros, the switch 384 is held down by the mix 383 and the line 386 remains up. This causes a conditioned zero switch 393 to conduct through a mix and over a line 394 to a terminal 395. Raising of this terminal under the control of the switch 392 permits the restart signal to the calculator wherein the next instruction address is the I address of the program step word.

Branch on minus codes 41, 43, 49 test the output of the plus latches 161, FIG. 3*h*, to develop a restart or test the minus latches 162 to develop a D for I signal.

Code 41 in the operation register 32 tests the indexing register A sign latches. If the plus latch 161 is On, the positive value on the line 163 is directed to a switch 396, FIG. 3*g*, which is conditioned from the B0U—Q1U line 397, FIG. 3*b*. The output from the switch 396, FIG. 3*g*, passes through a mix to the line 394 to raise the terminal 395, with switch 392 conducting, to develop a restart signal which uses the I address of the program word as the address of the next program step word. If the minus latch 162, FIG. 3*h*, is On, its output on the related line 164 is directed to a switch 398, FIG. 3*g*, also positive and conditioned by the units line 397. The output from this switch passes through a mix to the line 389 to raise the same, with the switch 392, to develop the use D for I signal at the terminal 391. This uses the data address as the instruction address for the next program step word.

Operation codes 42, 43, 48 and 49 will operate in a similar manner, except the B and C latches 382 and 383, respectively, and related switches are brought into operation.

It can be seen that many possible paths or steps may be automatically taken in performing an indexing operation. The steps will, to a large degree, depend upon the outcome or determination found by the tag analysis. However, each possible step that follows is automatic and requires no further instruction from the programmer.

The inputs to the circuit shown in FIGS. 3*a* to 3*j* are intended to be supplied from the above-mentioned Hamilton et al. application. The major portion of these inputs are pulses which are primarily developed from the timing track on the drum 22 and the output from the single digit adder 36 which is sampled at various times during the manipulation of the word of data. Also the outputs from this circuit are intended to be delivered to the calculator in timed relation to set up various gates, switches, and latches. In order to tie the index register controls with the Hamilton calculator Patent 2,959,351 as a more detailed embodiment, the various input and output lines in the circuit are enumerated along with the figure number of the Hamilton et al. Patent 2,959,351 from or to which that line is connected at an appropriate terminal. The connections may be readily located by referring to the figure number associated with the symbols or notations.

*Inputs From Calculator*

| | Fig. Nos. of Hamilton et al. Patent 2,959,351, Serial No. 544,520 |
|---|---|
| Selected storage lines: | |
| B0 | 73*b*. |
| B5 | 73*b*. |
| Q0 | 73*b*. |
| Q1 | 73*b*. |
| Q2 | 73*b*. |
| Q3 | 73*b*. |
| Q4 | 73*b*. |
| Adder output lines: | |
| B0 | 68*c*. |
| B5 | 68*c*. |
| Q0 | 68*c*. |
| Q1 | 68*c*. |
| Q2 | 68*c*. |
| Q3 | 68*c*. |
| Q4 | 68*c*. |
| Address register: | |
| B0TH | 71*a*. |
| B5TH | 71*a*. |
| Q3TH | 71*a*. |
| B5U | 71*c*. |
| Q0U | 71*c*. |
| Q1U | 71*c*. |
| Q2U | 71*c*. |
| Program register: | |
| OP B0T | 69*b*. |
| OP B5T | 69*b*. |
| OP Q0T | 69*e*. |
| OP Q3T | 69*c*. |
| OP Q4T | 69*c*. |
| OP B0U | 69*b*. |
| OP B5U | 69*b*. |
| OP Q0U | 69*e*. |
| OP Q1U | 69*d*. |
| OP Q2U | 69*d*. |
| OP Q3U | 69*c*. |
| OP Q4U | 69*c*. |
| Program step register: | |
| Early output | 62*d*. |
| D control | 81*c*. |
| DX | 58*a*. |
| D0 | 58*b*. |
| D1 | 58*b*. |
| D2 | 58*c*. |
| D3 | 58*c*. |
| D4 | 58*a*. |
| D5 | 58*a*. |
| D6 | 58*b*. |
| D7 | 58*b*. |
| D8 | 58*b*. |
| D9 | 58*c*. |
| D10 | 58*c*. |
| AP | 54*d*. |
| BP | 53*f*. |
| CP | 54*d*. |
| DP | 53*d*. |
| EAP | 54*b*. |
| ENAP | 54*b*. |
| WP | 54*b*. |
| Odd digit | 55*b*. |
| Even digit | 55*d*. |
| Adder output carry test latch | 68*e*. |
| Adder output no carry test latch | 68*e*. |
| Readin distributor | 61*d*. |
| Distributor plus | 85*r*. |
| Distributor minus | 85*r*. |
| Readin program step | 62*b*. |
| Program add | 86*b*. |
| Operation interlock | 87*i*, 79*l*. |
| Manual reset | 69*a*. |

Any combination of D1–D10, lower or upper may be provided by switching the particular digits with the upper or lower word lines. The switching is shown in enough instances to clearly illustrate the arrangement. For example, a negative D1 may be provided by taking the output from an inverter which is connected to the D1 line.

The outputs from the indexing register control circuit shown in FIGS. 3*a* to 3*j* may be connected to approprite terminals located on the listed figure numbers.

| | Fig. Nos. of Hamilton et al. Patent 2,959,351, Serial No. 544,520 |
|---|---|
| Selected storage lines: | |
| B0 | 73*b*. |
| B5 | 73*b*. |
| Q0 | 73*b*. |
| Q1 | 73*b*. |
| Q2 | 73*b*. |
| Q3 | 73*b*. |
| Q4 | 73*b*. |
| Adder entry B: | |
| B0 | 67*a*. |
| B5 | 67*a*. |
| Q0 | 67*c*. |
| Q1 | 67*c*. |
| Q2 | 67*c*. |
| Q3 | 67*b*. |
| Q4 | 67*b*. |
| Adder entry A: | |
| B0 | 66*b*. |
| B5 | 66*b*. |
| Q0 | 66*a*. |
| Q1 | 66*a*. |
| Q2 | 66*a*. |
| Q3 | 66*b*. |
| Q4 | 66*b*. |
| Special digit add: 0 | 86*g*. |
| Complement program adder entry A | 66*a* and 66*b*. |
| Program register blanking gate | 66*c* (program step add gate) |
| Modify interlock | 81*a*, switch 861. |
| Modify gate | 86*b* (1037). |
| To calculator restart (use I of 0 or +) | 81*f*. |
| Use D for I (use D if not 0 or −) | 81*a*. |
| A and S | 81*c*. |
| Not A and S | 67*g* (1045). 67*d* (switches with distributor complement add gate). |
| Restart | 81*f* (all restarts line). |
| Program step add gate | 66*c*. |
| Adder entry B true | 67*g* (mix with output switch 1045). |
| Adder entry B complement | 67*c* (mix with input to parallel cathode followers below Q0). |
| Adder entry A true | 66*c* (mix with program step add gate). |
| Carry insert—No carry blank | 85*e*. |
| Carry blank—No carry insert | 85*e*. |
| Distributor true add gate | 85*r*. |
| Distributor complement add gate | 85*r*. |
| Turn Off accumulator regeneration | 85*c*. |
| Add AP and adder reset | 68*a*. |
| Turn On accumulator readin gate | 85*h*. |
| Readin distributor from accumulator | 61*d*. |
| Distributor regeneration | 61*d*. |

Figure 15:
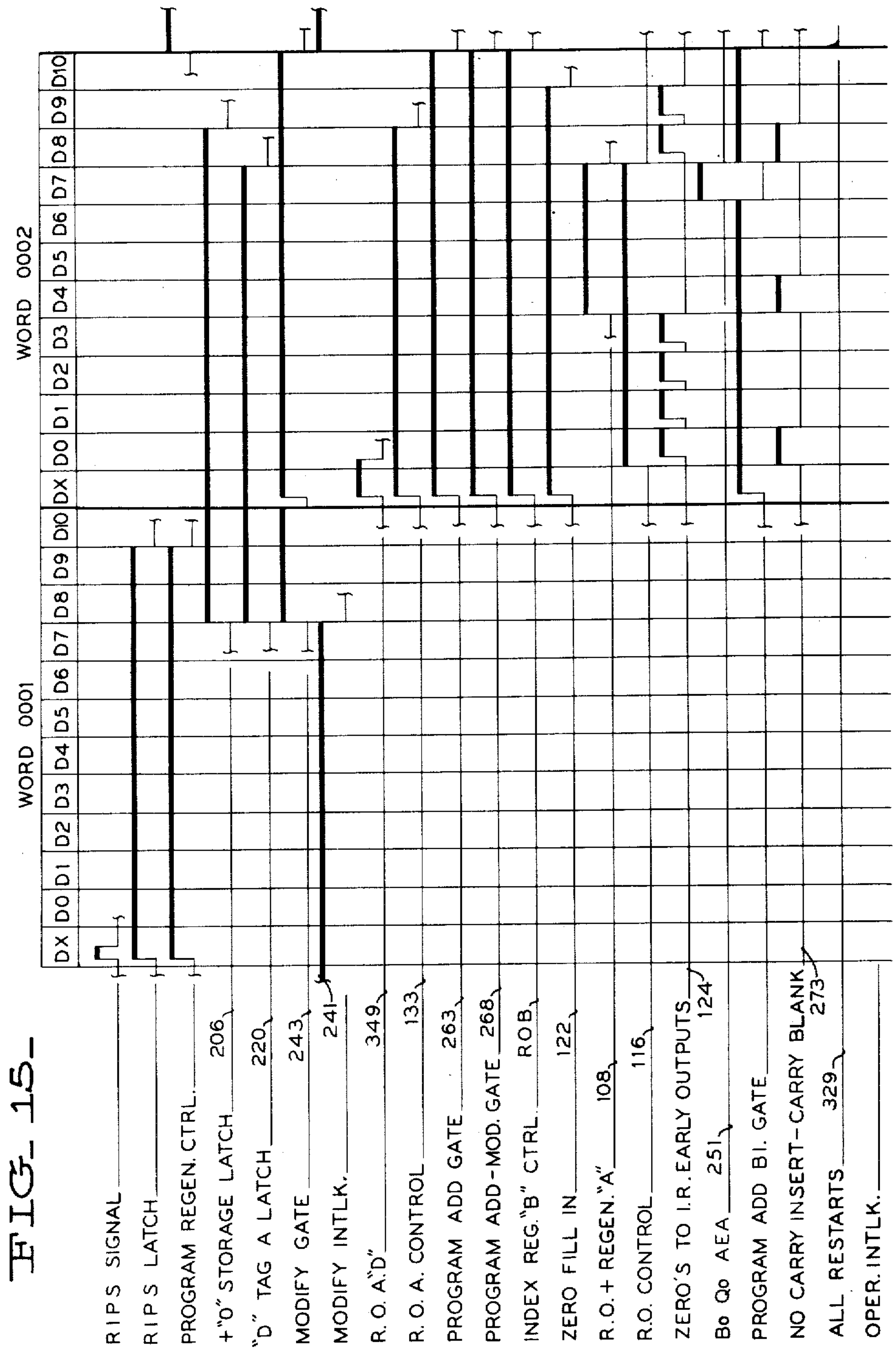

FIG. 15 shows a sequence chart of the various control lines for a modify D address with index register A. For example: 10 2000 XXXX Index register 0015+

Figure 16:
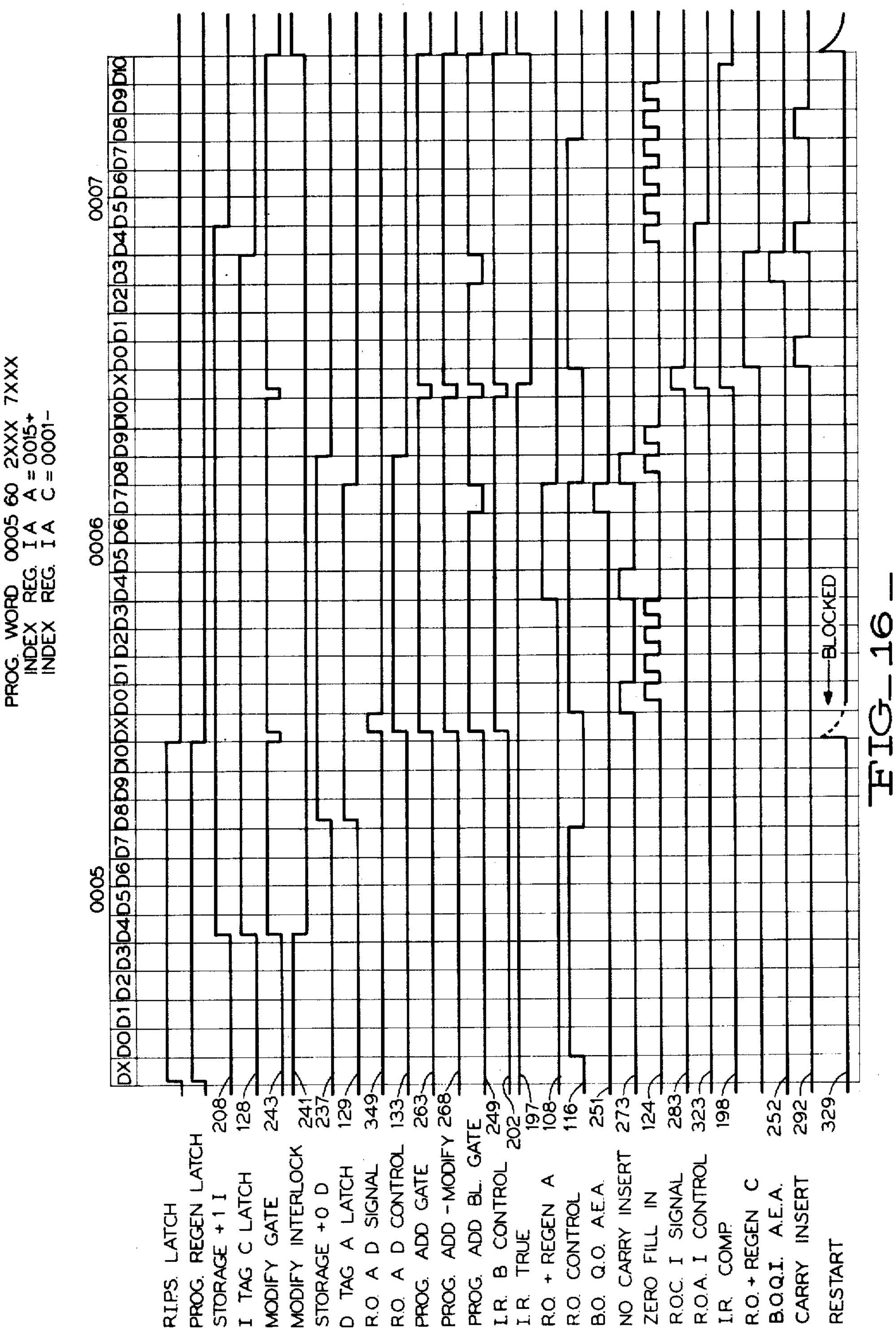

FIG. 16 shows a similar sequence chart of the various control lines for a modify D and I operation. Wherein the program word 60 2XXX 7XXX and indexing register A is 0015+ and indexing register C is 0001−.

Figure 17:
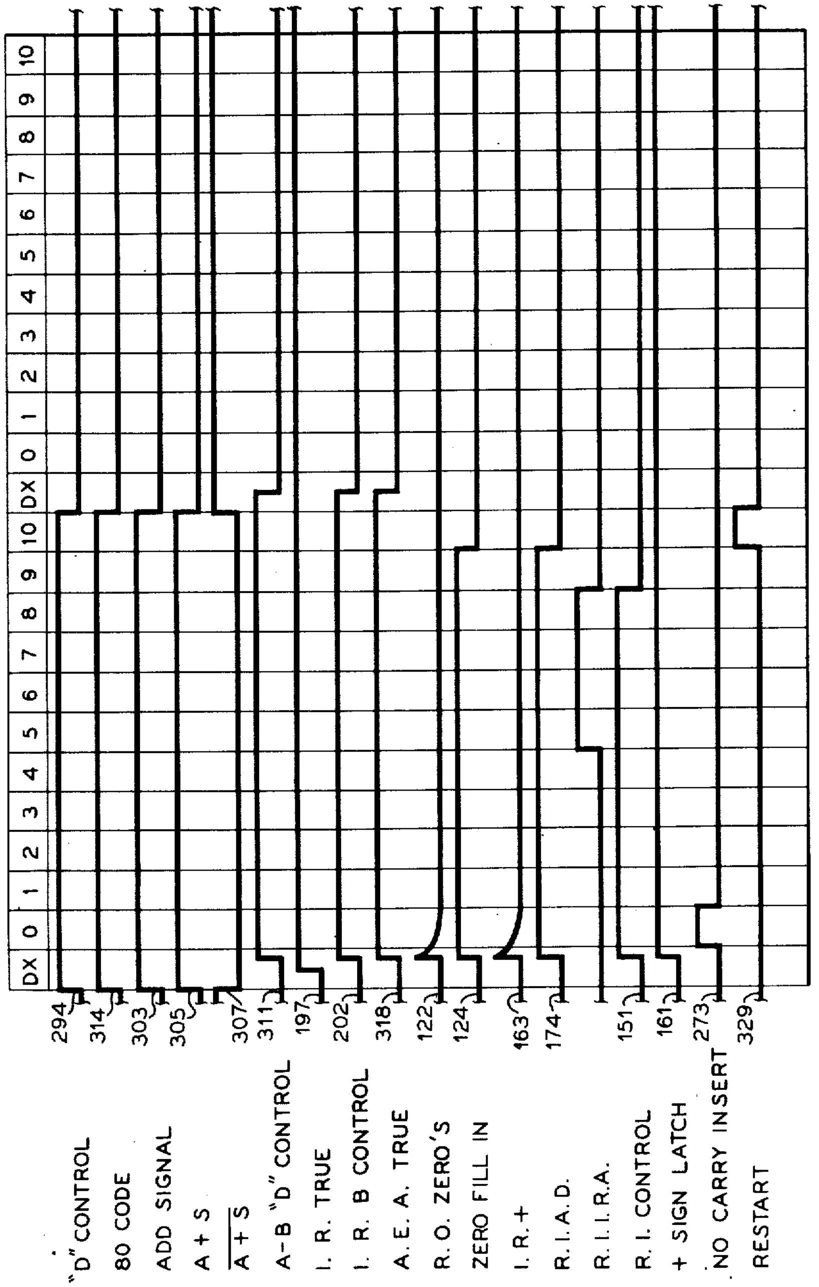

FIG. 17 shows a sequence chart for a reset indexing register A add D operation: 80 0001 XXXX.

FIG. 18 shows a sequence chart of the various control lines of a typical reset subtract D and complement adjust operation on a program word 81 0001 XXXX.

Address modification is accomplished by adding the contents of an indexing accumulator to a basic address. If the contents of the indexing accumulator is positive and the resulting effective address exceeds 9999, the carry is lost and only the four low-order digits of the sum are kept as the effective address. If the contents of the indexing accumulator is negative, the address is modified by subtraction. Because subtraction is accomplished by adding the tens complement, a carry will always occur when the difference is positive. As above, any such carries are lost. If indexing by subtraction should result in a negative address, the complement result will not be recomplemented. This may result in a storage selection error if the complement is not a meaningful address.

TESTING OF INDEXING REGISTERS (IR)

The following are the operations by means of which the contents of the indexing accumulators may be tested.

40 BNZA Branch Nonzero IR A

If IR A contains zeros, the next program step word will be taken from the location specified by the instruction address. If the contents of IR A are not zero, the next program step word will be taken from the location specified by the data address.

41 BMNA Branch Minus IR A

If the sign of IR A is plus, the next program step word is taken from the location specified by the instruction address. If it is minus, the next program step word will be taken from the location specified by the data address.

42 BNZB Branch Nonzero IR B

If IR B contains zeros, the next program step word will be taken from the location specified by the instruction address. If the contents of IR B are n[illegible] the next program step word will be taken from the location specified by the data address.

43 BMNB Branch Minus IR B

If the sign of IR B is plus, the next program step word will be taken from the locations specified by the instruction address. If it is minus, the next program step will be taken from the location specified by the data address.

48 BNZC Branch Nonzero IR C

If IR C contains zeros, the next program is taken from the location specified by the instruction address. If the contents of IR C are not zero, the next program step will be taken from the location specified by the data address.

49 BMNC Branch Minus IR C

If the sign of IR C is plus, the next program step will be taken from the location specified by the instruction address. If it is minus, the next program step will be taken from the location specified by the data address.

OPERATIONS UPON INDEXING ACCUMULATORS

The effective address of those instructions that operate upon indexing accumulators must be 0000–1999, 8000–8003, or 9000–9059. This effective address specifies what data are to be used in the operation. If the effective address is in the range 0000–1999, the D-address has a different significance. It is not used as an address, but it is the actual data or amount used by the operation. If it is in the range 8000–8003, or 9000–9059, the data used by the operation will be the four low-order digits and sign of the storage location specified by the address. The meaning of these statements will become clearer in the examples that follow. The instruction address has its usual meaning.

50 AA Add to IR A

The data specified by the effective data address will be added to the contents of IR A.

EXAMPLES

| Actual instruction | Indexed instruction | Contents of IR A | | Contents of IR B | Contents of 8000–8003 or 9000–9059 |
|---|---|---|---|---|---|
| | | Before | After | | |
| 5000010123 | 5000010123 | 0500+ | 0501+ | ------ | ------------ |
| 5016230123 | 5016230123 | 0500+ | 2123+ | ------ | ------------ |
| 5020000123 | 5005000123 | 0500+ | 1000+ | ------ | ------------ |
| 5021560123 | 5006560123 | 0500+ | 1156+ | ------ | ------------ |
| 5040000123 | 5001110123 | 0500+ | 0611+ | 0111+ | ------------ |
| 5042650123 | 5001540123 | 0500+ | 0654+ | 0111− | ------------ |
| 5080020123 | 5080020123 | 0500+ | 1611+ | ------ | 7777771111+ |
| 5090070123 | 5090070123 | +0050 | 7277− | ------ | 1111117777− |
| 5094070123 | 5090040123 | 0500+ | 1734+ | 0003− | 0202021234+ |
| 5021562123 | 5006560623 | 0500+ | 1156+ | ------ | ------------ |

These examples show that it is possible.

(1) To add a constant, in the range 0000–1999, to A as in the first two examples (2) To add A to itself as in the third example (3) To add A to itself and to another constant, in the range 0000–1999, as in the fourth example (4) To add B to A as in the fifth example (5) To add B to A and to another constant as in the sixth example (6) To add to A from the four low-order positions of a high-speed storage location as in the next three examples The last example illustrates how addresses are modified before the operation is executed. Thus D and I are increased by 0500 before the contents of IR A are modified.

As described previously the effective address must be drum, arithmetic, console, and high speed storage addresses. The operations performed to obtain this effective address are exactly the same here as with any other kind of instruction. The rules regarding carries and complement or negative addresses still apply. The final addition to IR A is algebraic, when the effective address is arithmetic, console and high speed storage, all normal rules regarding signs apply. If, however, the effective address is drum addresses, this address is always treated as though it were plus because the program register carries no sign.

All other instructions that are described in the following paragraphs operate in an analogous manner. A few examples for each are given. The general rules given are deemed sufficient for working out practically all conditions.

52 AB Add to IR B

The data specified by the data address will be added to the contents of IR B.

58 AC Add to IR C

The data specified by the data address will be added to the contents of IR C.

51 SA Subtract from IR A

The data specified by the data address will be subtracted from the contents of IR A.

EXAMPLES

| Actual instruction | Indexed instruction | Contents of IR A | | Contents of IR B | Contents of 8000–8003 or 9000–9059 |
|---|---|---|---|---|---|
| | | Before | After | | |
| 5100010123 | 5100010123 | 0500+ | 0499+ | ------ | ------------ |
| 5120000123 | 5105000123 | 0500+ | 0000+ | ------ | ------------ |
| 5142500123 | 5101250123 | 0500+ | 0375+ | 0125− | ------------ |
| 5180000123 | 5180000123 | 0500+ | 7390− | ------ | 1234567890+ |
| 5192070123 | 5190570123 | 0050+ | 7940+ | ------ | 1234567890− |

NOTE.—80 RAA reset add to IR A.

IR A is reset to zero, and the data specified at the data address will be placed therein.

EXAMPLES

| Actual instruction | Indexed instruction | Contents of IR A | | Contents of IR C | Contents of 8000–8003 or 9000–9059 |
|---|---|---|---|---|---|
| | | Before | After | | |
| 8000000123 | 8000000123 | 1234− | 0000+ | ------ | ------------ |
| 8015200123 | 8015200123 | 1234− | 1520+ | ------ | ------------ |
| 8060000123 | 8001750123 | 1234− | 0175+ | 0175+ | ------------ |
| 8065250123 | 8003500123 | 1234− | 0350+ | 0175− | ------------ |
| 8090270123 | 8090270123 | 1234− | 5021− | ------ | 001212345021− |

NOTE.—82 RAB reset add to IR B.

IR B is reset to zero, and the data specified by the data address is added to it.

88 RAC Reset Add to IR C

IR C is reset to zero, and the data specified by the data address is added to it.

81 RSA Reset Subtract from IR A

IR A is reset to zero, and the data specified by the data address is subtracted from it.

83 RSB Reset Subtract from IR B

IR B is reset to zero, and the data specified by the data address is substracted from it.

89 RSC Reset Subtract from IR C

IR C is reset to zeros, and the data specified by the data address will be subtracted from it.

EXAMPLES

| Actual instruction | Indexed instruction | Contents of IR A | | Contents of IR C | Contents of 8000–8003 or 9000–9059 |
|---|---|---|---|---|---|
| | | Before | After | | |
| 8112340123 | 8112340123 | 0527+ | 1234− | ------ | ------------ |
| 8170150123 | 8119270123 | 0527+ | 1927− | 0912+ | ------------ |
| 8170150123 | 8101030123 | 0527+ | 0103− | 0912− | ------------ |
| 8190590123 | 8190590123 | 0527+ | 2301+ | ------ | 0123012301− |

From the foregoing, it can be seen that an improved calculator operation has been provided which includes addressable indexing registers used as a vital element in the operation. These indexing registers are operative to modify both the data and instruction addresses in a program step word and may be addressable to be utilized in an arithmetic operation. In addition, the indexing registers may be added or subtracted or reset added and subtracted from both the program step register or a portion of the arithmetic unit. It is also possible to modify an indexing register by the controls of another indexing register.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic calculator operable in a sequence of program steps comprising a general storage device for storing multidigit data and program step word manifestations, each program step word including an operation code section and a data address section, said address section having predetermined digit positions assigned for storing increment signals to indicate an address modification, a program register for consecutively receiving and storing the respective program step word manifestations, an operation code register for receiving the operation code section manifestation, means responsive to the operation code manifestation for directing data manifestations within the calculator in predetermined sequences, an address register for receiving the address section manifestation from said program register, an arithmetic unit, an addressable indexing register, address selecting means controlled by manifestations of addresses from said address register for selecting data from said storage device and from said addressable indexing register under control of said address section of said program step words, circuit means for directing manifestations of a program step word to the program register, means for interrogating the program step word manifestations for the existence of increment signals at the predetermined digit positions, means responsive to the ascertainment of an increment signal existence of said interrogating means for selectively establishing circuits for conducting both the contents of said index register and the address section of said program step word to said arithmetic unit for modification of said address portion, means for transferring said modified address section to said address register, and means, controlled by an address section of a program step word and by an operation section for controlling said index register addressing means to select the contents of said index register as an operand and to transfer said operand to said arithmetic unit, as an operand in an arithmetic process.

2. An electronic calculator operable in a sequence of program steps comprising a general storage device for storing multidigit data and program step word manifestations each program step word including an operation code section, a data addres section and an instruction address section, said address section and said instruction address section each having predetermined digit positions assigned for storing increment signals to indicate an address modification, a program register for consecutively receiving and storing the respective program step word manifestations, an operation code register for receiving the operation code section manifestation, means responsive to the operation code manifestation for directing data manifestations within the calculator in predetermined sequences, an address register for consecutively receiving the data and the instruction addresses from said program register, an arithmetic unit, an addressable indexing register, address selecting means controlled by manifestations of addresses from said address register for selecting data and program step words from said storage device and data from said addressable index register under control of said address sections of said program step words, circuit means for directing manifestations of a program step word to the program register, means for interrogating the program step word manifestations for the existence of increment signals at the predetermined digit positions, means responsive to the ascertainment of an increment signal existence by said interrogating means for effectively establishing circuits for conducting the contents of said index register and either one of the address sections of said program step word to said arithmetic unit for modification of an address section, means for transferring said modified address section to said program step register and means, controlled by a data address section of a program step word and by an operation section for controlling said index register addressing means to select the contents of said index register as an operand and to transfer said operand to said arithmetic unit, as an operand in an arithmetic process.

3. The combination, as in claim 1, including selectively operated means responsive to a different operation code section for directing the contents of the addressable indexing register to said program register and from said program register to said address register, said contents seving as the address of the next data word.

4. The combination, as claimed in claim 2, including selectively operated means responsive to a different operation code section for directing the contents of the addressable indexing register to said program register and from said program register to said address register, said contents being the address of the next program step word.

References Cited in the file of this patent

UNITED STATES PATENTS

| | | |
|---|---|---|
| 2,658,681 | Palmer | Nov. 10, 1953 |
| 2,800,277 | Williams et al. | July 23, 1957 |
| 2,898,041 | Crawley et al. | Aug. 4, 1959 |
| 2,914,248 | Ross et al. | Nov. 24, 1959 |
| 2,939,634 | Beek et al. | June 7, 1960 |
| 2,957,626 | Havens et al. | Oct. 25, 1960 |

FOREIGN PATENTS

| | | |
|---|---|---|
| 1,099,467 | France | Mar. 23, 1955 |
| 1,106,950 | France | July 27, 1955 |
| 1,119,767 | France | Apr. 9, 1956 |
| 749,836 | Great Britain | June 6, 1956 |

OTHER REFERENCES

Eckert et al.: "Faster, Faster," McGraw-Hill Book Co., 1955, pages 65–87, 145–148, and 154 relied on.